(12) United States Patent
Bao et al.

(10) Patent No.: US 12,120,659 B2
(45) Date of Patent: Oct. 15, 2024

(54) SIDELINK ANCHOR GROUP FOR SIDELINK POSITION ESTIMATION

(71) Applicant: QUALCOMM Incorporated, San Diego, CA (US)

(72) Inventors: Jingchao Bao, San Diego, CA (US); Sony Akkarakaran, Poway, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/314,711

(22) Filed: May 9, 2023

(65) Prior Publication Data

US 2023/0284202 A1 Sep. 7, 2023

Related U.S. Application Data

(62) Division of application No. 17/399,600, filed on Aug. 11, 2021, now Pat. No. 11,696,277.

(51) Int. Cl.
*H04W 72/121* (2023.01)
*H04W 48/10* (2009.01)
(Continued)

(52) U.S. Cl.
CPC ......... *H04W 72/121* (2013.01); *H04W 48/10* (2013.01); *H04W 60/04* (2013.01);
(Continued)

(58) Field of Classification Search
None
See application file for complete search history.

(56) References Cited

U.S. PATENT DOCUMENTS

| 2016/0095080 | A1* | 3/2016 | Khoryaev ............. G01S 5/0284 |
| | | | 455/456.1 |
| 2017/0212206 | A1* | 7/2017 | Kim ....................... G01S 5/0205 |
| 2017/0223655 | A1 | 8/2017 | Huang et al. |
| 2019/0132896 | A1 | 5/2019 | Kusashima et al. |

(Continued)

FOREIGN PATENT DOCUMENTS

| EP | 1620954 B1 | 10/2007 |
| WO | 2021030583 A1 | 2/2021 |

(Continued)

OTHER PUBLICATIONS

Cewit, et al., "Discussion on Positioning Enhancements for Release 17", 3GPP TSG RAN WG1 103-e, R1-2008718, 3rd Generation Partnership Project, Mobile Competence Centre, 650, Route Des Lucioles, F-06921 Sophia-Antipolis Cedex, France, vol. RAN WG1, No. e-meeting, Oct. 16, 2020-Nov. 13, 2020, Oct. 17, 2020, XP051940317, 8 Pages, p. 3,4, paragraphs 2.3 and 5.

(Continued)

*Primary Examiner* — Mazda Sabouri
(74) *Attorney, Agent, or Firm* — Thien T. Nguyen

(57) ABSTRACT

Disclosed are techniques for wireless communication. In an aspect, a position estimation entity configures a sidelink anchor group with sidelink anchor(s), to which respective sidelink PRS pre-configuration(s) are sent. A UE transmits a request to schedule an on-demand sidelink PRS position estimation session of the UE. The position estimation entity provides the UE with assistance data associated with the sidelink anchor group for the on-demand sidelink PRS position estimation session. The UE sends the sidelink anchor group a sidelink PRS trigger to perform a sidelink PRS exchange with some or all of the sidelink anchor group in accordance with the respective sidelink PRS pre-configuration(s).

14 Claims, 33 Drawing Sheets

(51) Int. Cl.
*H04W 60/04* (2009.01)
*H04W 72/20* (2023.01)
*H04W 72/51* (2023.01)
*H04W 72/542* (2023.01)

(52) U.S. Cl.
CPC ........... *H04W 72/20* (2023.01); *H04W 72/51* (2023.01); *H04W 72/542* (2023.01)

(56) References Cited

U.S. PATENT DOCUMENTS

| | | |
|---|---|---|
| 2019/0230618 A1 | 7/2019 | Saur et al. |
| 2019/0239181 A1 | 8/2019 | Gangakhedkar et al. |
| 2020/0305191 A1 | 9/2020 | Moon et al. |
| 2022/0103333 A1 | 3/2022 | Ghozlan et al. |
| 2022/0295442 A1 | 9/2022 | Goyal et al. |
| 2022/0326335 A1 | 10/2022 | Ko et al. |
| 2023/0047361 A1 | 2/2023 | Bao |
| 2023/0050701 A1 | 2/2023 | Bao |
| 2023/0074373 A1 | 3/2023 | Jatunov et al. |
| 2023/0284201 A1 | 9/2023 | Bao et al. |

FOREIGN PATENT DOCUMENTS

| | | |
|---|---|---|
| WO | 2021133104 A1 | 7/2021 |
| WO | 2021155210 A1 | 8/2021 |
| WO | 2021240478 A1 | 12/2021 |

OTHER PUBLICATIONS

International Search Report and Written Opinion—PCT/US2022/072691—ISA/EPO—Sep. 29, 2022.
International Search Report and Written Opinion—PCT/US2022/072694—ISA/EPO—Sep. 8, 2022.
Nokia, et al., "On-Demand PRS Transmission and Dynamic PRS Resource Allocation", 3GPP TSG-RAN WG2 Meeting #111 Electronic, R2-2007128, 3rd Generation Partnership Project, Mobile Competence Centre, 650, Route Des Lucioles, F-06921 Sophia-Antipolis Cedex, France, vol. RAN WG2, No. Electronic, Aug. 17, 2020-Aug. 28, 2020, Elbonia, 6 Pages, Aug. 7, 2020, XP051911954, the whole document.

* cited by examiner

Target UE

SIDELINK ANCHOR GROUP FOR SIDELINK POSITION ESTIMATION

CROSS-REFERENCE TO RELATED APPLICATIONS

The present application for patent is a Divisional of patent application Ser. No. 17/399,600, entitled "SIDELINK ANCHOR GROUP FOR SIDELINK POSITION ESTIMATION," filed Aug. 11, 2021, which is assigned to the assignee hereof and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a position estimation entity includes performing sidelink anchor registration with a plurality of sidelink anchors; configuring a sidelink anchor group from among the plurality of sidelink anchors based on a set of criteria; transmitting, to each sidelink anchor of the sidelink anchor group, a respective sidelink PRS pre-configuration; receiving, from a user equipment (UE), a request to schedule an on-demand sidelink positioning reference signal (PRS) position estimation session of the UE; transmitting, to the UE, a sidelink PRS response that comprises assistance data associated with the sidelink anchor group for the on-demand sidelink PRS position estimation session; and receiving one or more measurement reports associated with the on-demand sidelink PRS position estimation session.

In some aspects, the set of criteria includes a comprises: a mobility status of the plurality of sidelink anchors, a position estimation accuracy or capability associated with the plurality of sidelink anchors, or a combination thereof.

In some aspects, the sidelink PRS pre-configuration specifies for each sidelink anchor in the sidelink anchor group, a first offset from a sidelink PRS trigger from the UE to a sidelink PRS transmission from the respective sidelink anchor, an expected reception time of sidelink PRS from the UE, or a combination thereof.

In some aspects, the assistance data comprises a sidelink anchor group identifier, a private key, a resource grant for transmission of a sidelink PRS trigger from the UE to the sidelink anchor group, a sidelink PRS pre-configuration associated with the sidelink anchor group for the on-demand sidelink PRS position estimation session, a sidelink anchor identifier for a sidelink PRS trigger from the UE to the sidelink anchor group, or a combination thereof.

In an aspect, a method of operating a user equipment (UE) includes transmitting, to a position estimation entity, a request to schedule an on-demand sidelink positioning reference signal (PRS) position estimation session of the UE; receiving, from the position estimation entity, a sidelink PRS response that comprises assistance data associated with a sidelink anchor group for the on-demand sidelink PRS position estimation session; transmitting, to the sidelink anchor group, a sidelink PRS trigger to trigger the on-demand sidelink PRS position estimation session in accordance with respective sidelink PRS pre-configurations of the sidelink anchor group; and performing a sidelink PRS exchange with one or more sidelink anchors of the sidelink anchor group in association with the on-demand sidelink PRS position estimation session.

In some aspects, the method includes transmitting a measurement report based on the sidelink PRS exchange to the position estimation entity.

In some aspects, the sidelink PRS trigger is transmitted via multicast or broadcast.

In some aspects, the sidelink PRS trigger comprises an indication of a sidelink zone in which the UE is located.

In some aspects, the sidelink PRS trigger designates a maximum range between the UE and a respective sidelink anchor for the respective sidelink anchor to accept the sidelink PRS trigger.

In some aspects, the method includes receiving, from at least one sidelink anchor of the sidelink anchor group, a sidelink PRS trigger response.

In some aspects, the sidelink PRS trigger response indicates acceptance or rejection of the sidelink PRS trigger, and the sidelink PRS exchange comprises blind decoding or descrambling only for SL PRS sidelink anchors from which a respective sidelink PRS trigger response that indicates acceptance of the sidelink PRS trigger is received.

In some aspects, the sidelink PRS exchange comprises blind decoding or descrambling for SL PRS for each sidelink anchor among the sidelink anchor group.

In some aspects, the assistance data comprises a sidelink anchor group identifier, a private key, a resource grant for transmission of a sidelink PRS trigger from the UE to the sidelink anchor group, a sidelink PRS configuration associated with the sidelink anchor group for the on-demand sidelink PRS position estimation session, a sidelink anchor identifier for a based sidelink PRS trigger from the UE to the sidelink anchor group, or a combination thereof.

In an aspect, a method of operating a sidelink anchor includes performing sidelink anchor registration with a position estimation entity; receiving, from the position estimation entity in response to the sidelink anchor registration, a sidelink PRS pre-configuration associated with a sidelink anchor group; receiving, from a user equipment (UE), a sidelink PRS trigger that triggers the sidelink PRS pre-configuration for an on-demand sidelink PRS position estimation session of the UE with the sidelink anchor group; and performing a sidelink PRS exchange with the UE associated with the on-demand sidelink PRS position estimation session in response to the sidelink PRS trigger.

In some aspects, the method includes transmitting a measurement report based on the sidelink PRS exchange to the position estimation entity.

In some aspects, the method includes determining to participate in the on-demand sidelink PRS position estimation session with the UE based on one or more criteria.

In some aspects, the sidelink PRS trigger comprises an indication of a sidelink zone in which the UE is located, and the one or more criteria comprises a relationship between the sidelink anchor and the sidelink zone in which the UE is located.

In some aspects, the sidelink PRS trigger designates a maximum range between the UE and a respective sidelink anchor for the respective sidelink anchor to accept the sidelink PRS trigger, and the determination is based on whether the sidelink anchor is inside of the maximum range.

In some aspects, the method includes transmitting, to the UE, a sidelink PRS trigger response.

In some aspects, the sidelink PRS trigger response indicates acceptance of the sidelink PRS trigger.

In an aspect, a position estimation entity includes a memory; at least one transceiver; and at least one processor communicatively coupled to the memory and the at least one transceiver, the at least one processor configured to: perform sidelink anchor registration with a plurality of sidelink anchors; configure a sidelink anchor group from among the plurality of sidelink anchors based on a set of criteria; transmit, via the at least one transceiver, to each sidelink anchor of the sidelink anchor group, a respective sidelink PRS pre-configuration; receive, via the at least one transceiver, from a user equipment (UE), a request to schedule an on-demand sidelink positioning reference signal (PRS) position estimation session of the UE; transmit, via the at least one transceiver, to the UE, a sidelink PRS response that comprises assistance data associated with the sidelink anchor group for the on-demand sidelink PRS position estimation session; and receive, via the at least one transceiver, one or more measurement reports associated with the on-demand sidelink PRS position estimation session.

In some aspects, the set of criteria includes a comprises: a mobility status of the plurality of sidelink anchors, a position estimation accuracy or capability associated with the plurality of sidelink anchors, or a combination thereof.

In some aspects, the sidelink PRS pre-configuration specifies for each sidelink anchor in the sidelink anchor group, a first offset from a sidelink PRS trigger from the UE to a sidelink PRS transmission from the respective sidelink anchor, an expected reception time of sidelink PRS from the UE, or a combination thereof.

In some aspects, the assistance data comprises a sidelink anchor group identifier, a private key, a resource grant for transmission of a sidelink PRS trigger from the UE to the sidelink anchor group, a sidelink PRS pre-configuration associated with the sidelink anchor group for the on-demand sidelink PRS position estimation session, a sidelink anchor identifier for a sidelink PRS trigger from the UE to the sidelink anchor group, or a combination thereof.

In an aspect, a user equipment (UE) includes a memory; at least one transceiver; and at least one processor communicatively coupled to the memory and the at least one transceiver, the at least one processor configured to: transmit, via the at least one transceiver, to a position estimation entity, a request to schedule an on-demand sidelink positioning reference signal (PRS) position estimation session of the UE; receive, via the at least one transceiver, from the position estimation entity, a sidelink PRS response that comprises assistance data associated with a sidelink anchor group for the on-demand sidelink PRS position estimation session; transmit, via the at least one transceiver, to the sidelink anchor group, a sidelink PRS trigger to trigger the on-demand sidelink PRS position estimation session in accordance with respective sidelink PRS pre-configurations of the sidelink anchor group; and perform a sidelink PRS exchange with one or more sidelink anchors of the sidelink anchor group in association with the on-demand sidelink PRS position estimation session.

In some aspects, the at least one processor is further configured to: transmit, via the at least one transceiver, a measurement report based on the sidelink PRS exchange to the position estimation entity.

In some aspects, the sidelink PRS trigger is transmitted via multicast or broadcast.

In some aspects, the sidelink PRS trigger comprises an indication of a sidelink zone in which the UE is located.

In some aspects, the sidelink PRS trigger designates a maximum range between the UE and a respective sidelink anchor for the respective sidelink anchor to accept the sidelink PRS trigger.

In some aspects, the at least one processor is further configured to: receive, via the at least one transceiver, from at least one sidelink anchor of the sidelink anchor group, a sidelink PRS trigger response.

In some aspects, the sidelink PRS trigger response indicates acceptance or rejection of the sidelink PRS trigger, and the sidelink PRS exchange comprises blind decoding or descrambling only for SL PRS sidelink anchors from which a respective sidelink PRS trigger response that indicates acceptance of the sidelink PRS trigger is received.

In some aspects, the sidelink PRS exchange comprises blind decoding or descrambling for SL PRS for each sidelink anchor among the sidelink anchor group.

In some aspects, the assistance data comprises a sidelink anchor group identifier, a private key, a resource grant for transmission of a sidelink PRS trigger from the UE to the sidelink anchor group, a sidelink PRS configuration associated with the sidelink anchor group for the on-demand sidelink PRS position estimation session, a sidelink anchor identifier for a based sidelink PRS trigger from the UE to the sidelink anchor group, or a combination thereof.

In an aspect, a sidelink anchor includes a memory; at least one transceiver; and at least one processor communicatively coupled to the memory and the at least one transceiver, the at least one processor configured to: perform sidelink anchor registration with a position estimation entity; receive, via the at least one transceiver, from the position estimation entity in response to the sidelink anchor registration, a sidelink PRS pre-configuration associated with a sidelink anchor group; receive, via the at least one transceiver, from a user equipment (UE), a sidelink PRS trigger that triggers the sidelink PRS pre-configuration for an on-demand sidelink PRS position estimation session of the UE with the sidelink anchor group; and perform a sidelink PRS exchange with the UE associated with the on-demand sidelink PRS position estimation session in response to the sidelink PRS trigger.

In some aspects, the at least one processor is further configured to: transmit, via the at least one transceiver, a measurement report based on the sidelink PRS exchange to the position estimation entity.

In some aspects, the at least one processor is further configured to: determine to participate in the on-demand sidelink PRS position estimation session with the UE based on one or more criteria.

In some aspects, the sidelink PRS trigger comprises an indication of a sidelink zone in which the UE is located, and the one or more criteria comprises a relationship between the sidelink anchor and the sidelink zone in which the UE is located.

In some aspects, the sidelink PRS trigger designates a maximum range between the UE and a respective sidelink anchor for the respective sidelink anchor to accept the sidelink PRS trigger, and the determination is based on whether the sidelink anchor is inside of the maximum range.

In some aspects, the at least one processor is further configured to: transmit, via the at least one transceiver, to the UE, a sidelink PRS trigger response.

In some aspects, the sidelink PRS trigger response indicates acceptance of the sidelink PRS trigger.

In an aspect, a position estimation entity includes means for performing sidelink anchor registration with a plurality of sidelink anchors; means for configuring a sidelink anchor group from among the plurality of sidelink anchors based on a set of criteria; means for transmitting, to each sidelink anchor of the sidelink anchor group, a respective sidelink PRS pre-configuration; means for receiving, from a user equipment (UE), a request to schedule an on-demand sidelink positioning reference signal (PRS) position estimation session of the UE; means for transmitting, to the UE, a sidelink PRS response that comprises assistance data associated with the sidelink anchor group for the on-demand sidelink PRS position estimation session; and means for receiving one or more measurement reports associated with the on-demand sidelink PRS position estimation session.

In some aspects, the set of criteria includes a comprises: a mobility status of the plurality of sidelink anchors, a position estimation accuracy or capability associated with the plurality of sidelink anchors, or a combination thereof.

In some aspects, the sidelink PRS pre-configuration specifies for each sidelink anchor in the sidelink anchor group, a first offset from a sidelink PRS trigger from the UE to a sidelink PRS transmission from the respective sidelink anchor, an expected reception time of sidelink PRS from the UE, or a combination thereof.

In some aspects, the assistance data comprises a sidelink anchor group identifier, a private key, a resource grant for transmission of a sidelink PRS trigger from the UE to the sidelink anchor group, a sidelink PRS pre-configuration associated with the sidelink anchor group for the on-demand sidelink PRS position estimation session, a sidelink anchor identifier for a sidelink PRS trigger from the UE to the sidelink anchor group, or a combination thereof.

In an aspect, a user equipment (UE) includes means for transmitting, to a position estimation entity, a request to schedule an on-demand sidelink positioning reference signal (PRS) position estimation session of the UE; means for receiving, from the position estimation entity, a sidelink PRS response that comprises assistance data associated with a sidelink anchor group for the on-demand sidelink PRS position estimation session; means for transmitting, to the sidelink anchor group, a sidelink PRS trigger to trigger the on-demand sidelink PRS position estimation session in accordance with respective sidelink PRS pre-configurations of the sidelink anchor group; and means for performing a sidelink PRS exchange with one or more sidelink anchors of the sidelink anchor group in association with the on-demand sidelink PRS position estimation session.

In some aspects, the method includes means for transmitting a measurement report based on the sidelink PRS exchange to the position estimation entity.

In some aspects, the sidelink PRS trigger is transmitted via multicast or broadcast.

In some aspects, the sidelink PRS trigger comprises an indication of a sidelink zone in which the UE is located.

In some aspects, the sidelink PRS trigger designates a maximum range between the UE and a respective sidelink anchor for the respective sidelink anchor to accept the sidelink PRS trigger.

In some aspects, the method includes means for receiving, from at least one sidelink anchor of the sidelink anchor group, a sidelink PRS trigger response.

In some aspects, the sidelink PRS trigger response indicates acceptance or rejection of the sidelink PRS trigger, and the sidelink PRS exchange comprises blind decoding or descrambling only for SL PRS sidelink anchors from which a respective sidelink PRS trigger response that indicates acceptance of the sidelink PRS trigger is received.

In some aspects, the sidelink PRS exchange comprises blind decoding or descrambling for SL PRS for each sidelink anchor among the sidelink anchor group.

In some aspects, the assistance data comprises a sidelink anchor group identifier, a private key, a resource grant for transmission of a sidelink PRS trigger from the UE to the sidelink anchor group, a sidelink PRS configuration associated with the sidelink anchor group for the on-demand sidelink PRS position estimation session, a sidelink anchor identifier for a based sidelink PRS trigger from the UE to the sidelink anchor group, or a combination thereof.

In an aspect, a sidelink anchor includes means for performing sidelink anchor registration with a position estimation entity; means for receiving, from the position estimation entity in response to the sidelink anchor registration, a sidelink PRS pre-configuration associated with a sidelink anchor group; means for receiving, from a user equipment (UE), a sidelink PRS trigger that triggers the sidelink PRS pre-configuration for an on-demand sidelink PRS position estimation session of the UE with the sidelink anchor group;

and means for performing a sidelink PRS exchange with the UE associated with the on-demand sidelink PRS position estimation session in response to the sidelink PRS trigger.

In some aspects, the method includes means for transmitting a measurement report based on the sidelink PRS exchange to the position estimation entity.

In some aspects, the method includes means for determining to participate in the on-demand sidelink PRS position estimation session with the UE based on one or more criteria.

In some aspects, the sidelink PRS trigger comprises an indication of a sidelink zone in which the UE is located, and the one or more criteria comprises a relationship between the sidelink anchor and the sidelink zone in which the UE is located.

In some aspects, the sidelink PRS trigger designates a maximum range between the UE and a respective sidelink anchor for the respective sidelink anchor to accept the sidelink PRS trigger, and the determination is based on whether the sidelink anchor is inside of the maximum range.

In some aspects, the method includes means for transmitting, to the UE, a sidelink PRS trigger response.

In some aspects, the sidelink PRS trigger response indicates acceptance of the sidelink PRS trigger.

In an aspect, a non-transitory computer-readable medium storing computer-executable instructions that, when executed by a position estimation entity, cause the position estimation entity to: perform sidelink anchor registration with a plurality of sidelink anchors; configure a sidelink anchor group from among the plurality of sidelink anchors based on a set of criteria; transmit, to each sidelink anchor of the sidelink anchor group, a respective sidelink PRS pre-configuration; receive, from a user equipment (UE), a request to schedule an on-demand sidelink positioning reference signal (PRS) position estimation session of the UE; transmit, to the UE, a sidelink PRS response that comprises assistance data associated with the sidelink anchor group for the on-demand sidelink PRS position estimation session; and receive one or more measurement reports associated with the on-demand sidelink PRS position estimation session.

In some aspects, the set of criteria includes a comprises: a mobility status of the plurality of sidelink anchors, a position estimation accuracy or capability associated with the plurality of sidelink anchors, or a combination thereof.

In some aspects, the sidelink PRS pre-configuration specifies for each sidelink anchor in the sidelink anchor group, a first offset from a sidelink PRS trigger from the UE to a sidelink PRS transmission from the respective sidelink anchor, an expected reception time of sidelink PRS from the UE, or a combination thereof.

In some aspects, the assistance data comprises a sidelink anchor group identifier, a private key, a resource grant for transmission of a sidelink PRS trigger from the UE to the sidelink anchor group, a sidelink PRS pre-configuration associated with the sidelink anchor group for the on-demand sidelink PRS position estimation session, a sidelink anchor identifier for a sidelink PRS trigger from the UE to the sidelink anchor group, or a combination thereof.

In an aspect, a non-transitory computer-readable medium storing computer-executable instructions that, when executed by a user equipment (UE), cause the UE to: transmit, to a position estimation entity, a request to schedule an on-demand sidelink positioning reference signal (PRS) position estimation session of the UE; receive, from the position estimation entity, a sidelink PRS response that comprises assistance data associated with a sidelink anchor group for the on-demand sidelink PRS position estimation session; transmit, to the sidelink anchor group, a sidelink PRS trigger to trigger the on-demand sidelink PRS position estimation session in accordance with respective sidelink PRS pre-configurations of the sidelink anchor group; and perform a sidelink PRS exchange with one or more sidelink anchors of the sidelink anchor group in association with the on-demand sidelink PRS position estimation session.

In some aspects, instructions that, when executed by UE, further cause the UE to: transmit, via the at least one transceiver, a measurement report based on the sidelink PRS exchange to the position estimation entity In some aspects, the sidelink PRS trigger is transmitted via multicast or broadcast.

In some aspects, the sidelink PRS trigger comprises an indication of a sidelink zone in which the UE is located.

In some aspects, the sidelink PRS trigger designates a maximum range between the UE and a respective sidelink anchor for the respective sidelink anchor to accept the sidelink PRS trigger.

In some aspects, instructions that, when executed by UE, further cause the UE to: receive, via the at least one transceiver, from at least one sidelink anchor of the sidelink anchor group, a sidelink PRS trigger response In some aspects, the sidelink PRS trigger response indicates acceptance or rejection of the sidelink PRS trigger, and the sidelink PRS exchange comprises blind decoding or descrambling only for SL PRS sidelink anchors from which a respective sidelink PRS trigger response that indicates acceptance of the sidelink PRS trigger is received.

In some aspects, the sidelink PRS exchange comprises blind decoding or descrambling for SL PRS for each sidelink anchor among the sidelink anchor group.

In some aspects, the assistance data comprises a sidelink anchor group identifier, a private key, a resource grant for transmission of a sidelink PRS trigger from the UE to the sidelink anchor group, a sidelink PRS configuration associated with the sidelink anchor group for the on-demand sidelink PRS position estimation session, a sidelink anchor identifier for a based sidelink PRS trigger from the UE to the sidelink anchor group, or a combination thereof.

In an aspect, a non-transitory computer-readable medium storing computer-executable instructions that, when executed by a sidelink anchor, cause the sidelink anchor to: perform sidelink anchor registration with a position estimation entity; receive, from the position estimation entity in response to the sidelink anchor registration, a sidelink PRS pre-configuration associated with a sidelink anchor group; receive, from a user equipment (UE), a sidelink PRS trigger that triggers the sidelink PRS pre-configuration for an on-demand sidelink PRS position estimation session of the UE with the sidelink anchor group; and perform a sidelink PRS exchange with the UE associated with the on-demand sidelink PRS position estimation session in response to the sidelink PRS trigger.

In some aspects, instructions that, when executed by sidelink anchor, further cause the sidelink anchor to:

In some aspects, instructions that, when executed by sidelink anchor, further cause the sidelink anchor to:

In some aspects, the sidelink PRS trigger comprises an indication of a sidelink zone in which the UE is located, and the one or more criteria comprises a relationship between the sidelink anchor and the sidelink zone in which the UE is located.

In some aspects, the sidelink PRS trigger designates a maximum range between the UE and a respective sidelink anchor for the respective sidelink anchor to accept the sidelink PRS trigger, and the determination is based on whether the sidelink anchor is inside of the maximum range.

In some aspects, instructions that, when executed by sidelink anchor, further cause the sidelink anchor to:

In some aspects, the sidelink PRS trigger response indicates acceptance of the sidelink PRS trigger.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
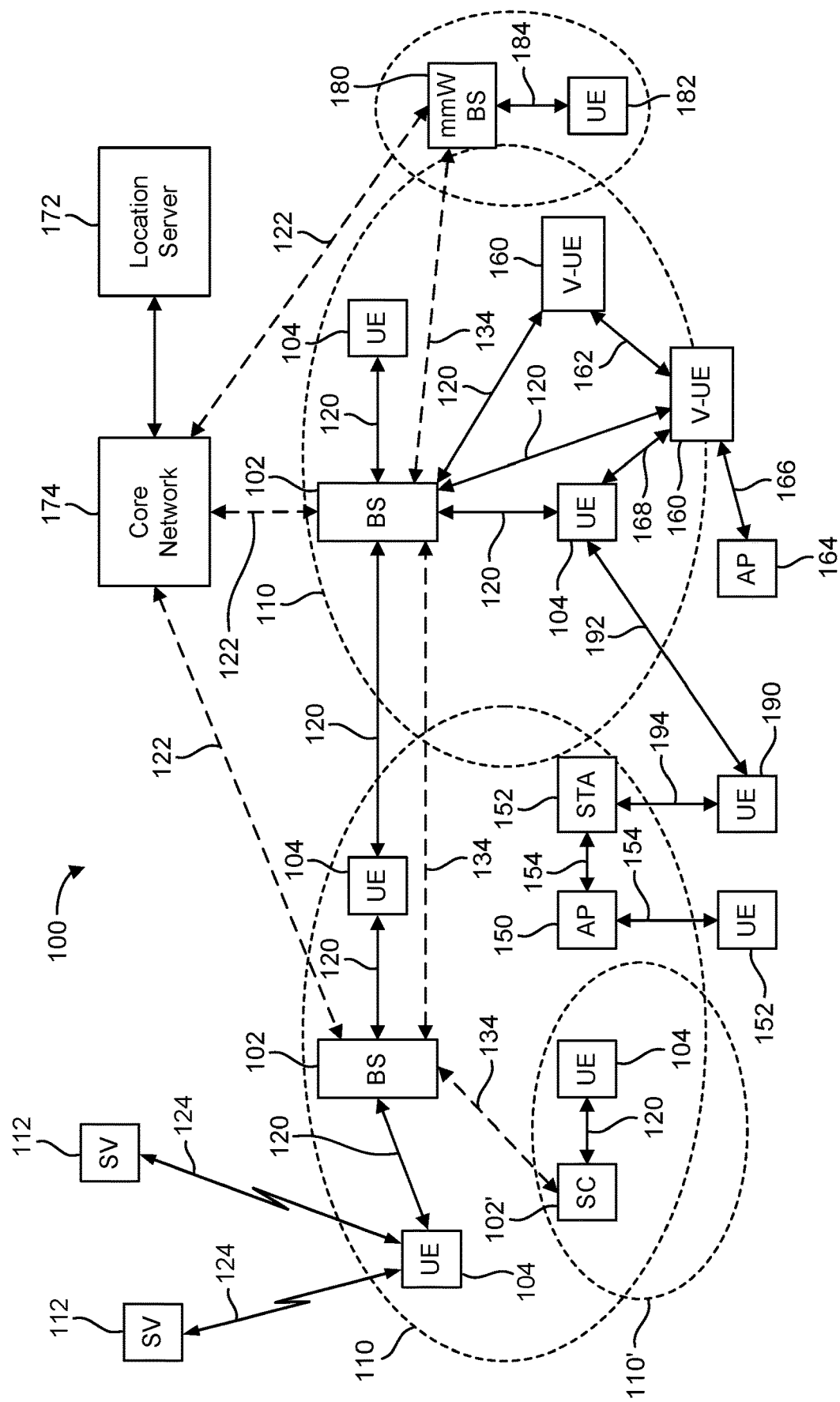
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (V-UE), "pedestrian user equipment" (P-UE), and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station," or variations thereof.

A V-UE is a type of UE and may be any in-vehicle wireless communication device, such as a navigation system, a warning system, a heads-up display (HUD), an on-board computer, an in-vehicle infotainment system, an automated driving system (ADS), an advanced driver assistance system (ADAS), etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. A P-UE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 174 (e.g., an evolved packet core (EPC) or 5G core (5GC)) through backhaul links 122, and through the core network 174 to one or more location servers 172 (e.g., a location management function (LMF) or a secure user plane location (SUPL) location platform (SLP)). The location server(s) 172 may be part of core network 174 or may be external to core network 174. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 (e.g., using the Uu interface). V-UEs 160 may also communicate directly with each other over a wireless sidelink 162, with a roadside access point 164 (also referred to as a "roadside unit") over a wireless sidelink 166, or with UEs 104 over a wireless sidelink 168. A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS GSA band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more roadside access points 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more roadside access points 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards roadside access points 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
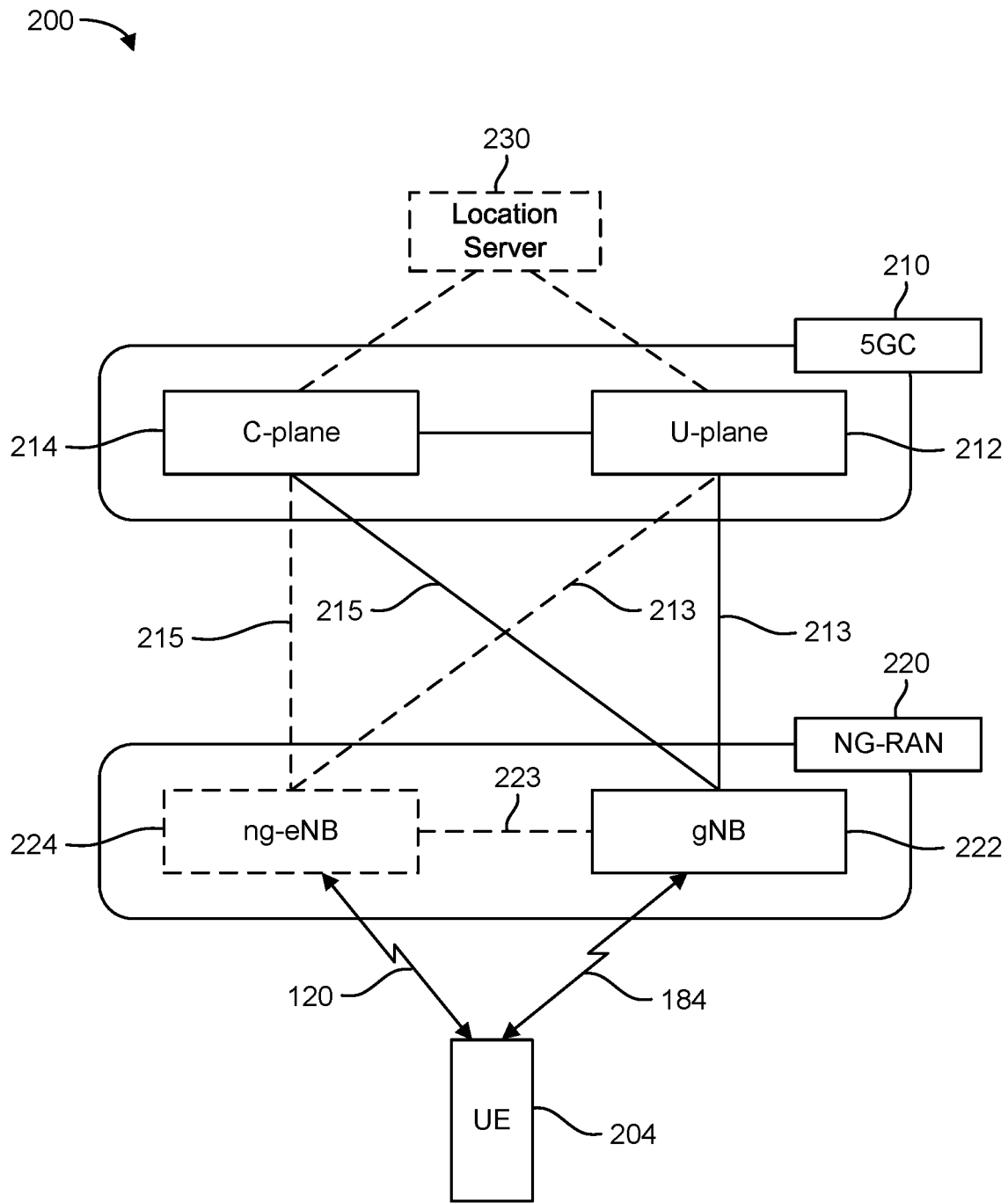
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
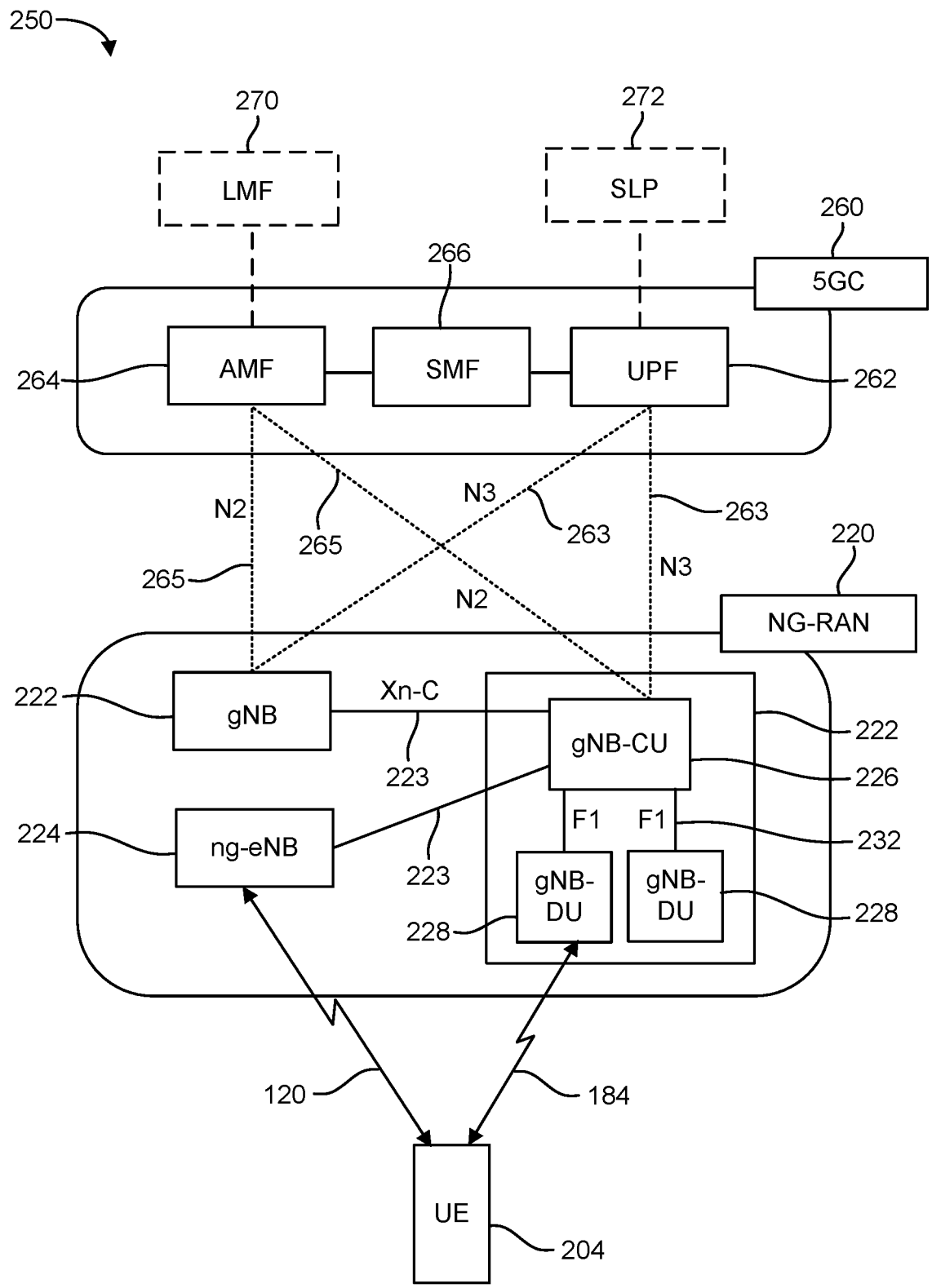

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
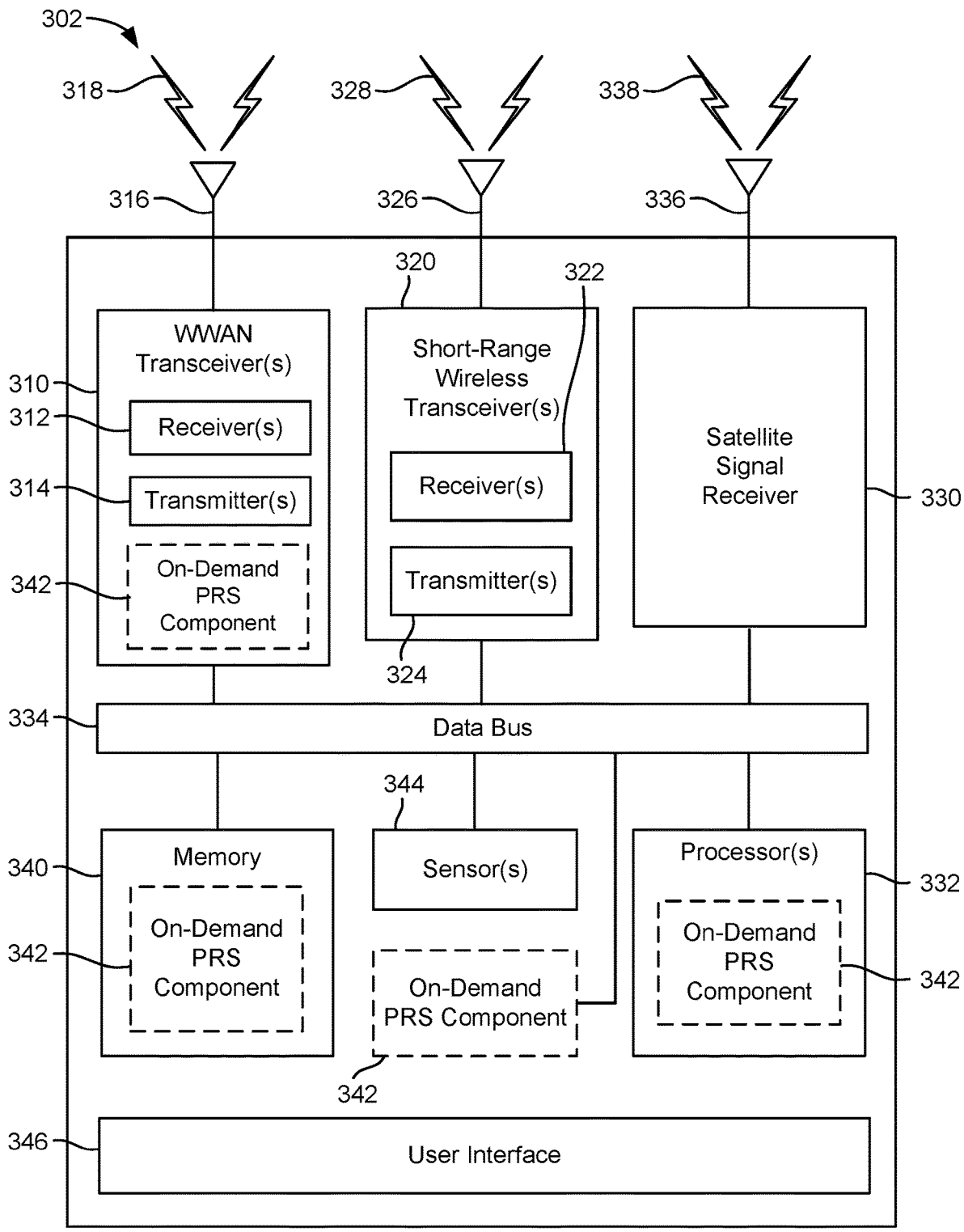
FIGS. 3A, 3B, and 3C are simplified block diagrams of several sample aspects of components that may be employed in a user equipment (UE), a base station, and a network entity, respectively, and configured to support communications as taught herein.
Figure 3B:
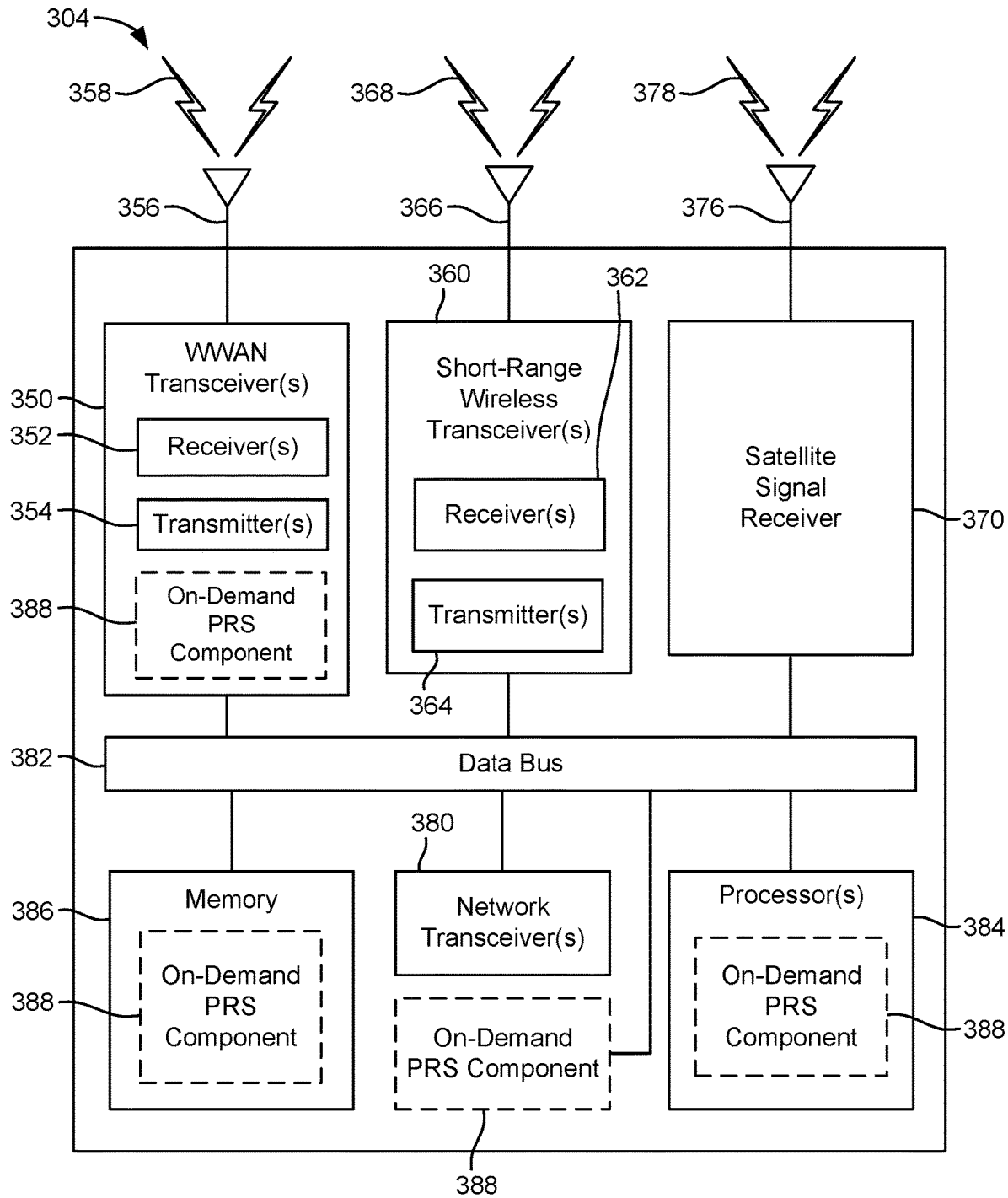
Figure 3C:
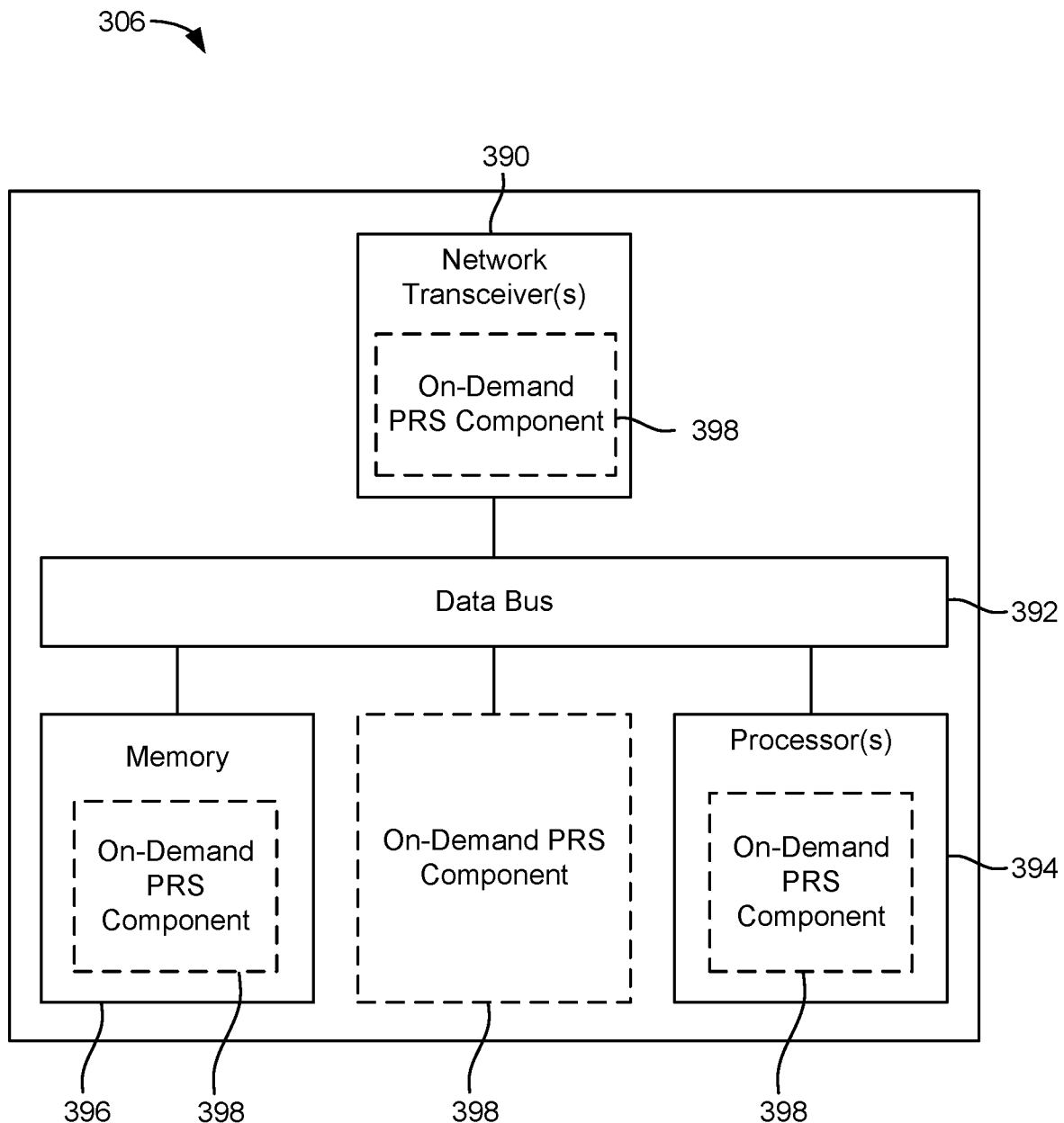

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 may include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 may include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include on-demand PRS component 342, 388, and 398, respectively. The on-demand PRS component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the on-demand PRS component 342, 388, and 398 may be external to the processors 332, 384, and 394 (e.g., part of a modem processing system, integrated with another processing system, etc.). Alternatively, the on-demand PRS component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the on-demand PRS component 342, which may be, for example, part of the one or more WWAN transceivers 310, the memory 340, the one or more processors 332, or any combination thereof, or may be a standalone component. FIG. 3B illustrates possible locations of the on-demand PRS component 388, which may be, for example, part of the one or more WWAN transceivers 350, the memory 386, the one or more processors 384, or any combination thereof, or may be a standalone component. FIG. 3C illustrates possible locations of the on-demand PRS component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the on-demand PRS component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Note that the UE 302 illustrated in FIG. 3A may represent a "low-tier" UE or a "premium" UE. As described further below, while low-tier and premium UEs may have the same types of components (e.g., both may have WWAN transceivers 310, processing systems 332, memory components 340, etc.), the components may have different degrees of functionality (e.g., increased or decreased performance, more or fewer capabilities, etc.) depending on whether the UE 302 corresponds to a low-tier UE or a premium UE.

UEs may be classified as low-tier UEs (e.g., wearables, such as smart watches, glasses, rings, etc.) and premium UEs (e.g., smartphones, tablet computers, laptop computers, etc.). Low-tier UEs may alternatively be referred to as reduced-capability NR UEs, reduced-capability UEs, NR light UEs, light UEs, NR super light UEs, or super light UEs. Premium UEs may alternatively be referred to as full-capability UEs or simply UEs. Low-tier UEs generally have lower baseband processing capability, fewer antennas (e.g., one receiver antenna as baseline in FR1 or FR2, two receiver antennas optionally), lower operational bandwidth capabilities (e.g., 20 MHz for FR1 with no supplemental uplink or carrier aggregation, or 50 or 100 MHz for FR2), only half duplex frequency division duplex (HD-FDD) capability, smaller HARQ buffer, reduced physical downlink control channel (PDCCH) monitoring, restricted modulation (e.g., 64 QAM for downlink and 16 QAM for uplink), relaxed processing timeline requirements, and/or lower uplink transmission power compared to premium UEs. Different UE tiers can be differentiated by UE category and/or by UE capability. For example, certain types of UEs may be assigned a classification (e.g., by the original equipment manufacturer (OEM), the applicable wireless communications standards, or the like) of "low-tier" and other types of UEs may be assigned a classification of "premium." Certain tiers of UEs may also report their type (e.g., "low-tier" or "premium") to the network. Additionally, certain resources and/or channels may be dedicated to certain types of UEs.

As will be appreciated, the accuracy of low-tier UE positioning may be limited. For example, a low-tier UE may operate on a reduced bandwidth, such as 5 to 20 MHz for wearable devices and "relaxed" IoT devices (i.e., IoT devices with relaxed, or lower, capability parameters, such as lower throughput, relaxed delay requirements, lower energy consumption, etc.), which results in lower positioning accuracy. As another example, a low-tier UE's receive processing capability may be limited due to its lower cost RF/baseband. As such, the reliability of measurements and positioning computations would be reduced. In addition, such a low-tier UE may not be able to receive multiple PRS from multiple TRPs, further reducing positioning accuracy. As yet another example, the transmit power of a low-tier UE may be reduced, meaning there would be a lower quality of uplink measurements for low-tier UE positioning.

Premium UEs generally have a larger form factor and are costlier than low-tier UEs, and have more features and capabilities than low-tier UEs. For example, with respect to positioning, a premium UE may operate on the full PRS bandwidth, such as 100 MHz, and measure PRS from more TRPs than low-tier UEs, both of which result in higher positioning accuracy. As another example, a premium UE's receive processing capability may be higher (e.g., faster) due to its higher-capability RF/baseband. In addition, the transmit power of a premium UE may be higher than that of a low-tier UE. As such, the reliability of measurements and positioning computations would be increased.

Figure 4:
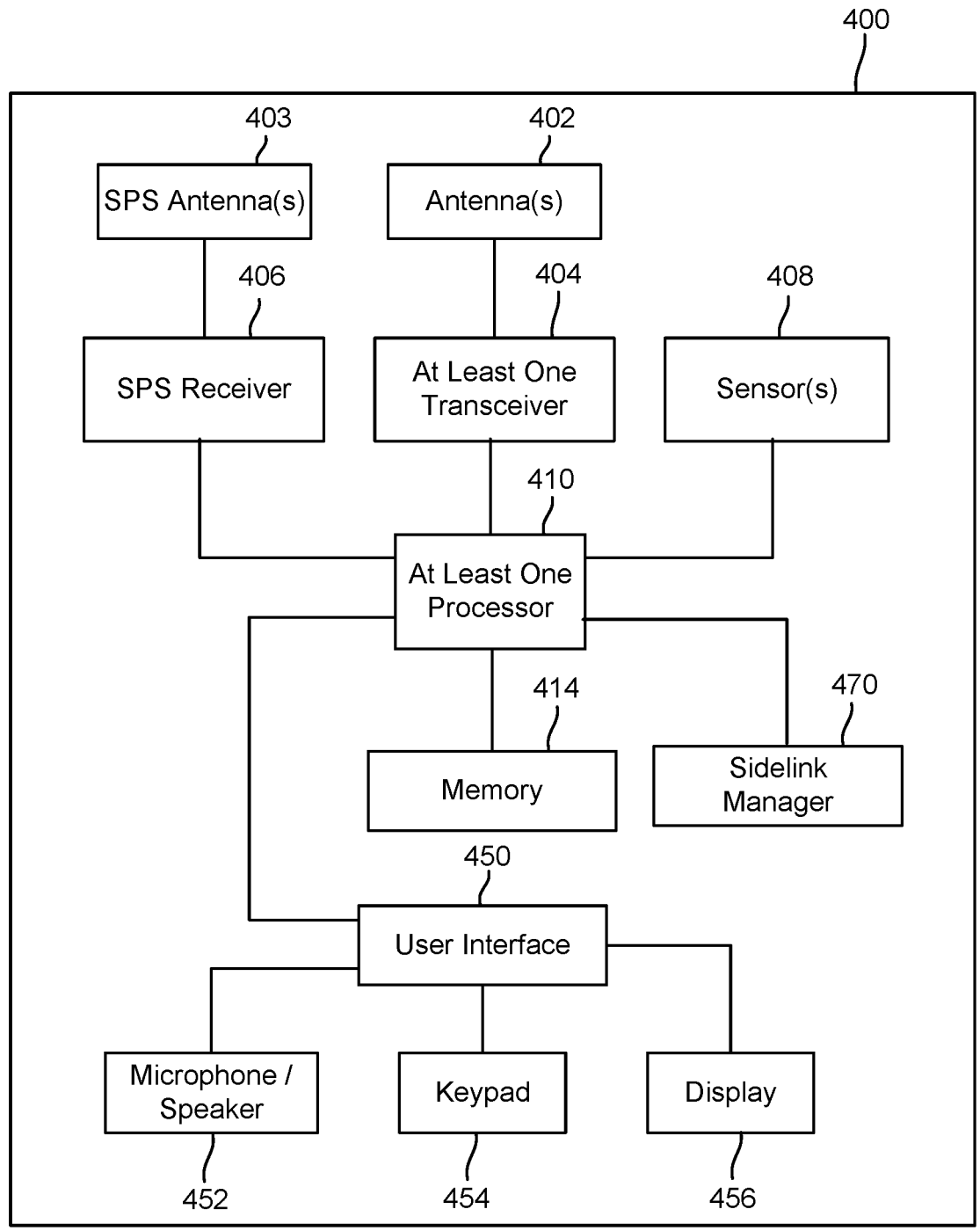
FIG. 4 is a block diagram illustrating various components of an example user equipment (UE), according to aspects of the disclosure.

FIG. 4 is a block diagram illustrating various components of an example UE 400, according to aspects of the disclosure. In an aspect, the UE 400 may correspond to any of the UEs described herein (e.g., an example implementation of UE 302, etc.). As a specific example, the UE 400 may be a V-UE, such as V-UE 160 in FIG. 1. For the sake of simplicity, the various features and functions illustrated in the block diagram of FIG. 4 are connected together using a common data bus that is meant to represent that these various features and functions are operatively coupled together. Those skilled in the art will recognize that other connections, mechanisms, features, functions, or the like, may be provided and adapted as necessary to operatively couple and configure an actual UE. Further, it is also recognized that one or more of the features or functions illustrated in the example of FIG. 4 may be further subdivided, or two or more of the features or functions illustrated in FIG. 4 may be combined.

The UE 400 may include at least one transceiver 404 connected to one or more antennas 402 and providing means for communicating (e.g., means for transmitting, means for receiving, means for measuring, means for tuning, means for refraining from transmitting, etc.) with other network nodes, such as V-UEs (e.g., V-UEs 160), infrastructure access points (e.g., roadside access point 164), P-UEs (e.g., UEs 104), base stations (e.g., base stations 102), etc., via at least one designated RAT (e.g., cV2X or IEEE 802.11p) over one or more communication links (e.g., communication links 120, sidelinks 162, 166, 168, mmW communication link 184). The at least one transceiver 404 may be variously configured for transmitting and encoding signals (e.g., messages, indications, information, and so on), and, conversely, for receiving and decoding signals (e.g., messages, indications, information, pilots, and so on) in accordance with the designated RAT. In an aspect, the at least one transceiver 404 and the antenna(s) 402 may form a (wireless) communication interface of the UE 400.

As used herein, a "transceiver" may include at least one transmitter and at least one receiver in an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antenna(s) 402), such as an antenna array, that permits the UE 400 to perform transmit "beamforming," as described herein. Similarly, a receiver may include or be coupled to a plurality of antennas (e.g., antenna(s) 402), such as an antenna array, that permits the UE 400 to perform receive beamforming, as described herein. In an aspect, the transmitter(s) and receiver(s) may share the same plurality of antennas (e.g., antenna(s) 402), such that the UE 400 can only receive or transmit at a given time, not both at the same time. In some cases, a transceiver may not provide both transmit and receive functionalities. For example, a low functionality receiver circuit may be employed in some designs to reduce costs when providing full communication is not necessary (e.g., a receiver chip or similar circuitry simply providing low-level sniffing).

The UE 400 may also include a satellite positioning system (SPS) receiver 406. The SPS receiver 406 may be connected to one or more SPS antennas 403 and may provide means for receiving and/or measuring satellite signals. The SPS receiver 406 may comprise any suitable hardware and/or software for receiving and processing SPS signals, such as global positioning system (GPS) signals. The SPS receiver 406 requests information and operations as appropriate from the other systems, and performs the calculations necessary to determine the UE's 400 position using measurements obtained by any suitable SPS algorithm.

One or more sensors 408 may be coupled to at least one processor 410 and may provide means for sensing or detecting information related to the state and/or environment of the UE 400, such as speed, heading (e.g., compass heading), headlight status, gas mileage, etc. By way of example, the one or more sensors 408 may include a speedometer, a tachometer, an accelerometer (e.g., a microelectromechanical systems (MEMS) device), a gyroscope, a geomagnetic sensor (e.g., a compass), an altimeter (e.g., a barometric pressure altimeter), etc.

The at least one processor 410 may include one or more central processing units (CPUs), microprocessors, microcontrollers, ASICs, processing cores, digital signal processors (DSPs), field-programmable gate arrays (FPGAs), or the like that provide processing functions, as well as other calculation and control functionality. The at least one processor 410 may therefore provide means for processing, such as means for determining, means for calculating, means for receiving, means for transmitting, means for indicating, etc. The at least one processor 410 may include any form of logic suitable for performing, or causing the components of the UE 400 to perform, at least the techniques described herein.

The at least one processor 410 may also be coupled to a memory 414 providing means for storing (including means for retrieving, means for maintaining, etc.) data and software instructions for executing programmed functionality within the UE 400. The memory 414 may be on-board the at least one processor 410 (e.g., within the same integrated circuit (IC) package), and/or the memory 414 may be external to the at least one processor 410 and functionally coupled over a data bus.

The UE 400 may include a user interface 450 that provides any suitable interface systems, such as a microphone/speaker 452, keypad 454, and display 456 that allow user interaction with the UE 400. The microphone/speaker 452 may provide for voice communication services with the UE 400. The keypad 454 may comprise any suitable buttons for user input to the UE 400. The display 456 may comprise any suitable display, such as, for example, a backlit liquid crystal display (LCD), and may further include a touch screen display for additional user input modes. The user interface 450 may therefore be a means for providing indications (e.g., audible and/or visual indications) to a user and/or for receiving user input (e.g., via user actuation of a sensing device such a keypad, a touch screen, a microphone, and so on).

In an aspect, the UE 400 may include a sidelink manager 470 coupled to the at least one processor 410. The sidelink manager 470 may be a hardware, software, or firmware component that, when executed, causes the UE 400 to perform the operations described herein. For example, the sidelink manager 470 may be a software module stored in memory 414 and executable by the at least one processor 410. As another example, the sidelink manager 470 may be a hardware circuit (e.g., an ASIC, a field-programmable gate array (FPGA), etc.) within the UE 400.

Figure 5:
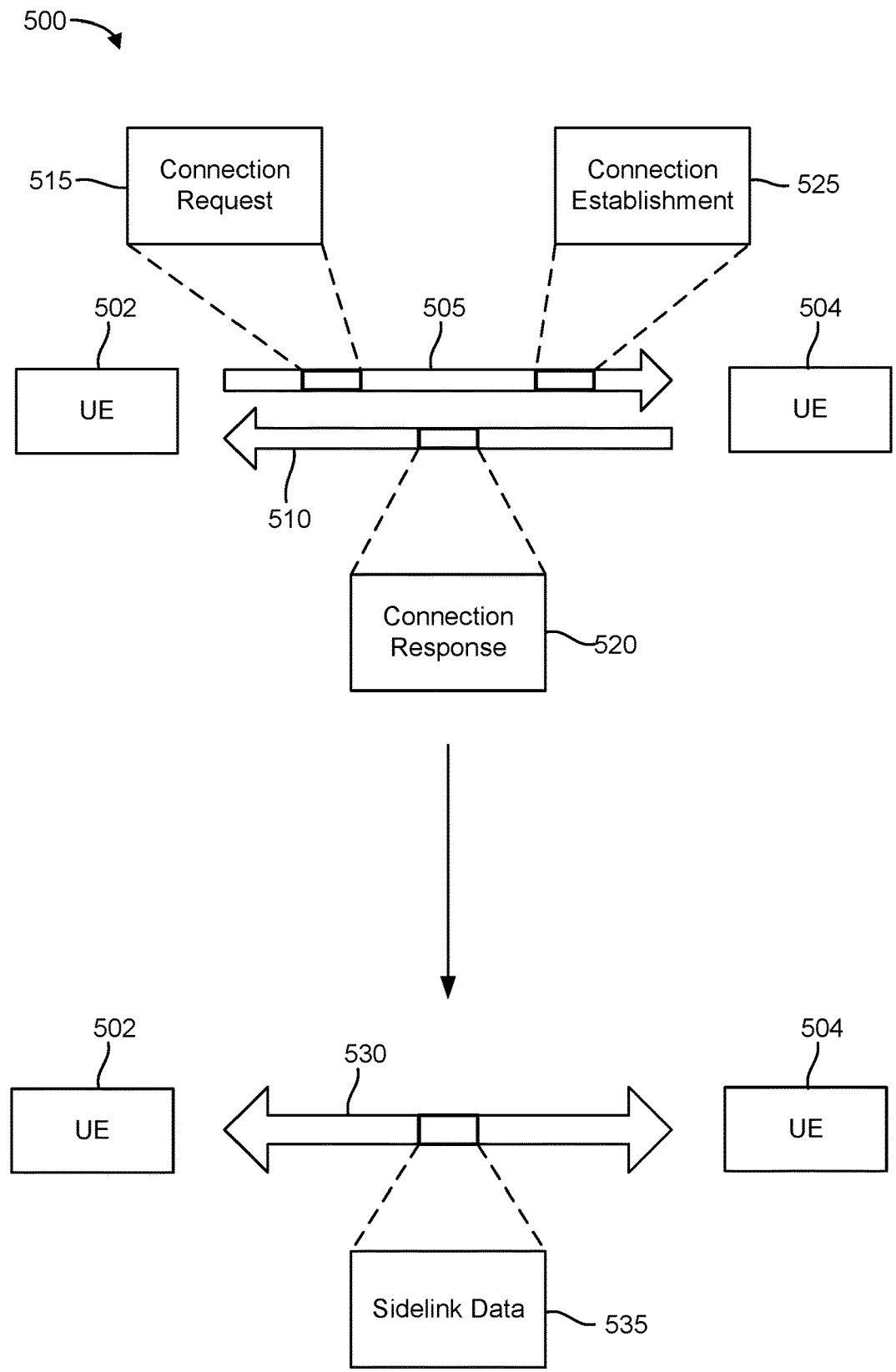
FIG. 5 illustrates an example of a wireless communications system that supports unicast sidelink establishment, according to aspects of the disclosure.

FIG. 5 illustrates an example of a wireless communications system 500 that supports wireless unicast sidelink establishment, according to aspects of the disclosure. In some examples, wireless communications system 500 may implement aspects of wireless communications systems 100, 200, and 250. Wireless communications system 500 may include a first UE 502 and a second UE 504, which may be examples of any of the UEs described herein. As specific examples, UEs 502 and 504 may correspond to V-UEs 160 in FIG. 1, UE 190 and UE 104 in FIG. 1 connected over D2D P2P link 192, or UEs 204 in FIGS. 2A and 2B.

In the example of FIG. 5, the UE 502 may attempt to establish a unicast connection over a sidelink with the UE 504, which may be a V2X sidelink between the UE 502 and UE 504. As specific examples, the established sidelink connection may correspond to sidelinks 162 and/or 168 in FIG. 1. The sidelink connection may be established in an omni-directional frequency range (e.g., FR1) and/or a mmW frequency range (e.g., FR2). In some cases, the UE 502 may be referred to as an initiating UE that initiates the sidelink connection procedure, and the UE 504 may be referred to as a target UE that is targeted for the sidelink connection procedure by the initiating UE.

For establishing the unicast connection, access stratum (AS) (a functional layer in the UMTS and LTE protocol stacks between the RAN and the UE that is responsible for transporting data over wireless links and managing radio resources, and which is part of Layer 2) parameters may be configured and negotiated between the UE 502 and UE 504. For example, a transmission and reception capability matching may be negotiated between the UE 502 and UE 504. Each UE may have different capabilities (e.g., transmission and reception, 64 quadrature amplitude modulation (QAM), transmission diversity, carrier aggregation (CA), supported communications frequency band(s), etc.). In some cases, different services may be supported at the upper layers of corresponding protocol stacks for UE 502 and UE 504. Additionally, a security association may be established between UE 502 and UE 504 for the unicast connection. Unicast traffic may benefit from security protection at a link level (e.g., integrity protection). Security requirements may differ for different wireless communications systems. For example, V2X and Uu systems may have different security requirements (e.g., Uu security does not include confidentiality protection). Additionally, IP configurations (e.g., IP versions, addresses, etc.) may be negotiated for the unicast connection between UE 502 and UE 504.

In some cases, UE 504 may create a service announcement (e.g., a service capability message) to transmit over a cellular network (e.g., cV2X) to assist the sidelink connection establishment. Conventionally, UE 502 may identify and locate candidates for sidelink communications based on a basic service message (BSM) broadcasted unencrypted by nearby UEs (e.g., UE 504). The BSM may include location information, security and identity information, and vehicle information (e.g., speed, maneuver, size, etc.) for the corresponding UE. However, for different wireless communications systems (e.g., D2D or V2X communications), a discovery channel may not be configured so that UE 502 is able to detect the BSM(s). Accordingly, the service announcement transmitted by UE 504 and other nearby UEs (e.g., a discovery signal) may be an upper layer signal and broadcasted (e.g., in an NR sidelink broadcast). In some cases, the UE 504 may include one or more parameters for itself in the service announcement, including connection parameters and/or capabilities it possesses. The UE 502 may then monitor for and receive the broadcasted service announcement to identify potential UEs for corresponding sidelink connections. In some cases, the UE 502 may identify the potential UEs based on the capabilities each UE indicates in their respective service announcements.

The service announcement may include information to assist the UE 502 (e.g., or any initiating UE) to identify the UE transmitting the service announcement (UE 504 in the example of FIG. 5). For example, the service announcement may include channel information where direct communication requests may be sent. In some cases, the channel information may be RAT-specific (e.g., specific to LTE or NR) and may include a resource pool within which UE 502 transmits the communication request. Additionally, the service announcement may include a specific destination address for the UE (e.g., a Layer 2 destination address) if the destination address is different from the current address (e.g., the address of the streaming provider or UE transmitting the service announcement). The service announcement may also include a network or transport layer for the UE 502 to transmit a communication request on. For example, the network layer (also referred to as "Layer 3" or "L3") or the transport layer (also referred to as "Layer 4" or "L4") may indicate a port number of an application for the UE transmitting the service announcement. In some cases, no IP addressing may be needed if the signaling (e.g., PC5 signaling) carries a protocol (e.g., a real-time transport protocol (RTP)) directly or gives a locally-generated random protocol. Additionally, the service announcement may include a type of protocol for credential establishment and QoS-related parameters.

After identifying a potential sidelink connection target (UE 504 in the example of FIG. 5), the initiating UE (UE 502 in the example of FIG. 5) may transmit a connection request 515 to the identified target UE 504. In some cases, the connection request 515 may be a first RRC message transmitted by the UE 502 to request a unicast connection with the UE 504 (e.g., an "RRCDirectConnectionSetupRequest" message). For example, the unicast connection may utilize the PC5 interface for the sidelink, and the connection request 515 may be an RRC connection setup request message. Additionally, the UE 502 may use a sidelink signaling radio bearer 505 to transport the connection request 515.

After receiving the connection request 515, the UE 504 may determine whether to accept or reject the connection request 515. The UE 504 may base this determination on a transmission/reception capability, an ability to accommodate the unicast connection over the sidelink, a particular service indicated for the unicast connection, the contents to be transmitted over the unicast connection, or a combination thereof. For example, if the UE 502 wants to use a first RAT to transmit or receive data, but the UE 504 does not support the first RAT, then the UE 504 may reject the connection request 515. Additionally or alternatively, the UE 504 may reject the connection request 515 based on being unable to accommodate the unicast connection over the sidelink due to limited radio resources, a scheduling issue, etc. Accordingly, the UE 504 may transmit an indication of whether the request is accepted or rejected in a connection response 520. Similar to the UE 502 and the connection request 515, the UE 504 may use a sidelink signaling radio bearer 510 to transport the connection response 520. Additionally, the connection response 520 may be a second RRC message transmitted by the UE 504 in response to the connection request 515 (e.g., an "RRCDirectConnectionResponse" message).

In some cases, sidelink signaling radio bearers 505 and 510 may be the same sidelink signaling radio bearer or may be separate sidelink signaling radio bearers. Accordingly, a radio link control (RLC) layer acknowledged mode (AM) may be used for sidelink signaling radio bearers 505 and 510. A UE that supports the unicast connection may listen on a logical channel associated with the sidelink signaling radio bearers. In some cases, the AS layer (i.e., Layer 2) may pass information directly through RRC signaling (e.g., control plane) instead of a V2X layer (e.g., data plane).

If the connection response 520 indicates that the UE 504 accepted the connection request 515, the UE 502 may then transmit a connection establishment 525 message on the sidelink signaling radio bearer 505 to indicate that the unicast connection setup is complete. In some cases, the connection establishment 525 may be a third RRC message (e.g., an "RRCDirectConnectionSetupComplete" message). Each of the connection request 515, the connection response 520, and the connection establishment 525 may use a basic capability when being transported from one UE to the other UE to enable each UE to be able to receive and decode the corresponding transmission (e.g., the RRC messages).

Additionally, identifiers may be used for each of the connection request 515, the connection response 520, and the connection establishment 525. For example, the identifiers may indicate which UE 502/504 is transmitting which message and/or for which UE 502/504 the message is intended. For physical (PHY) layer channels, the RRC signaling and any subsequent data transmissions may use the same identifier (e.g., Layer 2 IDs). However, for logical channels, the identifiers may be separate for the RRC signaling and for the data transmissions. For example, on the logical channels, the RRC signaling and the data transmissions may be treated differently and have different acknowledgement (ACK) feedback messaging. In some cases, for the RRC messaging, a physical layer ACK may be used for ensuring the corresponding messages are transmitted and received properly.

One or more information elements may be included in the connection request 515 and/or the connection response 520 for UE 502 and/or UE 504, respectively, to enable negotiation of corresponding AS layer parameters for the unicast connection. For example, the UE 502 and/or UE 504 may include packet data convergence protocol (PDCP) parameters in a corresponding unicast connection setup message to set a PDCP context for the unicast connection. In some cases, the PDCP context may indicate whether or not PDCP duplication is utilized for the unicast connection. Additionally, the UE 502 and/or UE 504 may include RLC parameters when establishing the unicast connection to set an RLC context for the unicast connection. For example, the RLC context may indicate whether an AM (e.g., a reordering timer (t-reordering) is used) or an unacknowledged mode (UM) is used for the RLC layer of the unicast communications.

Additionally, the UE 502 and/or UE 504 may include medium access control (MAC) parameters to set a MAC context for the unicast connection. In some cases, the MAC context may enable resource selection algorithms, a hybrid automatic repeat request (HARQ) feedback scheme (e.g., ACK or negative ACK (NACK) feedback), parameters for the HARQ feedback scheme, carrier aggregation, or a combination thereof for the unicast connection. Additionally, the UE 502 and/or UE 504 may include PHY layer parameters when establishing the unicast connection to set a PHY layer context for the unicast connection. For example, the PHY layer context may indicate a transmission format (unless transmission profiles are included for each UE 502/504) and a radio resource configuration (e.g., bandwidth part (BWP), numerology, etc.) for the unicast connection. These information elements may be supported for different frequency range configurations (e.g., FR1 and FR2).

In some cases, a security context may also be set for the unicast connection (e.g., after the connection establishment 525 message is transmitted). Before a security association (e.g., security context) is established between the UE 502 and UE 504, the sidelink signaling radio bearers 505 and 510 may not be protected. After a security association is established, the sidelink signaling radio bearers 505 and 510 may be protected. Accordingly, the security context may enable secure data transmissions over the unicast connection and the sidelink signaling radio bearers 505 and 510. Additionally, IP layer parameters (e.g., link-local IPv4 or IPv6 addresses) may also be negotiated. In some cases, the IP layer parameters may be negotiated by an upper layer control protocol running after RRC signaling is established (e.g., the unicast connection is established). As noted above, the UE 504 may base its decision on whether to accept or reject the connection request 515 on a particular service indicated for the unicast connection and/or the contents to be transmitted over the unicast connection (e.g., upper layer information). The particular service and/or contents may be also indicated by an upper layer control protocol running after RRC signaling is established.

After the unicast connection is established, the UE 502 and UE 504 may communicate using the unicast connection over a sidelink 530, where sidelink data 535 is transmitted between the two UEs 502 and 504. The sidelink 530 may correspond to sidelinks 162 and/or 168 in FIG. 1. In some cases, the sidelink data 535 may include RRC messages transmitted between the two UEs 502 and 504. To maintain this unicast connection on sidelink 530, UE 502 and/or UE 504 may transmit a keep alive message (e.g., "RRCDirectLinkAlive" message, a fourth RRC message, etc.). In some cases, the keep alive message may be triggered periodically or on-demand (e.g., event-triggered). Accordingly, the triggering and transmission of the keep alive message may be invoked by UE 502 or by both UE 502 and UE 504. Additionally or alternatively, a MAC control element (CE) (e.g., defined over sidelink 530) may be used to monitor the status of the unicast connection on sidelink 530 and maintain the connection. When the unicast connection is no longer needed (e.g., UE 502 travels far enough away from UE 504), either UE 502 and/or UE 504 may start a release procedure to drop the unicast connection over sidelink 530. Accordingly, subsequent RRC messages may not be transmitted between UE 502 and UE 504 on the unicast connection.

Various physical sidelink channels can be used for sidelink communication and/or RF-EH, including Physical sidelink control channel (PSCCH), Physical sidelink shared channel (PSSCH), Physical sidelink feedback channel (PSFCH), and Physical sidelink broadcast channel (PSBCH). Various sidelink reference signals can be used for sidelink communication and/or RF-EH, including Demodulation RS (DMRS) for PSCCH, Demodulation RS (DMRS) for PSSCH, Demodulation RS (DMRS) for PSBCH, Channel state information RS (CSI-RS), Primary synchronization signal (S-PSS), Secondary synchronization signal (S-SSS), and Phase-tracking RS (PTRS) for FR2 only.

In some designs, a slot may include 14 OFDM symbols including resource arranged in accordance with a time division duplex (TDD) resource configuration. In some designs, sidelink can be configured (e.g., pre-configured or dynamically configured) to occupy fewer than 14 symbols in a slot. In some designs, the first symbol is repeated on the preceding symbol for automatic gain control (AGC) settling. In some designs, the sub-channel size can be configured (e.g., pre-configured or dynamically configured) to {10, 15, 20, 25, 50, 75, 100} physical resource blocks (PRBs). In some designs, the PSCCH and PSSCH are always transmitted in the same slot.

$N_{subchannel}^{SL}$ In some designs, to receive a sidelink packet, a UE performs a blind search in all sidelink sub-channels. The number of subchannel is typically small, e.g., 1-27 subchannels, so that blind searching all subchannels still feasible. In some designs, PSSCH can occupy up to contiguous subchannels. In some designs, PSCCH can occupy up to one subchannel with the lowest subchannel index. In some designs, a Pt stage SCI is transmitted in PSCCH containing information about $N_{subchannel}^{SL}$ PSSCH bandwidth and resource reservations in future slots. In some designs, a $2^{nd}$ stage SCI can be found and decoded after decoding PSCCH, $N_{subchannel}^{SL}$ source ID and destination ID are used to distinguish whether the $N_{subchannel}^{SL}$ packet is for the UE and coming from which UE. In some designs, the subchannel size in V2X may be large, e.g., minimum 10 RBs. In some designs, cellular (C-V2X) intends the UEs to decode all transmissions and requires blind searching of all subchannels.

Figure 6A:
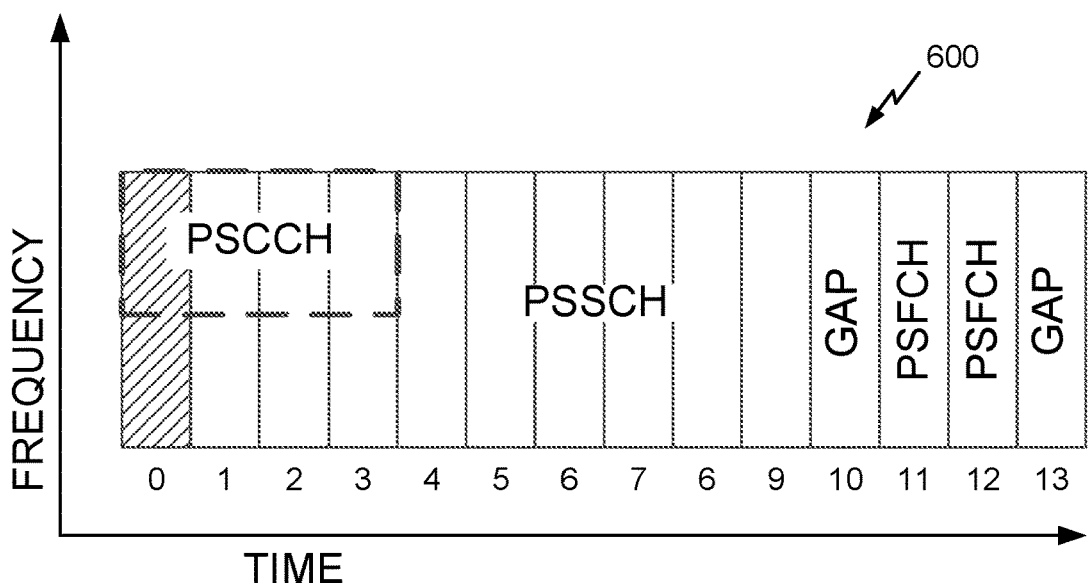
FIG. 6A illustrates one example of a TDD sidelink (PC5) resource configuration in accordance with an aspect of the disclosure.

FIG. 6A illustrates one example of a TDD sidelink (PC5) resource configuration 600 in accordance with an aspect of the disclosure. The TDD sidelink (PC5) resource configuration 600 may include 14 OFDM symbols denoted as symbols 0 through 13. In the TDD sidelink (PC5) resource configuration 600 of FIG. 6A, PSCCH is allocated to symbols 0-3 (e.g., in a first bandwidth), PSSCH is allocated to symbols 0-3 (e.g., in a second bandwidth) and to symbols 4-9, a gap is defined in symbol 10, PSFCH is allocated to symbols 11-12, and a gap is defined in symbol 13. The TDD sidelink (PC5) resource configuration 600 is only one example resource configuration, and other configurations are possible in other aspects.

Referring to FIG. 6A, with respect to SCI 1_0 in PSCCH, a frequency domain resource allocation (FDRA) may be configured with $$\left\lceil \log \frac{N_{subchannel}^{SL}(N_{subchannel}^{SL} + 1)}{2} \right\rceil$$

bits for 2 reservations, or $$\left\lceil \log \frac{N_{subchannel}^{SL}(N_{subchannel}^{SL} + 1)(2N_{subchannel}^{SL} + 1)}{6} \right\rceil$$

bits for 3 reservations, and a time domain resource allocation (TDRA) may be configured with 5 bits for 2 reservations or 9 bits for 3 reservations.

Figure 6B:
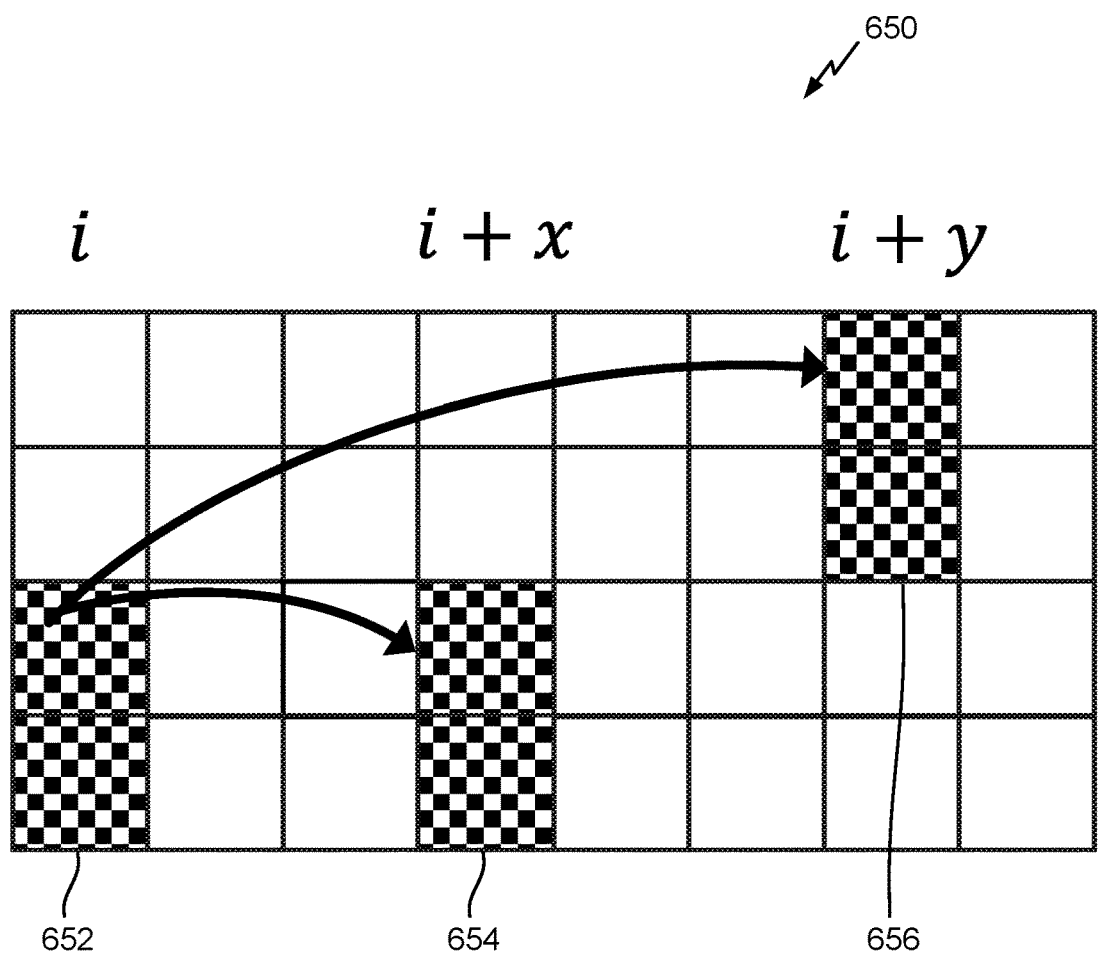
FIG. 6B illustrates an SCI-based resource reservation scheme in accordance with an aspect of the disclosure.

FIG. 6B illustrates an SCI-based resource reservation scheme 650 in accordance with an aspect of the disclosure. In FIG. 6B, a first reservation 652 is defined at slot i, a second reservation 654 is offset from slot i by x slots (slot i+x) where 0<x≤31, and a third reservation 656 is offset from slot I by y slots (slot i+y) where x<y≤31.

Referring to FIGS. 6A-6B, in some designs, PSCCH is (pre)configured to occupy {10, 12, 15, 20, 25} PRBs, limited to a single sub-channel. In some designs, PSCCH duration is (pre)configured to 2 or 3 symbols. In some designs, a sub-channel can occupy {10, 15, 20, 25, 50, 75, 100} PRBs. In some designs, a number of subchannels can be 1-27 in a resource pool (RP). In some designs, PSCCH size is fixed for a resource pool (e.g., PSCCCH size may occupy 10% to 100% of one subchannel (first 2 or 3 symbols), depending on configuration). In some designs, PSSCH occupies at least 1 subchannel and contains $2^{nd}$ stage SCI.

Figure 7:
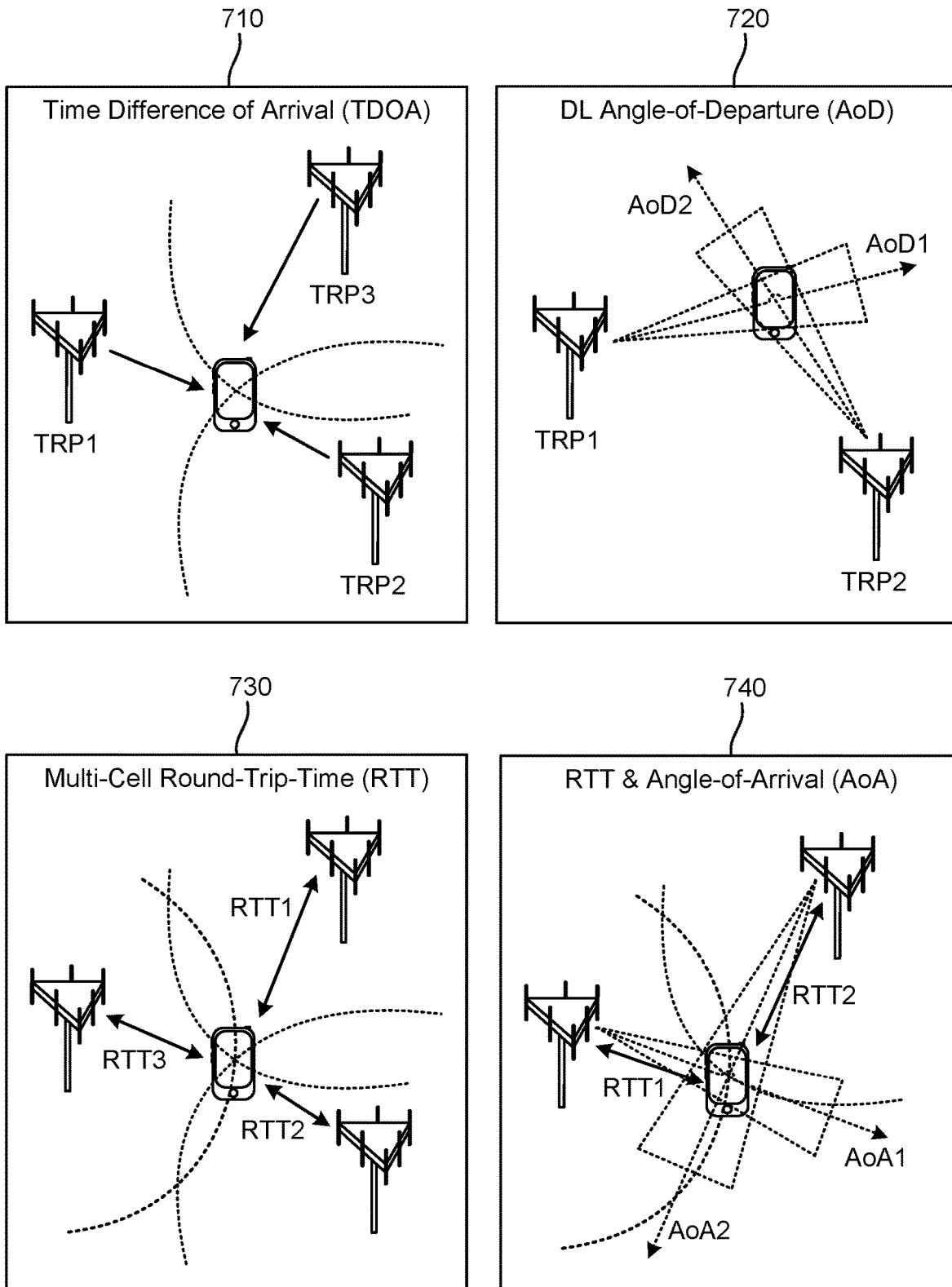
FIG. 7 illustrates examples of various positioning methods, according to aspects of the disclosure.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 7 illustrates examples of various positioning methods, according to aspects of the disclosure. In an OTDOA or DL-TDOA positioning procedure, illustrated by scenario 710, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location.

For DL-AoD positioning, illustrated by scenario 720, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) time difference. The initiator calculates the difference between the transmission time of the RTT measurement signal and the ToA of the RTT response signal, referred to as the transmission-to-reception (Tx-Rx) time difference. The propagation time (also referred to as the "time of flight") between the initiator and the responder can be calculated from the Tx-Rx and Rx-Tx time differences. Based on the propagation time and the known speed of light, the distance between the initiator and the responder can be determined. For multi-RTT positioning, illustrated by scenario 730, a UE performs an RTT procedure with multiple base stations to enable its location to be determined (e.g., using multilateration) based on the known locations of the base stations. RTT and multi-RTT methods can be combined with other positioning techniques, such as UL-AoA, illustrated by scenario 740, and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/ TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 8:
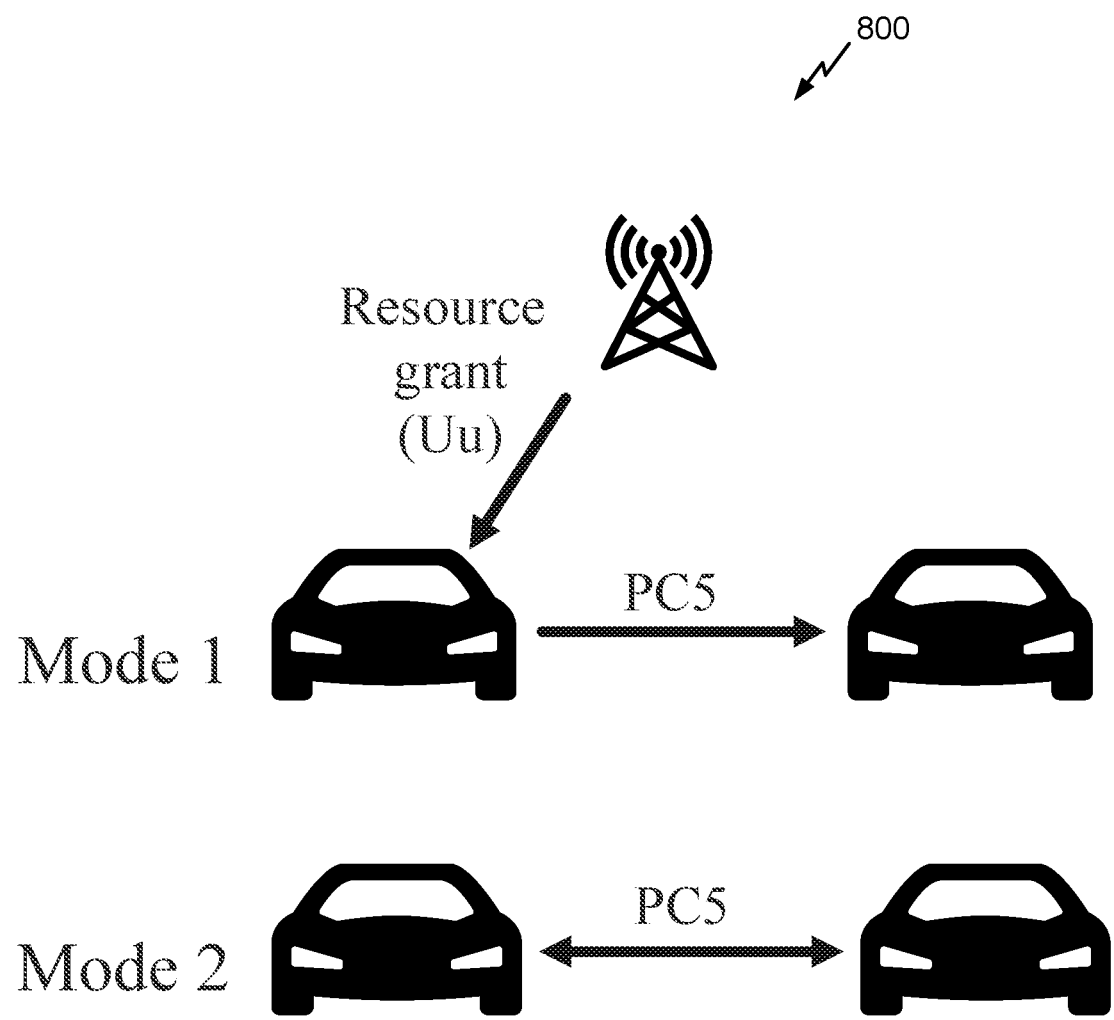
FIG. 8 illustrates sidelink communication scheduling (or resource allocation) schemes in accordance with aspects of the disclosure.

FIG. 8 illustrates sidelink communication scheduling (or resource allocation) schemes 800 in accordance with aspects of the disclosure. In some designs, resource allocation in V2X may be implemented via Mode 1, where gNB assigns Tx resources for sidelink communications through DCI 3_0. In other designs, resource allocation in V2X may be implemented via Mode 2, where a transmitting UE autonomously decides resources for sidelink communications. In some designs, the receiving UE behavior is the same for both Modes 1 and 2.

Referring to FIG. 8, Mode 1 supports dynamic grants (DG), configured grants (CG) type 1, and CG type 2. In some designs, CG type 1 is activated via RRC signaling from gNB. DCI 3_0 is transmitted by gNB to allocation time and frequency resources and indicates transmission timing. In some designs, the modulation and coding scheme (MCS) MCS is up to UE within limit set by gNB. In Mode 2, the transmitting UE performs channel sensing by blindly decoding all PSCCH channels and finds out reserved resources by other sidelink transmissions. The transmitting UE reports available resources to upper layer and upper layer decides resource usage.

In some designs, in industrial IoT (IIoT), sidelink can enable direct programmable logical controller (PLC) and sensors/actuators (SAs) communications. Wireless PLC is desired for flexible and simple deployment. In some designs, each PLC controls 20-50 SAs. In some designs, IIoT has low latency 1-2 ms and ultra-reliability requirement $10^{-6}$ error rate. In some designs, communication through gNB would require multiple OTAs, affecting latency and reliability.

IIoT traffics are typically deterministic and with small packet size 32-256 bytes. The required bandwidth is thus low, e.g., 2 RBs might be sufficient for some cases. SAs may have constraint on UE capability in terms of bandwidth and processing power. Overall bandwidth may be large for IIoT with dedicated frequency bands and/or unlicensed bands. In some designs, SAs need not detect/monitor all transmissions. In some designs, PSCCH has to meet stringent IIoT requirement. IIoT networks may also be associated with challenging RF environments due to blockage and interference.

As noted above, a $1^{st}$ stage SCI may be included in PSCCH. The $1^{st}$ stage SCI may alternatively be referred to as SCI 1-A. In some designs, SCI 1-A shall be decoded by intended RXs and other sidelink UEs (particularly in Mode 2) to allow channel sensing and avoid resource collision. In some designs, SCI 1-A may be configured as follows:

Priority 3 bits
Frequency resource assignment, bits depending on #of slot reservations and #subchannels
Time resource assignment, 5 or 9 bits for 2 or 3 reservations
Resource reservation period, bits depending on #allowed periods
DM-RS pattern, bits depending on #configured patterns
SCI 2 format, 2 bits
Beta offset for SCI 2 rate matching, 2 bits
DM-RS port, 1 bit indicating one or two data layers
MCS, 5 bits
Additional MCS table, 0-2 bits
PSFCH overhead indicator, 0 or 1 bit
Reserved bits, bits up to upper layer As noted above, a $2^{nd}$ stage SCI may be included in PSSCH. The $2^{nd}$ stage SCI may alternatively be referred to as SCI 2. In some designs, SCI 2 is intended to help receiving UEs decode the PSSCH. In some designs, SCI 2 may be configured as follows:

HARQ ID, bits depending on #HARQ process
NDI, 1 bit
RV-ID, 2 bits
Source ID, 8 bits
Dest. ID, 16 bits
HARQ enable/disable, 1 bit
SCI 2-A only fields: Cast type, 2 bits, broadcast, groupcast, unicast; CSI request, 1 bit
SCI 2-B only fields (NACK-only groupcast): Zone ID, 12 bits; Communication range, 4 bits In addition to the downlink-based, uplink-based, and downlink-and-uplink-based positioning methods, NR supports various sidelink positioning techniques. For example, link-level ranging signals can be used to estimate the distance between pairs of V-UEs or between a V-UE and a roadside unit (RSU), similar to a round-trip-time (RTT) positioning procedure.

Figure 9:
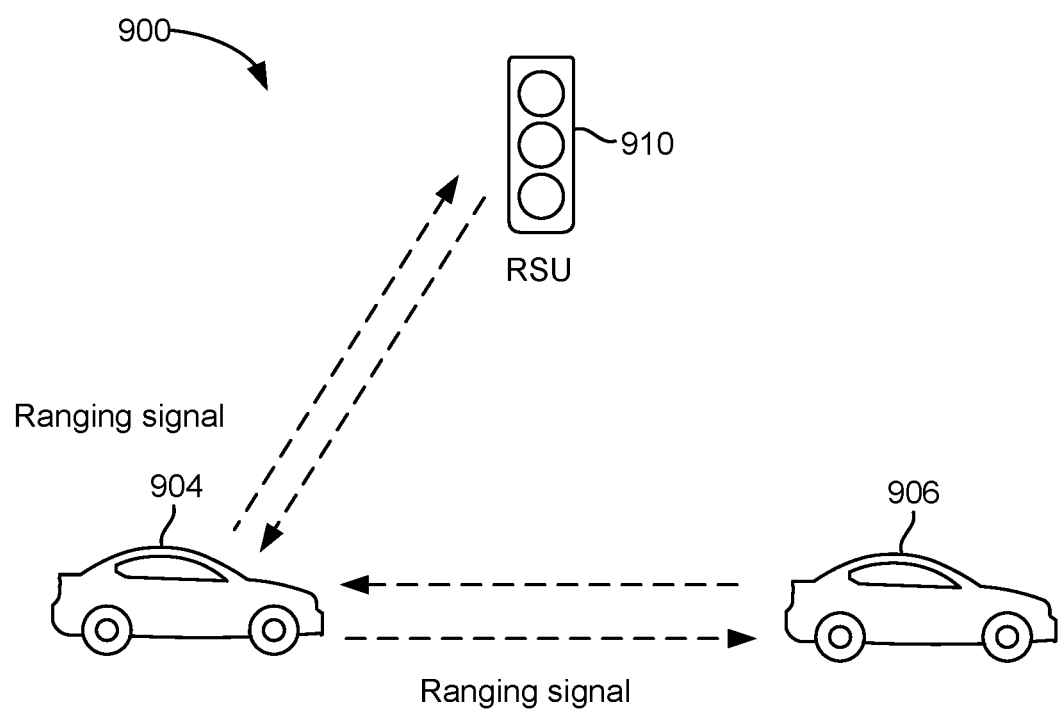
FIG. 9 illustrates an example wireless communication system in which a vehicle user equipment (V-UE) is exchanging ranging signals with a roadside unit (RSU) and another V-UE, according to aspects of the disclosure.

FIG. 9 illustrates an example wireless communication system 900 in which a V-UE 904 is exchanging ranging signals with an RSU 910 and another V-UE 906, according to aspects of the disclosure. As illustrated in FIG. 9, a wideband (e.g., FR1) ranging signal (e.g., a Zadoff Chu sequence) is transmitted by both end points (e.g., V-UE 904 and RSU 910 and V-UE 904 and V-UE 906). In an aspect, the ranging signals may be sidelink positioning reference signals (SL-PRS) transmitted by the involved V-UEs 904 and 906 on uplink resources. On receiving a ranging signal from a transmitter (e.g., V-UE 904), the receiver (e.g., RSU 910 and/or V-UE 906) responds by sending a ranging signal that includes a measurement of the difference between the reception time of the ranging signal and the transmission time of the response ranging signal, referred to as the reception-to-transmission (Rx-Tx) time difference measurement of the receiver.

Upon receiving the response ranging signal, the transmitter (or other positioning entity) can calculate the RTT between the transmitter and the receiver based on the receiver's Rx-Tx time difference measurement and a measurement of the difference between the transmission time of the first ranging signal and the reception time of the response ranging signal (referred to as the transmission-to-reception (Tx-Rx) time difference measurement of the transmitter). The transmitter (or other positioning entity) uses the RTT and the speed of light to estimate the distance between the transmitter and the receiver. If one or both of the transmitter and receiver are capable of beamforming, the angle between the V-UEs 904 and 906 may also be able to be determined. In addition, if the receiver provides its global positioning system (GPS) location in the response ranging signal, the transmitter (or other positioning entity) may be able to determine an absolute location of the transmitter, as opposed to a relative location of the transmitter with respect to the receiver.

As will be appreciated, ranging accuracy improves with the bandwidth of the ranging signals. Specifically, a higher bandwidth can better separate the different multipaths of the ranging signals.

Note that this positioning procedure assumes that the involved V-UEs are time-synchronized (i.e., their system frame time is the same as, or has a known offset relative to, the other V-UE(s)). In addition, although FIG. 9 illustrates two V-UEs, as will be appreciated, they need not be V-UEs, and may instead be any other type of UE capable of sidelink communication.

Figure 10:
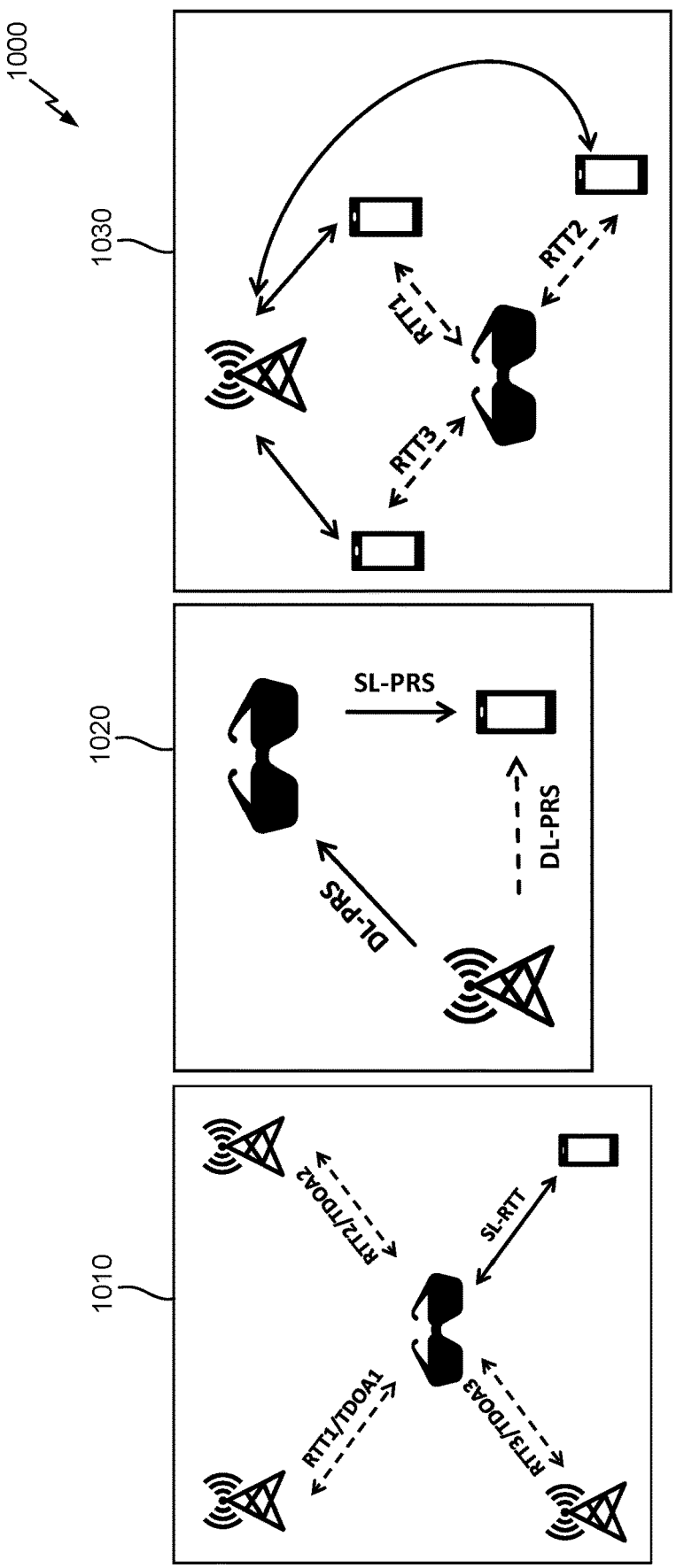
FIG. 10 illustrates other sidelink positioning schemes in accordance with aspects of the disclosure.

FIG. 10 illustrates other sidelink positioning schemes 1000 in accordance with aspects of the disclosure. In FIG. 10, each positioning scheme involves a target UE (in this case, a VR headset), at least one gNB, and at least one reference UE (e.g., a UE with a known location from a recent positioning fix, where such a location generally has a lower variance than a typical error estimate for UE position).

Referring to FIG. 10, scenario 1010 depicts a UE with a known location improving Uu positioning (e.g., RTT-based or TDOA-based) by providing an extra anchor. Scenario 1020 depicts positioning for a low-tier UE (e.g., VR headset) via the help from premium UEs (i.e., SL-only based positioning/ranging). Scenario 1030 depicts a relay or reference UE (with known location) participating in position estimation for a remote UE (e.g., VR headset) without UL PRS transmission in Uu. Each of the scenarios 1010-1030 may be broadly characterized as an SL-assisted positioning scheme.

The SL UEs that are assisting in position estimation of a target UE can impact various aspects associated with SL-assisted positioning, such as power consumption and/or position estimation accuracy.

Figure 11:
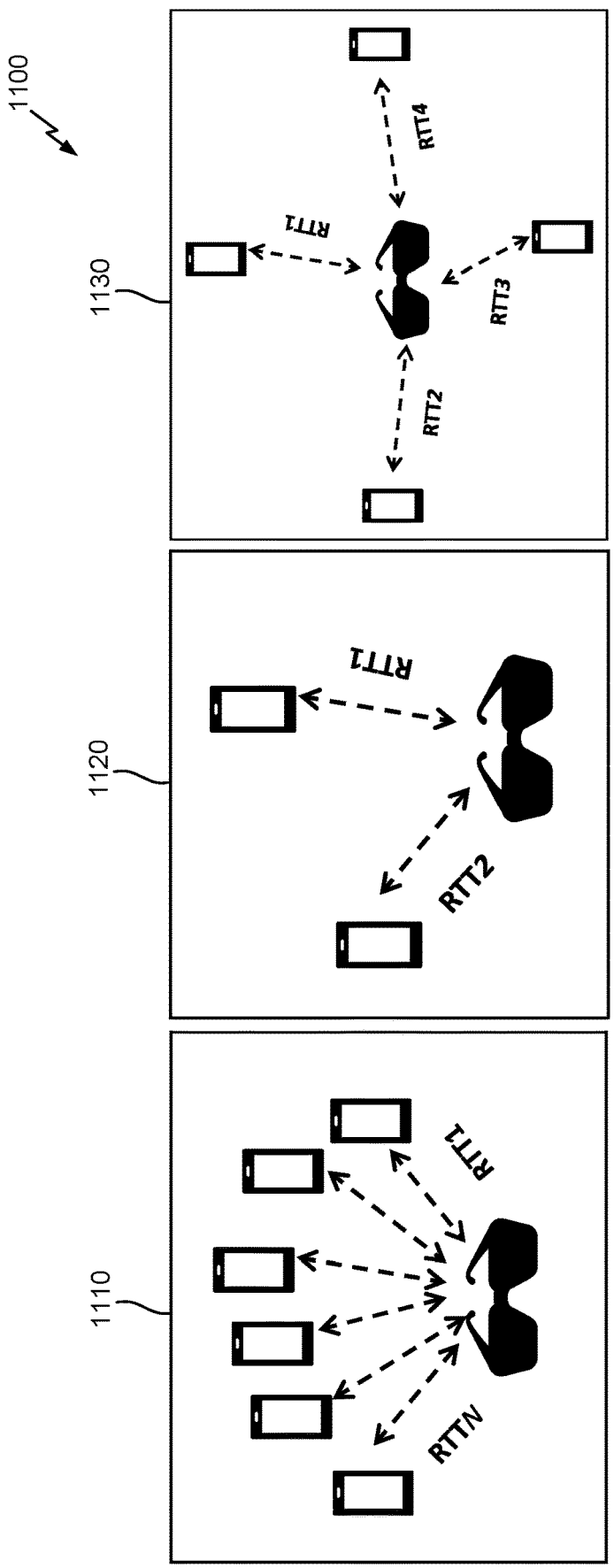
FIG. 11 illustrates other UE distribution scenarios for sidelink positioning in accordance with aspects of the disclosure.

FIG. 11 illustrates other UE distribution scenarios 1100 for sidelink positioning in accordance with aspects of the disclosure. In UE distribution scenario 1110, a high number of UEs participate in SL-assisted positioning, which is good for position estimation accuracy but also greatly increases power consumption. In UE distribution scenario 1120, only two UEs participate in SL-assisted positioning, which is good for power consumption but also reduces position estimation accuracy. In UE distribution scenario 1130, there is a reasonable number (i.e., 4) UEs participating in SL-assisted positioning, so the power consumption is not too high and the UEs are also well spaced apart with a sufficient number for good position estimation accuracy.

Aspects of the disclosure are directed to selection of UEs for participation in a sidelink-assisted position estimation procedure of a target UE based at least in part upon zone information associated with a group of candidate UEs. Such aspects may provide various technical advantages, such as improved position estimation accuracy and/or lower power consumption (e.g., across the various UEs involved with the sidelink-assisted position estimation procedure) by spreading the distribution of participating UEs across zones.

Figure 12:
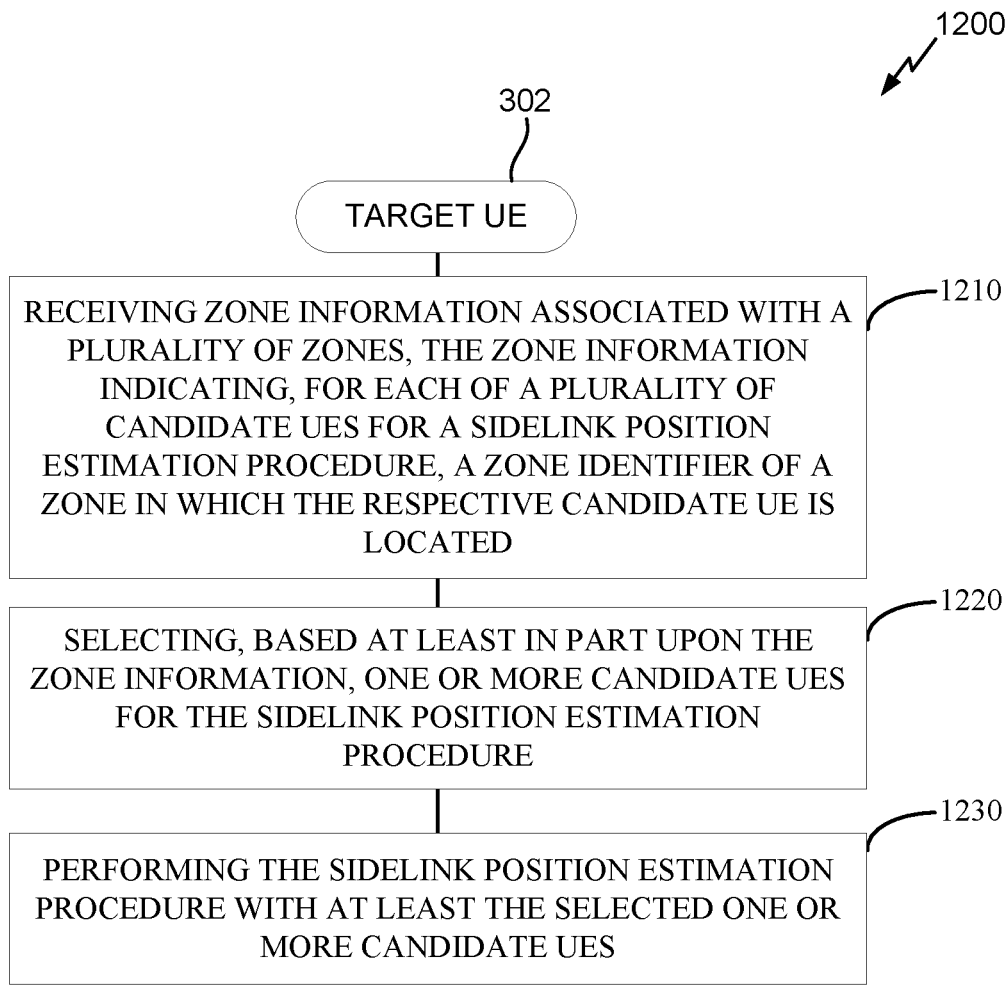
FIG. 12 illustrates an exemplary process of wireless communication, according to aspects of the disclosure.

FIG. 12 illustrates an exemplary process 1200 of wireless communication, according to aspects of the disclosure. In an aspect, the process 1200 may be performed by a target UE (e.g., a UE for which position estimation is desired), such as UE 302.

Referring to FIG. 12, at 1210, the target UE (e.g., receiver 312 or 322, etc.) receives zone information associated with a plurality of zones, the zone information indicating, for each of a plurality of candidate UEs for a sidelink-assisted position estimation procedure of the target UE, a zone identifier of a zone in which the respective candidate UE is located. In some designs, the zone information for some or all of the plurality of candidate UEs is broadcasted by the respective candidate UE (e.g., in which case, the zone information for a particular candidate UE is received directly from that particular candidate UE). In some designs, the broadcasted zone information is transmitted via SCI of a PSCCH (e.g., a $1^{st}$ stage SCI, such as SCI 1-A). In other designs, the zone information for some or all of the plurality of candidate UEs is received indirectly from a different respective UE (e.g., via a relaying or forwarding scheme across a mesh network of UEs) or from a base station (e.g., gNB accumulates zone information for various UEs and then broadcasts the zone information associated with nearby zones). The zone information may include a variety of information, as will be described below in more detail. In some designs, a means for performing the reception of the zone information at 1210 may include receiver 312 or 322 of UE 302.

Referring to FIG. 12, at 1220, the target UE (e.g., processor(s) 332, on-demand PRS component 342, etc.) selects one or more candidate UEs for the sidelink-assisted position estimation procedure based at least in part upon the zone information. In some designs, the selection of 1220 may be based upon one or more zone-based rules, as will be described below in more detail. In some designs, a means for performing the selection of the zone candidate UE(s) at 1220 may include processor(s) 332, on-demand PRS component 342, etc. of UE 302.

Referring to FIG. 12, at 1230, the target UE (e.g., processor(s) 332, transmitter 314 or 314, receiver 312 or 322, etc.) performs the sidelink-assisted position estimation procedure with at least the selected one or more candidate UEs. The sidelink-assisted position estimation procedure can be performed in implemented in various ways (e.g., RTT, multi-RTT or differential RTT or double-differential RTT, TDOA-based, etc.). In some designs, each reference node associated with the sidelink-assisted position estimation procedures corresponds to the selected one or more candidate UEs (e.g., as in SL-only RTT scheme 1030 as one example). In other designs, at least one reference node associated with the sidelink-assisted position estimation procedures corresponds to a base station (e.g., a hybrid sidelink/gNB positioning scheme, such as 1010 or 1020 of FIG. 10, etc.). In some designs, a means for performing the sidelink-assisted position estimation procedure at 1230 may include processor(s) 332, transmitter 314 or 314, receiver 312 or 322, etc. of UE 302, dependent on whether the target UE is transmitting SRS and/or measuring PRS and/or deriving Tx→Rx measurement, or whether the target UE is the position estimation entity (e.g., UE-based position estimation) or whether another UE or a network component (e.g., LMF) is the position estimation entity).

Referring to FIG. 12, in some designs, the zone information further includes an indication of accuracy for at least one zone identifier indications, and the selection at 1220 is further based on the indication of accuracy. In some designs, the indication of accuracy is indicated implicitly by the zone identifier (e.g., a zone ID associated with a known high-interference area may be, by default, associated with a low accuracy level). In other designs, the indication of accuracy is included in SCI of PSCCH (e.g., SCI 1-A) or PSSCH (e.g., SCI 2). In this case, the indication of accuracy may be based on dynamic conditions (e.g., if candidate UE is very close to boundary to another zone and/or is on a trajectory towards another zone, then the candidate UE may indicate low accuracy to indicate a looser associated with the indicated zone, etc.).

Referring to FIG. 12, in some designs, a mapping of zone identifiers to zones or instructions on how to derive the mapping are pre-defined, pre-configured (e.g., via RRC or SIB), or received at the target UE from an external entity (e.g., via gNB or another UE). In some designs, the zone identifiers and their associated zones may be application-driven, or based on group communication services (GCS) protocol or location services (LCS) protocol. For example, for an indoor factory, a zone ID may be associated with a particular hallway, etc. In some designs, zone identifier and associated zone computation may be implemented at the application-layer (e.g., derived independently at each UE, etc.).

Referring to FIG. 12, in some designs, the selection is based upon one or more zone-based rules. In some designs, the one or more zone-based rules include:
  excluding, from selection, any candidate UE within a first threshold distance to the target UE, or
  excluding, from selection, any candidate UE in the same zone as the target UE, or
  excluding, from selection, any candidate UE that exceeds a second threshold distance to the target UE, or
  excluding, from selection, any candidate UE in any zone that exceeds a third threshold distance to respective zone of the target UE, or
  limiting selection of candidate UEs in the same zone to less than a first threshold number, or
  limiting selection of candidate UEs in an adjacent zone to the respective zone of the target UE to less than a second threshold number, or
  a combination thereof.

In some designs, some or all of the above-noted rules may be implemented selectively based on various criteria. For example, if the sidelink-assisted position estimation procedure is based on timing measurements, then the exclusion of candidate UEs that are too close to the target UE may be implemented (e.g., inside same zone or within first threshold distance). However, these nearby candidate UEs may be helpful for other types of position estimation that rely on angle-based measurements (e.g., AoD or AoA). In this case, the proximity exclusion can be implemented selectively based on the type of positioning scheme (e.g., timing-based or angle-based).

Referring to FIG. 12, in some designs, the target UE may further determine a RSRP of at least one signal from at least one of the plurality of candidate UEs, the selection at 1220 is further based on the RSRP determination (e.g., so zone information is considered, while RSRP is also considered). Hence, the selection at 1220 need not be based solely on the zone information.

Referring to FIG. 12, in some designs, the target UE may further determine a line of sight (LOS) or non-LOS (NLOS) confidence level associated with at least one link to at least one of the plurality of candidate UEs, and the selection at 1220 is further based on the LOS or NLOS confidence level determination (e.g., so zone information is considered, while LOS/NLOS condition is also considered). For example, candidate UEs with LOS links to the target UE may generally be preferable for selection over candidate UEs with NLOS links to the target UE. Hence, the selection at 1220 need not be based solely on the zone information.

Referring to FIG. 12, as noted above, the sidelink-assisted position estimation procedure may include a timing measurement procedure (e.g., RTT or multi-RTT or differential RTT or double-differential RTT or TDOA, etc.), an angle measurement procedure (e.g., AoA or AoD, etc.), or a combination thereof.

Figure 13:
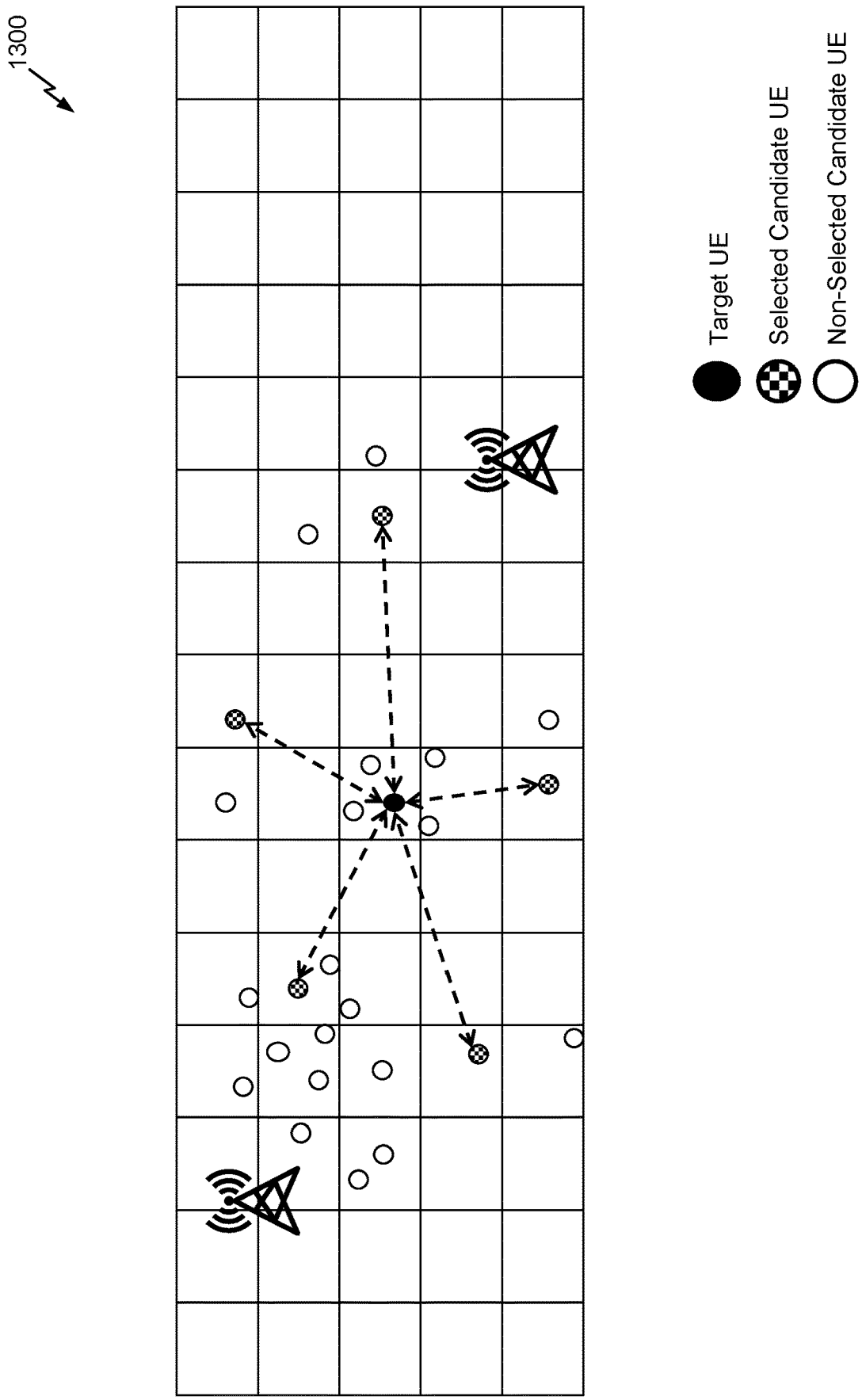
FIGS. 13-16 illustrate sidelink-assisted position estimation schemes in accordance with aspects of the disclosure.

FIG. 13 illustrates an example implementation 1300 of the process 1200 of FIG. 12 in accordance with an aspect of the disclosure. In FIG. 13, a grid is depicted whereby each box of the grid corresponds to a particular zone associated with a respective zone identifier. Circles are depicted in the grid which are marked to indicate the target UE, the selected candidate UEs, and the non-selected candidate UEs. As shown in FIG. 13, the selected candidate UEs are spaced apart in terms of zones and are angularly spaced apart as well to obtain a reasonable spatial distribution of UEs for the sidelink-assisted position estimation procedure.

Figure 14:
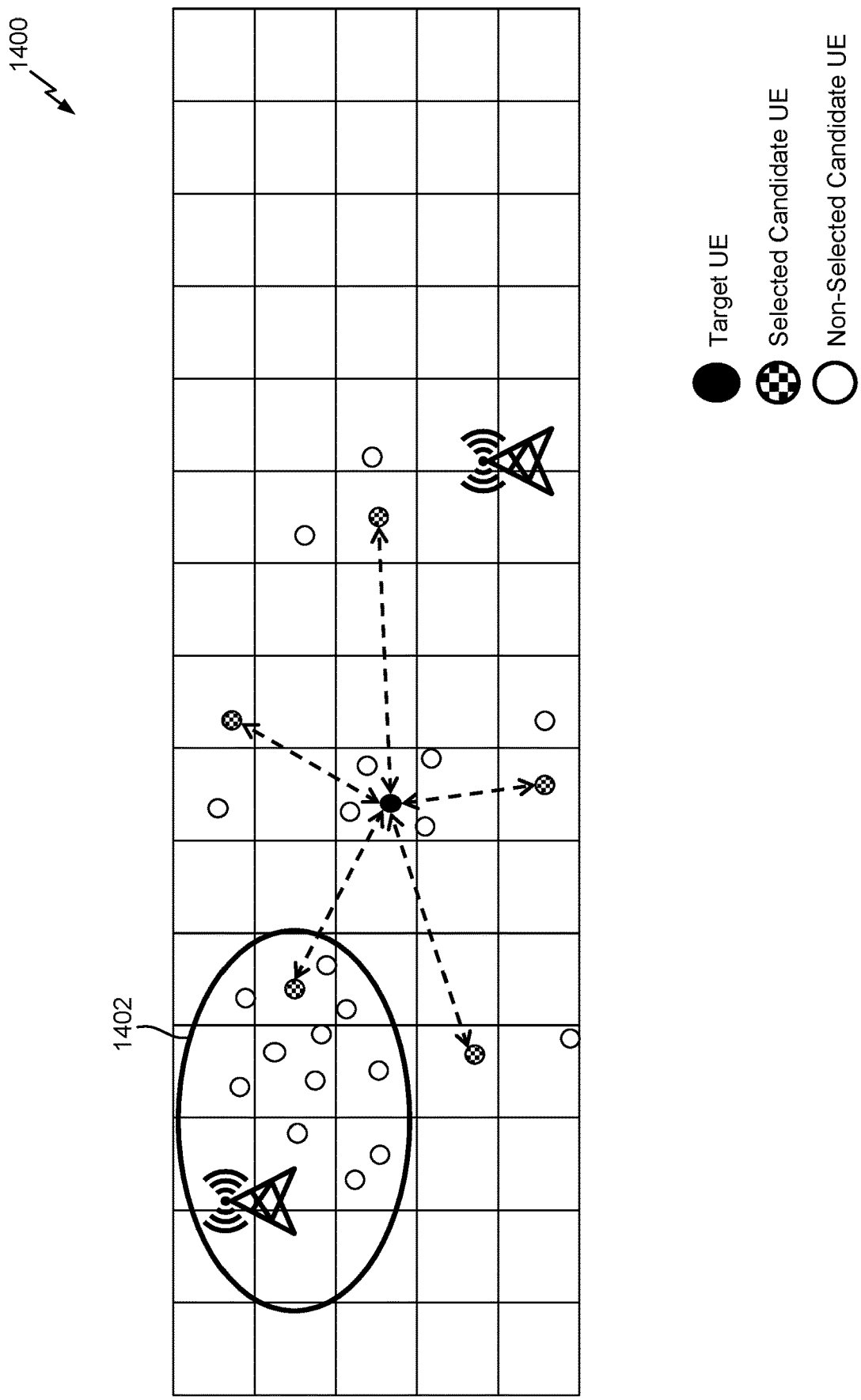

FIG. 14 illustrates an example implementation 1400 of the process 1200 of FIG. 12 in accordance with an aspect of the disclosure. FIG. 14 is similar to FIG. 13, except that a candidate UE cluster is depicted at 1402 with a high number of nearby zone co-located UEs. In some designs, assisting UE in same/similar location (e.g., as in the candidate UE cluster 1402) may provide limited gain (e.g., hence the rationale to space apart the selected candidate UEs). In some designs, one or few assisting UE from same or adjacent zones may be sufficient for the sidelink-assisted position estimation procedure. In some designs, in a scenario where there are multiple candidate UEs available for selection, RSRP may be considered as a secondary factor (as described above), e.g., based on based RSRP from SCI-1/SCI-2 and PSSCH. In some designs, as noted above, "POS-Accuracy" information of candidate UEs may be considered by the target UE, including sync error info. In some designs, as noted above, the selection at 1220 may further based on expectation (or confidence level) of LOS/NLOS (e.g., derivable from DMRS or other assistance information).

Figure 15:
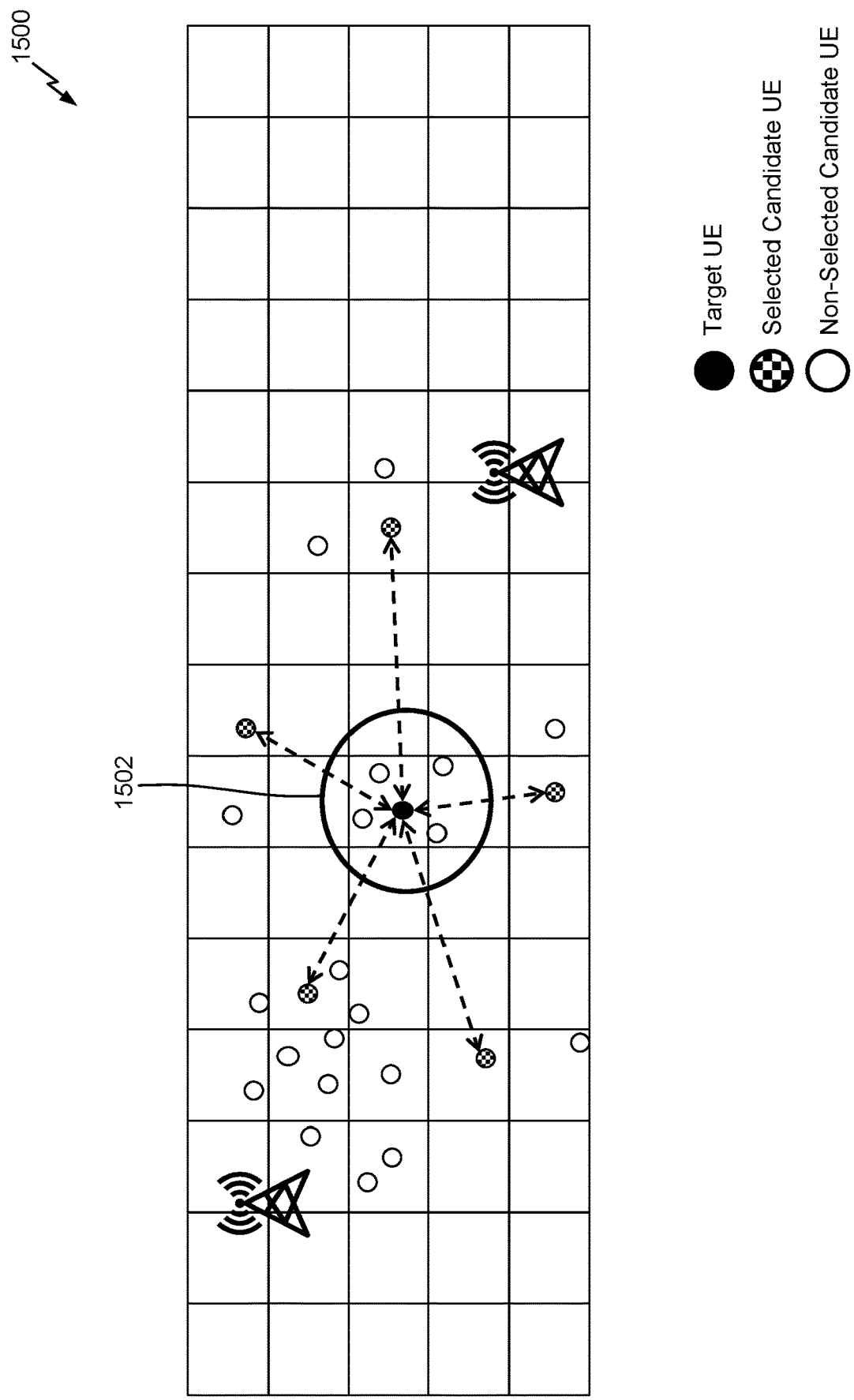

FIG. 15 illustrates an example implementation 1500 of the process 1200 of FIG. 12 in accordance with an aspect of the disclosure. FIG. 15 is similar to FIG. 13, except that an proximity-based exclusion area is depicted at 1502. In some designs, ToA for PRS between close-by UEs may be sub 10 ns. In some designs, PRS and hardware bandwidth may not "resolve" ToA below a threshold. For example, a resolvable time between samples may be 1/SamplingFreq, or 3 m for 100 Mhz sampling rate. In some designs, sync error and other bias may cause error above a distance between UEs. In some designs, for timing-based positioning schemes, nearby UEs may only useful if close-by UE has very good POS accuracy. In some designs, for nearby UEs, sharing POS-info via SL may be better than receiving PRS (e.g., instead of measuring PRS, simply identify a nearby UE location to gain knowledge that the target UE is very close to that location). As noted above, nearby UEs may be useful for other types of position estimation schemes, such as angle-based position estimation schemes.

Figure 16:
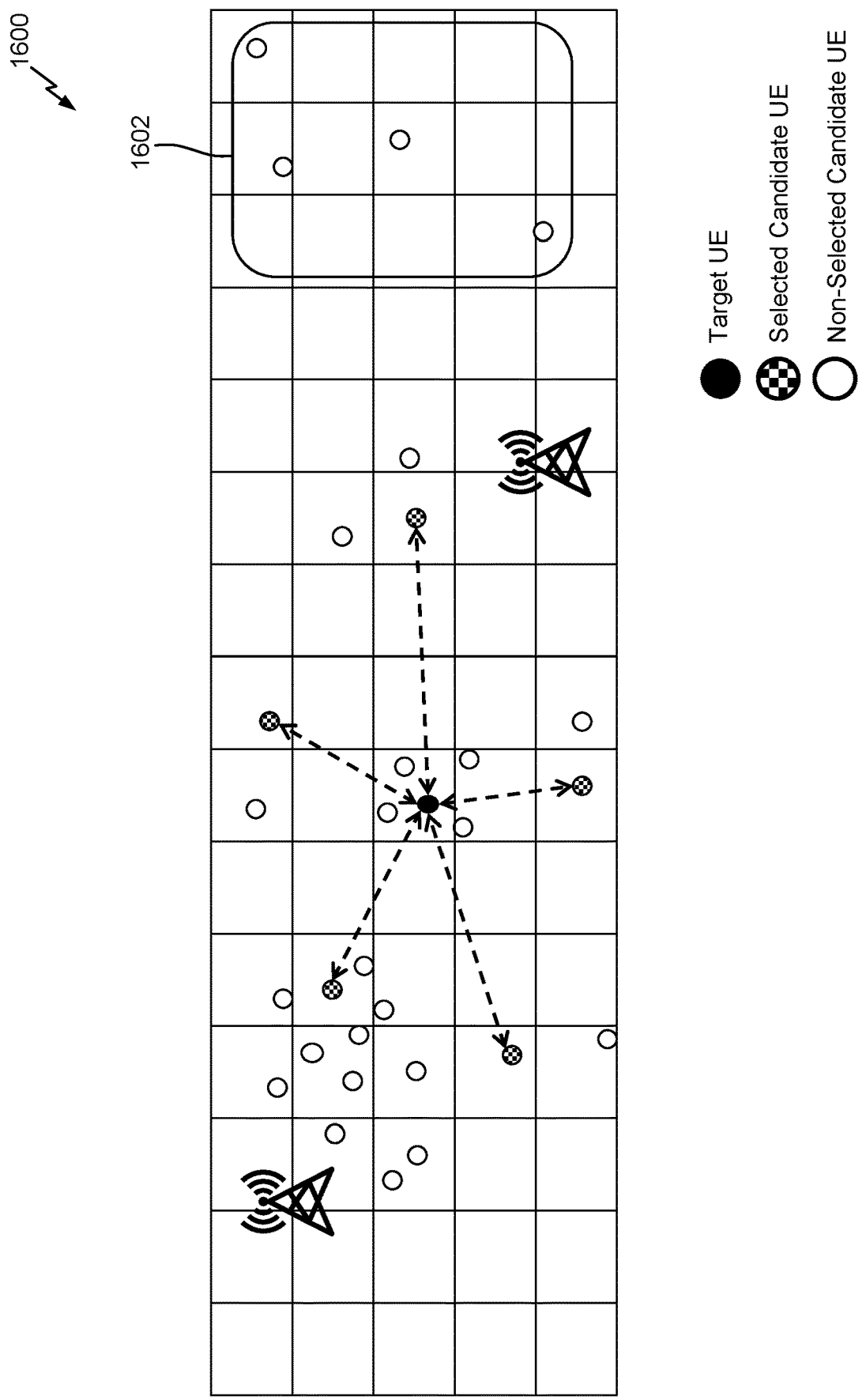

FIG. 16 illustrates an example implementation 1600 of the process 1200 of FIG. 12 in accordance with an aspect of the disclosure. FIG. 16 is similar to FIG. 13, except that an distance-based exclusion area is depicted at 1602 with a number of "far" UEs. In some designs, PRS from farther away UE requires higher power consumption from both Tx and Rx. Accordingly, UEs inside the distance-based exclusion area 1602 may only be considered in scenarios where closer candidate UEs are not available for selection.

As noted above, geographic regions may be divided into multiple zones (alternatively referred to as sidelink zones or SL zones). In some designs, SL zones may be designed primarily for V2X implementations in outdoor spaces (e.g., zones may encompass roads, parking lots, etc., where vehicles travel, etc.).

Figure 17:
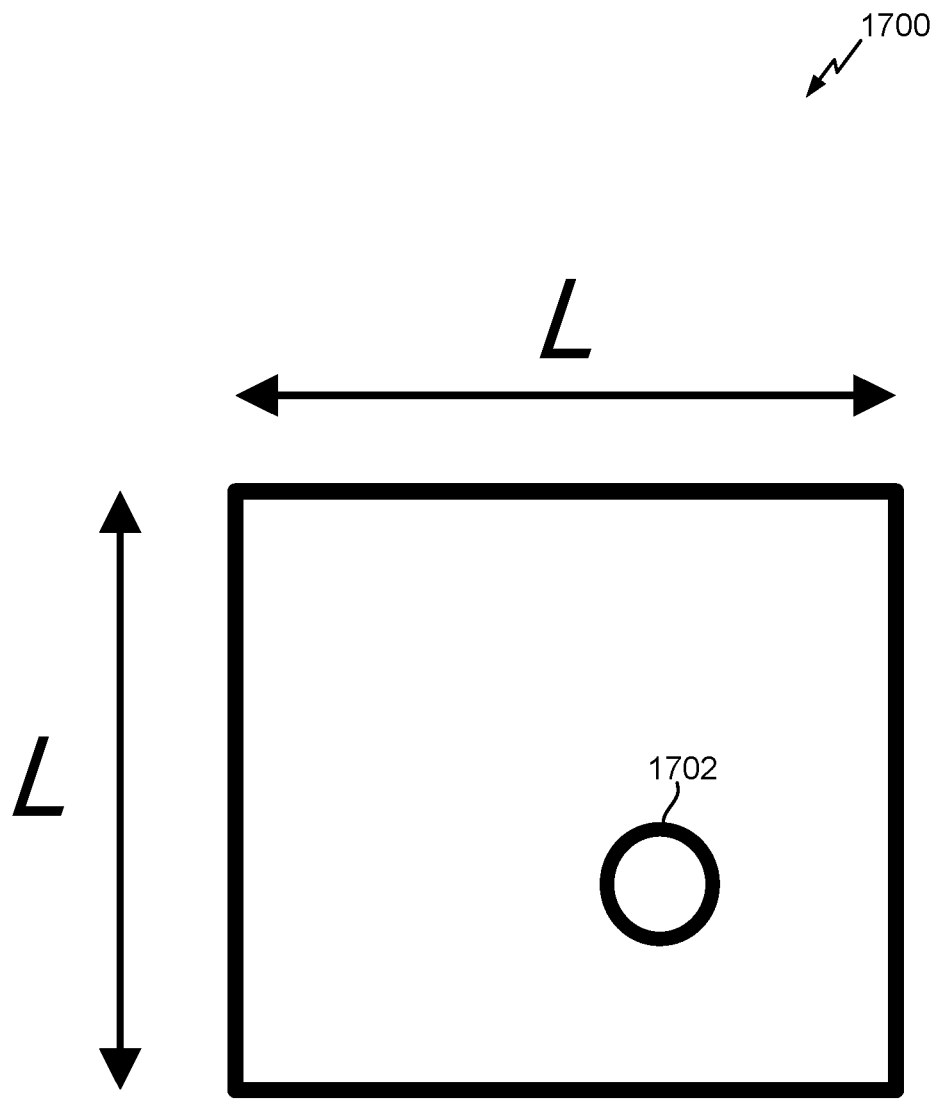
FIG. 17 illustrates a zone in accordance with a World Geodetic System 84 (WSG84) model based on reference longitude and latitude coordinates (0,0) in accordance with an aspect of the disclosure.

FIG. 17 illustrates a zone 1700 in accordance with a World Geodetic System 84 (WSG84) model based on reference longitude and latitude coordinates (0,0) in accordance with an aspect of the disclosure. With respect to FIG. 17, in an example:

(x,y) is the distance to (0,0) in meters,
x1=floor(x/L) mode 64,
y1=floor(y/L) mode 64,
Zone_ID=y1*64+x1,
L is the length of the zone defined in sl-ZoneConfig In this manner, the zone dimensions may be indicated via the zone identifier (or Zone_ID). A UE 1702 is shown as located inside of the zone 1700.

In current designs, SL zones are defined with reference to a global geographic coordinate (latitude and longitude). In particular, the (0,0) coordinate is a global geographic coordinate (e.g., based on GNSS, etc.) which is typically predefined in the relevant standard. In other designs, the reference geographic coordinate may be more flexibly defined (e.g., a local reference geographic coordinate can be defined, or even a global reference geographic coordinate that may be different from the predefined reference global geographic coordinate used in legacy systems).

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3} (as in the example of FIG. 4); 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu *\{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

In some designs, on-demand Uu PRS (e.g., DL PRS, UL SRS-P, etc.) is scheduled by the network to reduce overhead associated with periodic broadcast PRS. Generally, for on-demand Uu PRS, if a UE has no information on possible on-demand PRS, the UE may request a desired customized PRS configuration. If a UE has some preconfigured on-demand PRS configuration, the UE may request a specific reconfiguration or switch to a desired configuration. The network (gNB or LMF) receives this request from the UE, and coordinates with TRPs for on-demand PRS.

Figure 18:
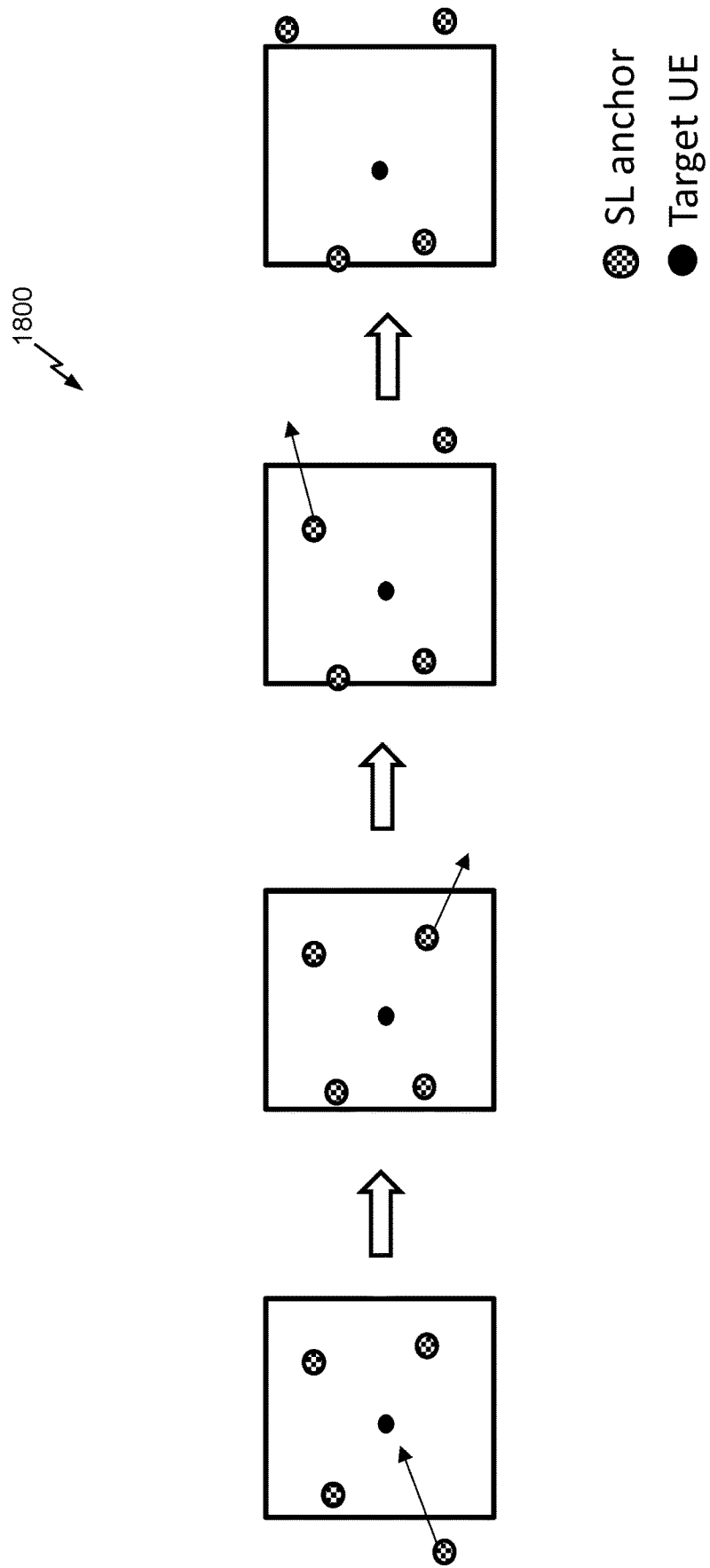
FIG. 18 illustrates a sidelink zone topology in accordance with an aspect of the disclosure.

However, in sidelink environments, centralized scheduling and configuration of PRS may suffer from high overhead due to a dynamic topology. For example, a target UE and/or anchor UE(s) may be moving quickly, resulting in frequent SL PRS configuration changes. For a target UE, the SL PRS configuration should be updated when a SL anchor enters/exits its neighborhood. FIG. 18 illustrates a sidelink zone topology 1800 in accordance with an aspect of the disclosure. As shown in FIG. 18, SL anchor UEs may move into and/or out of a respective sidelink zone where a target UE is located. Each change to the sidelink zone topology 1800 due to the changing SL anchor UEs may trigger SL PRS reconfiguration, which leads to high reconfiguration overhead.

For this reason, particular SL anchors may not always be available for on-demand PRS in SL. For example, on-demand SL PRS configurations may have an expiration timer (e.g., preloaded SL PRS configuration for SL anchors may expire due to anchor movement). In some designs, an expiration timer may be defined for preloaded on-demand SL-PRS configuration. In some designs, timer might depend on UE mobility status (e.g., UEs moving more quickly may have shorter timers, and vice versa). In some designs, the timer may be defined per SL (relative movement). In some designs, an on-demand SL PRS configuration may be defined in real time, which may increase latency (e.g., due to backhaul signaling for TRP configuration, and SL anchor configuration involving backhaul signaling as well as Uu interface).

In some designs, an initiator of an on-demand SL PRS request may be a target UE, while in other designs an initiator of an on-demand SL PRS request may be a position estimation entity (or both, in case of UE-based position estimation). In some designs, the position estimation entity that coordinates an on-demand SL PRS position estimation session may be a network component (e.g., gNB or LMF, similar to Uu case), while in other designs the position estimation entity that coordinates an on-demand SL PRS position estimation may be a UE (e.g., self-organized or UE-to-UE).

Aspects of the disclosure are thereby directed to sidelink anchor groups that include a set of sidelink anchors that are each associated with a respective SL PRS "pre"-configuration for one or more future on-demand SL PRS position estimation procedures. As used here, SL PRS pre-configuration refers to an SL PRS configuration that is configured in a dedicated manner before (i.e., in advance of) an on-demand PRS request is received from a UE. In this case, the position estimation entity may then provide assistance data associated with the sidelink anchor group to the target UE, which may then perform an on-demand sidelink PRS position estimation session with the sidelink anchor group (e.g., based on the SL PRS pre-configuration(s), which may be sent to UE as part of the assistance data or by one or more of the sidelink UEs in the sidelink anchor groups). Such aspects may provide various technical advantages, such as facilitating on-demand SL PRS, which generally is associated with lower overhead and power consumption as compared to periodic broadcast SL PRS.

Figure 19:
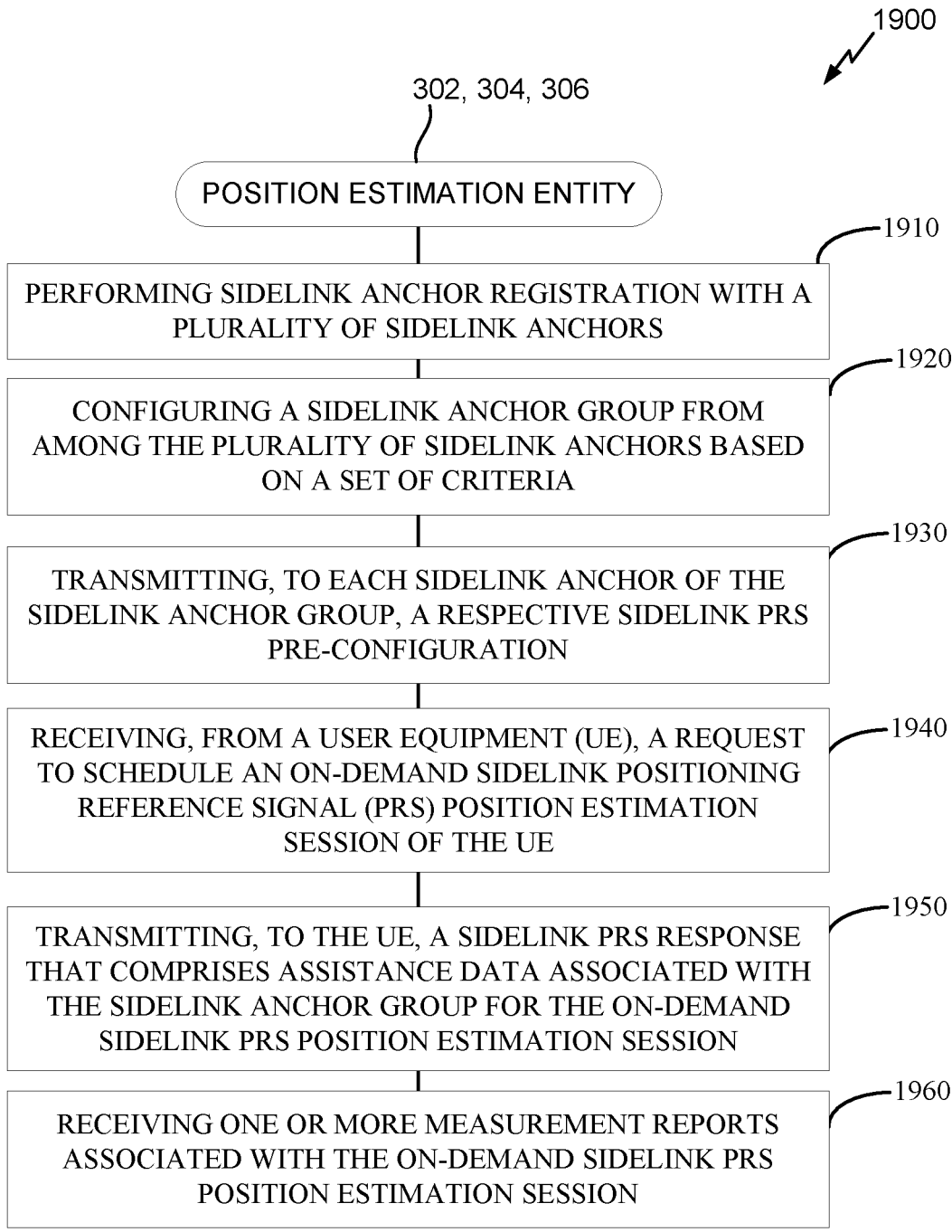
FIG. 19 illustrates an exemplary process of communication, according to aspects of the disclosure.

FIG. 19 illustrates an exemplary process 1900 of communication, according to aspects of the disclosure. In an aspect, the process 1900 may be performed by a position estimation entity, such as a UE (e.g., for UE-based position estimation) or a network component (e.g., gNB such as BS 304 for RAN-integrated LMF, or a core network-integrated LMF or a location server such as network entity 306, etc.).

Referring to FIG. 19, at 1910, the position estimation entity (e.g., receiver 312 or 322 or 352 or 362, transmitter 314 or 324 or 354 or 364, network transceiver(s) 380 or 390, etc.) performs sidelink anchor registration with a plurality of sidelink anchors. In some designs, the sidelink anchor registration may involve a negotiation or messaging exchange between the position estimation entity and the respective sidelink anchors. A means for performing the sidelink anchor registration of 1910 may include receiver 312 or 322 or 352 or 362, transmitter 314 or 324 or 354 or 364, network transceiver(s) 380 or 390, etc., depending on whether the position estimation entity corresponds to UE 302, or gNB such as BS 304 for RAN-integrated LMF, or a core network-integrated LMF or a location server such as network entity 306.

Referring to FIG. 19, at 1920, the position estimation entity (e.g., processor(s) 332 or 384 or 394, on-demand PRS component 342 or 388 or 398, etc.) configures a sidelink anchor group from among the plurality of sidelink anchors based on a set of criteria. For example, the set of criteria may include a mobility status of the plurality of sidelink anchors (e.g., exclude sidelink anchors with higher mobility, etc.), a position estimation accuracy or capability associated with the plurality of sidelink anchors (e.g., include sidelink anchors with better position estimation accuracy or more capability, etc.), or a combination thereof. In some designs, the sidelink PRS pre-configuration specifies for each sidelink anchor in the sidelink anchor group, a first offset from a sidelink PRS trigger from the UE to a sidelink PRS transmission from the respective sidelink anchor, an expected reception time of sidelink PRS from the UE, or a combination thereof. A means for performing the configuration of 1920 may include processor(s) 332 or 384 or 394, on-demand PRS component 342 or 388 or 398, etc., depending on whether the position estimation entity corresponds to UE 302, or gNB such as BS 304 for RAN-integrated LMF, or a core network-integrated LMF or a location server such as network entity 306.

Referring to FIG. 19, at 1930, the position estimation entity (e.g., transmitter 314 or 324 or 354 or 364, data bus 334, network transceiver(s) 380 or 390, etc.) transmits, to each sidelink anchor of the sidelink anchor group, a respective sidelink PRS pre-configuration. In some designs, if the position estimation entity itself corresponds to one of the sidelink anchors in the sidelink anchor group, then the transmission at 1930 may include an internal logical transfer of data. A means for performing the transmission of 1930 may include transmitter 314 or 324 or 354 or 364, data bus 334, network transceiver(s) 380 or 390, etc., depending on whether the position estimation entity corresponds to UE 302, or gNB such as BS 304 for RAN-integrated LMF, or a core network-integrated LMF or a location server such as network entity 306.

Referring to FIG. 19, at 1940, the position estimation entity (e.g., receiver 312 or 322 or 352 or 362, network transceiver(s) 380 or 390, data bus 334, etc.) receives, from a UE, a request to schedule an on-demand sidelink PRS position estimation session of the UE. In an example, the request at 1940 may be unassociated with the sidelink anchor group configuration at 1920-1930 (e.g., in other words, 1910-1930 may be performed beforehand). A means for performing the reception of 1940 may include receiver 312 or 322 or 352 or 362, data bus 334, network transceiver(s) 380 or 390, etc., depending on whether the position estimation entity corresponds to UE 302, or gNB such as BS 304 for RAN-integrated LMF, or a core network-integrated LMF or a location server such as network entity 306.

Referring to FIG. 19, at 1950, the position estimation entity (e.g., transmitter 314 or 324 or 354 or 364, network transceiver(s) 380 or 390, data bus 334, etc.) transmits, to the UE, a sidelink PRS response that comprises assistance data associated with the sidelink anchor group for the on-demand sidelink PRS position estimation session. For example, the assistance data may include a sidelink anchor group identifier, a private key, a resource grant for transmission of a sidelink PRS trigger from the UE to the sidelink anchor group, a sidelink PRS pre-configuration associated with the sidelink anchor group for the on-demand sidelink PRS position estimation session, a sidelink anchor identifier for a sidelink PRS trigger from the UE to the sidelink anchor group, or a combination thereof. A means for performing the transmission of 1950 may include transmitter 314 or 324 or 354 or 364, data bus 334, network transceiver(s) 380 or 390, etc., depending on whether the position estimation entity corresponds to UE 302, or gNB such as BS 304 for RAN-integrated LMF, or a core network-integrated LMF or a location server such as network entity 306.

Referring to FIG. 19, at 1960, the position estimation entity (e.g., receiver 312 or 322 or 352 or 362, network transceiver(s) 380 or 390, data bus 334, etc.) receives one or more measurement reports associated with the on-demand sidelink PRS position estimation session. A means for performing the reception of 1960 may include receiver 312 or 322 or 352 or 362, data bus 334, network transceiver(s) 380 or 390, etc., depending on whether the position estimation entity corresponds to UE 302, or gNB such as BS 304 for RAN-integrated LMF, or a core network-integrated LMF or a location server such as network entity 306.

Figure 20:
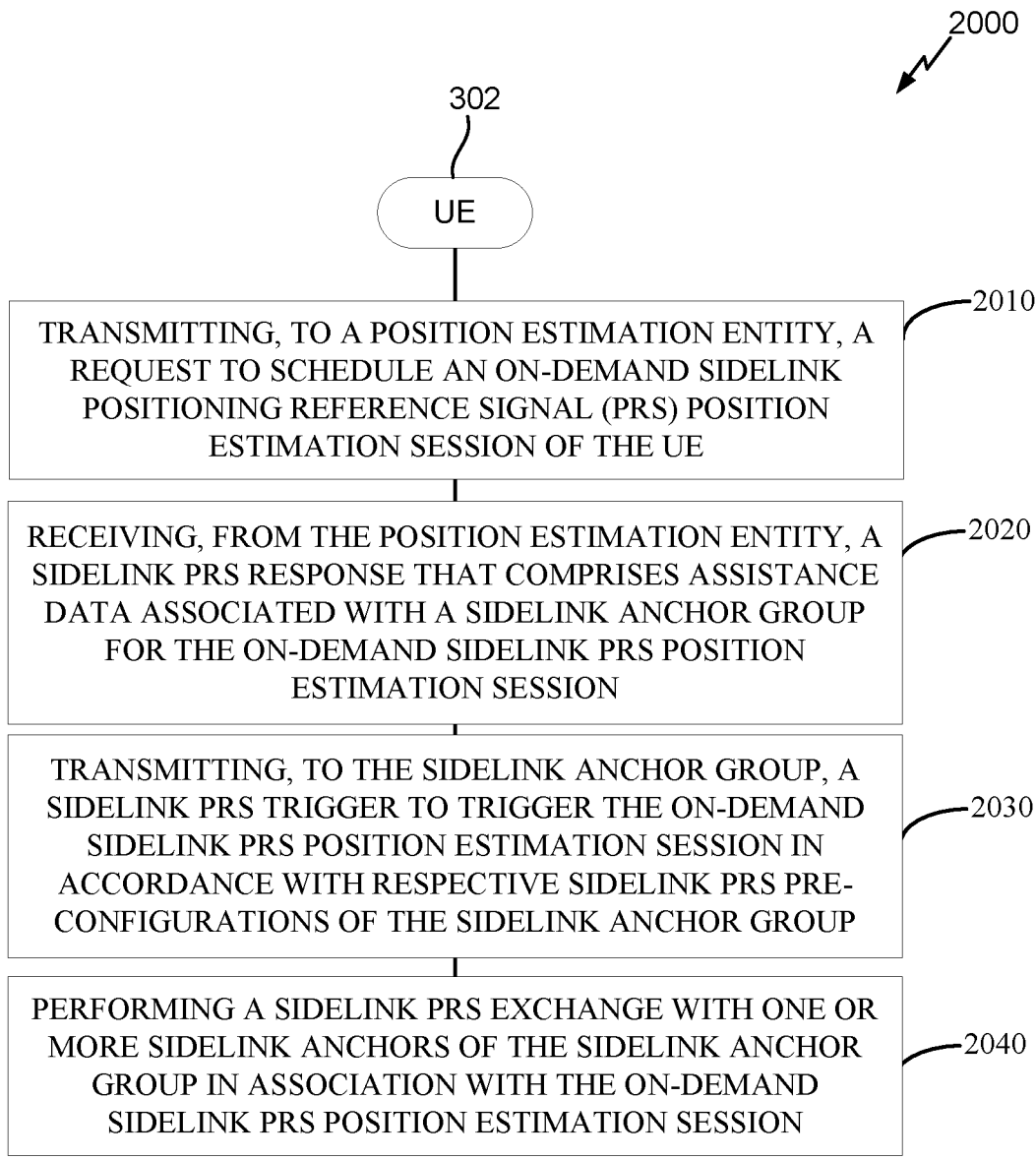
FIG. 20 illustrates an exemplary process of wireless communication, according to aspects of the disclosure.

FIG. 20 illustrates an exemplary process 2000 of wireless communication, according to aspects of the disclosure. In an aspect, the process 2000 may be performed by a UE, such as UE 302. In particular, the UE that performs the process 2000 of FIG. 20 corresponds to a UE for which a position estimate is desired, generally referred to as a target UE.

Referring to FIG. 20, at 2010, UE 302 (e.g., transmitter 314 or 324, data bus 334, etc.) transmits, to a position estimation entity, a request to schedule an on-demand sidelink PRS position estimation session of the UE. A means for performing the transmission of 2010 may include transmitter 314 or 324, data bus 334, etc., of UE 302.

Referring to FIG. 20, at 2020, UE 302 (e.g., receiver 312 or 322, data bus 334, etc.) receives, from the position estimation entity, a sidelink PRS response that comprises assistance data associated with a sidelink anchor group for the on-demand sidelink PRS position estimation session. In some designs, the assistance data comprises a sidelink anchor group identifier, a private key, a resource grant for transmission of a sidelink PRS trigger from the UE to the sidelink anchor group, a sidelink PRS pre-configuration associated with the sidelink anchor group for the on-demand sidelink PRS position estimation session, a sidelink anchor identifier for sidelink PRS trigger from the UE to the sidelink anchor group, or a combination thereof. A means for performing the reception of 2020 may include receiver 312 or 322, data bus 334, etc., of UE 302.

Referring to FIG. 20, at 2030, UE 302 (e.g., transmitter 314 or 324, data bus 334, etc.) transmits, to the sidelink anchor group, a sidelink PRS trigger to trigger the on-demand sidelink PRS position estimation session in accordance with respective sidelink PRS pre-configurations of the sidelink anchor. In some designs, the sidelink PRS trigger is transmitted via multicast or broadcast (e.g., alternatively, N unicast transmissions can be made to N sidelink anchors). In some designs, the sidelink PRS trigger comprises an indication of a sidelink zone in which the UE is located. In some designs, the sidelink PRS trigger designates a maximum range between the UE and a respective sidelink anchor for the respective sidelink anchor to accept the sidelink PRS trigger. In some designs, UE 302 may further receive, from at least one sidelink anchor of the sidelink anchor group, a sidelink PRS trigger response (e.g., the sidelink PRS trigger response indicates acceptance or rejection of the sidelink PRS trigger, and may include other information as will be discussed below in more detail). A means for performing the transmission of 2030 may include transmitter 314 or 324, data bus 334, etc., of UE 302.

Referring to FIG. 20, at 2040, UE 302 (e.g., receiver 312 or 322, transmitter 314 or 324, etc.) performs a sidelink PRS exchange with one or more sidelink anchors of the sidelink anchor group in association with the on-demand sidelink PRS position estimation session. In some designs, the sidelink PRS exchange includes a two-way PRS exchange between the UE and each respective sidelink anchor in the anchor group (e.g., UE sends SL PRS to sidelink anchor, which responds with SL PRS, or vice versa, e.g., for RTT measurements, such as Tx-Rx, etc.), or a one-way PRS exchange (e.g., from UE to each sidelink anchor, or each sidelink anchor to UE, e.g., for TDOA measurements), or some combination thereof. In some designs, the sidelink PRS exchange comprises blind decoding and/or descrambling only for SL PRS sidelink anchors from which a respective sidelink PRS trigger response that indicates acceptance of the sidelink PRS trigger is received. In other designs, the sidelink PRS exchange comprises blind decoding and/or descrambling for SL PRS for each sidelink anchor among the sidelink anchor group. In some designs, UE 302 may further transmit a measurement report based on the sidelink PRS exchange to the position estimation entity. A means for performing the sidelink PRS exchange of 2040 may include receiver 312 or 322, transmitter 314 or 324, etc., of UE 302.

Figure 21:
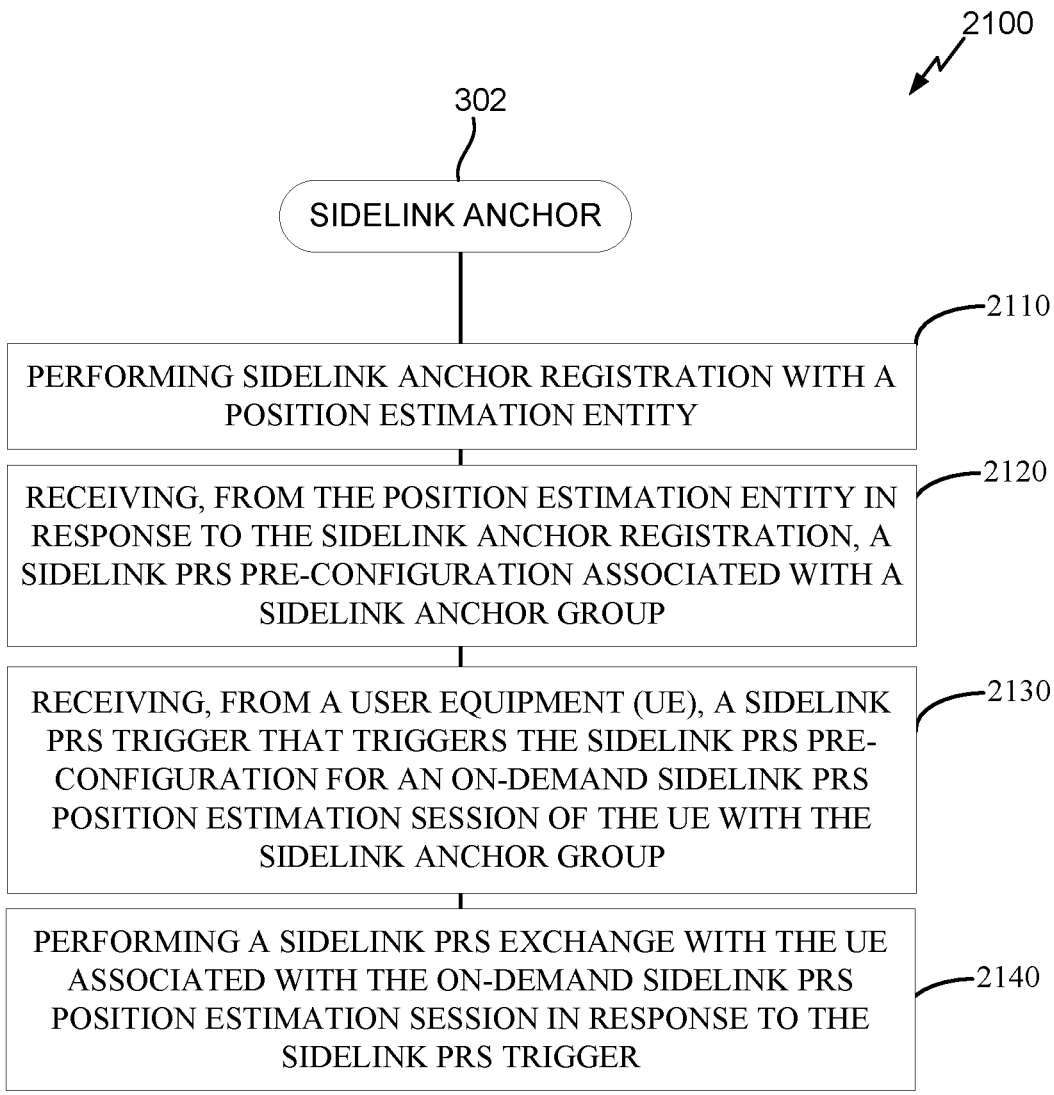
FIG. 21 illustrates an exemplary process of wireless communication, according to aspects of the disclosure.

FIG. 21 illustrates an exemplary process 2100 of wireless communication, according to aspects of the disclosure. In an aspect, the process 2100 may be performed by a sidelink anchor, which may correspond to a UE such as UE 302. In some designs, to qualify as a sidelink anchor, the sidelink anchor may be associated with a known location (e.g., from a recent position estimation fix, etc.).

Referring to FIG. 21, at 2110, the sidelink anchor (e.g., receiver 312 or 322, transmitter 314 or 324, data bus 334, etc.) performs sidelink anchor registration with a position estimation entity. In some designs, the sidelink anchor registration may involve a negotiation or messaging exchange between the position estimation entity and the sidelink anchor. A means for performing the sidelink anchor registration of 2110 may include receiver 312 or 322, transmitter 314 or 324, data bus 334, etc., of UE 302.

Referring to FIG. 21, at 2120, the sidelink anchor (e.g., receiver 312 or 322, data bus 334, etc.) receives, from the position estimation entity in response to the sidelink anchor registration, a sidelink PRS pre-configuration associated with a sidelink anchor group. In some designs, the sidelink PRS pre-configuration specifies a first offset from a sidelink PRS trigger from the UE to a sidelink PRS transmission from the sidelink anchor, an expected reception time of sidelink PRS from the UE, or a combination thereof. A means for performing the reception of 2120 may include receiver 312 or 322, data bus 334, etc., of UE 302.

Referring to FIG. 21, at 2130, the sidelink anchor (e.g., receiver 312 or 322, etc.) receives, from a UE, a sidelink PRS trigger that triggers the sidelink PRS pre-configuration for an on-demand sidelink PRS position estimation session of the UE with the sidelink anchor group. In some designs, the sidelink PRS trigger is transmitted via multicast or broadcast (e.g., alternatively, N unicast transmissions can be made to N sidelink anchors). In some designs, the sidelink PRS trigger comprises an indication of a sidelink zone in which the UE is located. In some designs, the sidelink PRS trigger designates a maximum range between the UE and a respective sidelink anchor for the respective sidelink anchor to accept the sidelink PRS trigger. In some designs, the sidelink anchor may determine to participate in the on-demand sidelink PRS position estimation session with the UE based on one or more criteria. For example, the sidelink PRS trigger comprises an indication of a sidelink zone in which the UE is located, and the one or more criteria comprises a relationship between the sidelink anchor and the sidelink zone in which the UE is located. In other designs, the sidelink PRS trigger designates a maximum range between the UE and a respective sidelink anchor for the respective sidelink anchor to accept the sidelink PRS trigger, and the determination is based on whether the sidelink anchor is inside of the maximum range. In some designs, the sidelink UE may further transmit, to the UE, a sidelink PRS trigger response (e.g., the sidelink PRS trigger response indicates acceptance of the sidelink PRS trigger). A means for performing the reception of 2130 may include receiver 312 or 322, of UE 302.

Referring to FIG. 21, at 2140, the sidelink anchor (e.g., receiver 312 or 322, transmitter 314 or 324, etc.) performs a sidelink PRS exchange with the UE associated with the on-demand sidelink PRS position estimation session in response to the sidelink PRS trigger. In some designs, the sidelink PRS exchange includes a two-way PRS exchange between the UE and the sidelink anchor in the anchor group (e.g., UE sends SL PRS to sidelink anchor, which responds with SL PRS, or vice versa, e.g., for RTT measurements, such as Tx-Rx, etc.), or a one-way PRS exchange (e.g., from UE to each sidelink anchor, or each sidelink anchor to UE, e.g., for TDOA measurements), or some combination thereof. In some designs, the sidelink anchor may further transmit a measurement report based on the sidelink PRS exchange to the position estimation entity. A means for performing the sidelink PRS exchange of 2140 may include receiver 312 or 322, transmitter 314 or 324, etc., of UE 302.

Figure 22:
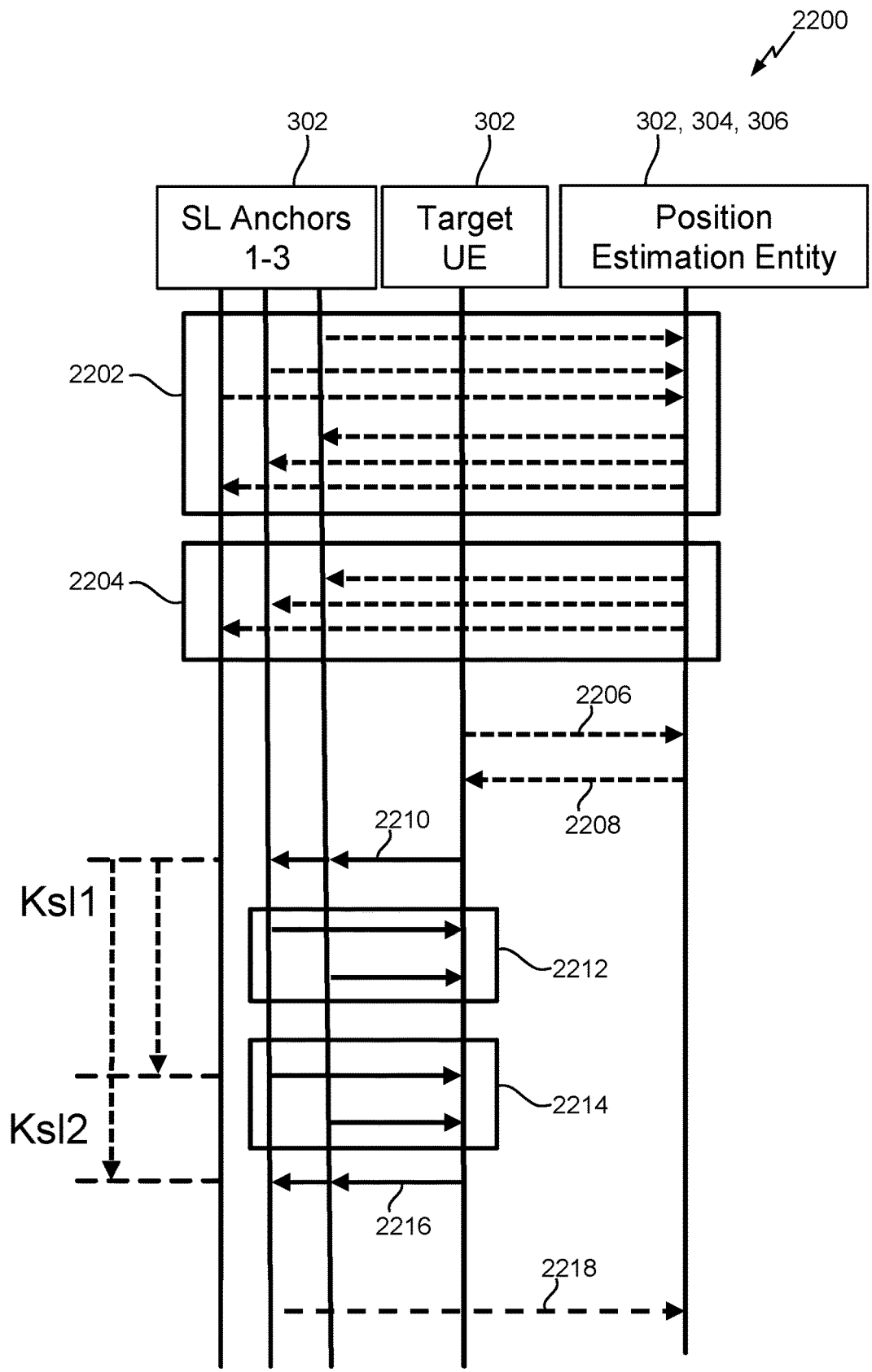
FIG. 22 illustrates an example implementation of the processes of FIGS. 19-21, respectively, in accordance with an aspect of the disclosure.

FIG. 22 illustrates an example implementation 2200 of the processes 1900-2100 of FIGS. 19-21, respectively, in accordance with an aspect of the disclosure. In particular, the example implementation 2200 involves a sidelink PRS procedure between a target UE and sidelink anchors 1-3.

Referring to FIG. 22, at 2202, sidelink anchor registration is performed between sidelink anchors 1-3 and a position estimation entity. For example, at 2202, SL anchor capability (support for SL-PRS, etc.) is negotiated. Here, three UEs (sidelink anchors 1-3) are registered as sidelink anchors 1-3. The position estimation entity may determine various information associated with the sidelink anchors 1-3, such as location, mobility status (e.g., mobile or stationary), power supply level, whether the sidelink anchors have an ongoing LPP session, a number of active SL connections, etc. Such information may be obtained at 2202 as part of UE capability report or per LMF inquiry.

Referring to FIG. 22, at 2204, SL PRS pre-configurations are sent by the position estimation entity to sidelink anchors 1-3. For example, a subset of SL anchors (here, SL anchors 1-3) are selected by positioning entity as one sidelink anchor group. The selection might be based on previous estimation ensuring a reasonable Geometric dilution of precision (GDOP) for UE within a region. In some designs, slow-moving or semi-static UEs (customer premise equipment (CPE), RSU, slow moving UE etc.) may be selected as sidelink anchors for a sidelink anchor group (e.g., similar to TRPs in Uu). In some designs, the selection might be based on SL-zone (e.g., one SL-anchor (delegate) per zone, or some other maximum number). In some designs, sidelink anchors may be selected to provide a dynamic layout (e.g., avoid clusters of sidelink anchors in a single zone, etc.). In some designs, selection might be based on UE location estimate accuracy/capability, etc. In some designs, SL PRS pre-configuration for sidelink anchors may include SL PRS frequency layer, time scheduling (e.g., Ksl1 which denotes a transmission time after the sidelink anchor receives the trigger, and/or Ksl2 which denotes an expected reception time (SLRTT) of SL PRS from the UE), anchor group ID. In some designs, a public key assigned by LMF to SL anchors to decrypt target UE SL PRS trigger.

Referring to FIG. 22, at 2206, the target UE transmits SL PRS request to the position estimation entity. At 2208, the position estimation entity transmits SL PRS pre-configuration to the target UE (e.g., assistance data). For example, the position estimation entity may provide anchor group ID and/or private key, an anchor group designation with a reasonable GDOP coverage, a resource grant for SL PRS trigger, SL PRS pre-configuration(s) associated with the sidelink anchor group, SL anchor IDs for group-based request, etc. By contrast, if following Uu scheme, LMF may send trigger to multiple SL anchors, which may cause extra overhead and latency.

Referring to FIG. 22, at 2210, the target UE transmits SL PRS trigger to sidelink anchors 1-3. For example, the target UE broadcasts/groupcast the SL PRS trigger through SL. In some designs, the SL PRS trigger contains the anchor group ID and key (e.g., RNTI). In some designs, the SL PRS trigger adds its own zone ID for distance/proximity-based response (e.g., sidelink anchors in sidelink anchor group based on spatial relationship or distance to the target UE). In some designs, the SL PRS trigger may further define a maximum range for response and SL PRS (e.g., maximum {X} meters or maximum Y zones). In some designs, the SL PRS trigger may further indicate whether SL-PRS is aperiodic or semi-persistent. In some designs, the SL PRS trigger may further indicate a number of PRS instances in the request for semi-persistent SL-PRS. In some designs, on-demand SL PRS cancellation may be performed if necessary to accommodate higher-priority SL traffic Referring to FIG. 22, at 2212, sidelink anchors (optionally) transmit SL PRS responses. In some designs, SL anchors that received the SL PRS trigger may NACK/ACK the SL PRS trigger through SL. Here, ACK indicates acceptance of the SL PRS trigger rather than mere receipt of the SL PRS trigger, and ACK indicates rejection of the SL PRS trigger. In some designs, a receiver UE (SL-anchor) sends ACK if the sidelink anchor is within the maximum range. In some designs, receiver UE (SL-anchor) sends NACK if the sidelink anchor is not available due to scheduling conflict. In some designs, SL PRS responses could further reduce the SL-PRS blind-search overhead, especially for semi-persistent SL-PRS. This comes with the cost of extra signaling overhead. For aperiodic SL-PRS, in some designs, SL PRS responses can be skipped and target UE can blind decode and/or descramble for every potential SL-anchors (e.g., for all SL PRS pre-configurations received at 2208). In this case, sidelink anchors 2-3 transmit SL PRS responses, and sidelink anchor 1 may opt out of the SL PRS position estimation procedure.

Referring to FIG. 22, at 2214-2216, a SL PRS exchange is performed between sidelink anchors 2-3 and the target UE. In this case, sidelink anchors 2-3 transmit SL PRS at 2214, and the target UE transmits SL PRS at 2216. In some designs, SL anchors in the required anchor group who receive the trigger may be expected to exchange SL-PRS with target UE. In some designs, a distance/proximity constraint may further require participating SL anchors to satisfy the distance requirements. In some designs, the distance can be computed from target UE zone ID and Rx UE (sidelink anchor) location. In some designs, zone distance can be computed from target UE zone ID and anchor zone ID. If zone based, the SL anchor in the same zone may ignore the request to reserve the SL-PRS sequence for target UE.

Referring to FIG. 22, at 2218 sidelink anchors 2-3, the target UE or a combination thereof transmit measurement report(s) to the position estimation entity. In some designs, independent reports may be transmitted by each UE (additional LPP sessions). In other designs, the target UE may consolidate measurement data from the sidelink anchors 2-3, and then send one report to the position estimation entity (one LPP session).

Figure 23:
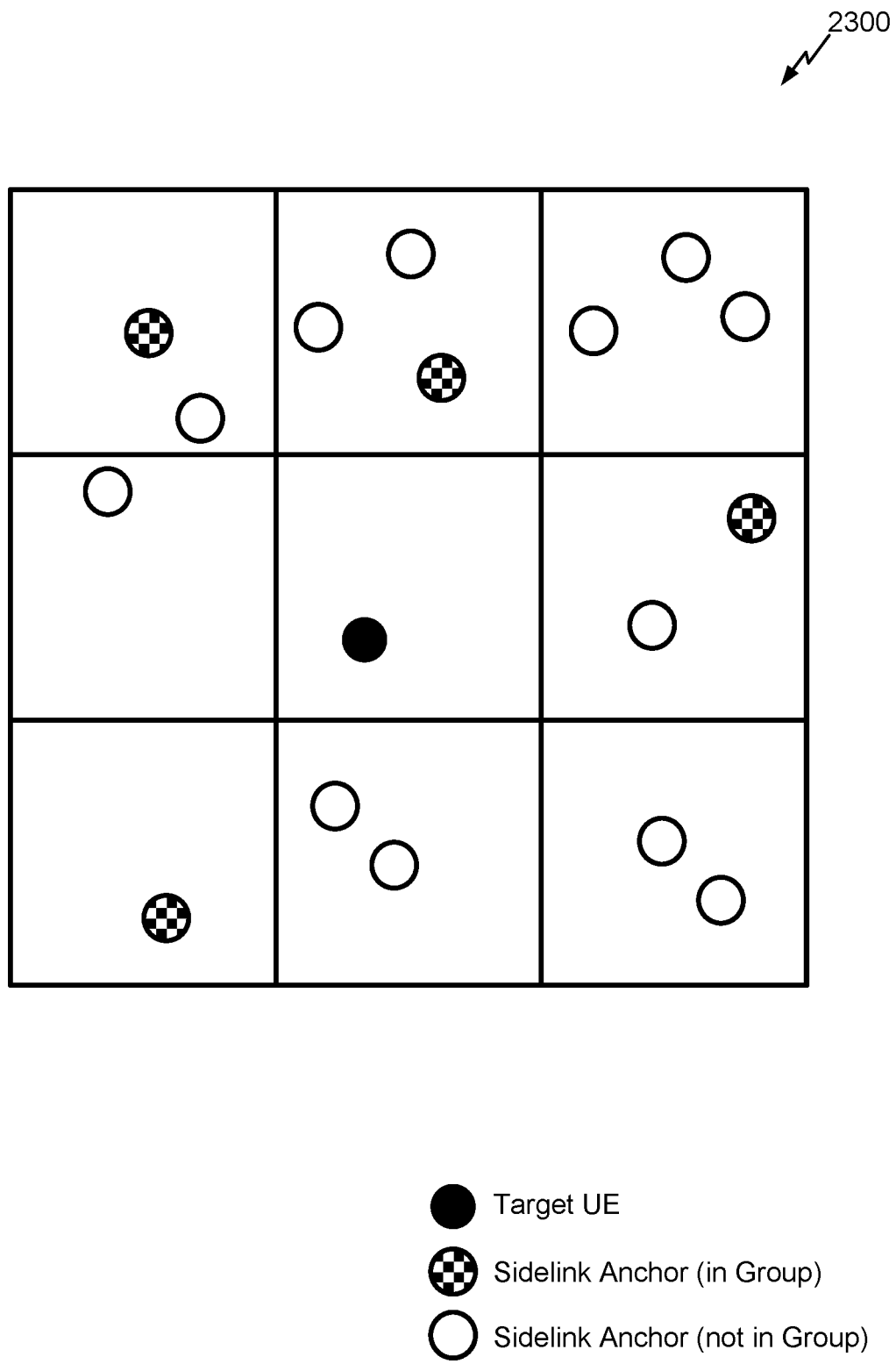
FIG. 23 illustrates a sidelink anchor group configuration in accordance with aspects of the disclosure

FIG. 23 illustrates a sidelink anchor group configuration 2300 in accordance with aspects of the disclosure. In particular, the sidelink anchor group configuration 2300 may be based upon execution of the processes 1900-2100 of FIGS.

19-21. In FIG. 23, sidelink anchor group configuration 2300 includes a sidelink anchor group with a maximum of one sidelink anchor per-zone within a single adjacent zone from a target UE.

While FIGS. 19-23 relate generally to on-demand SL PRS position estimation that is centrally controlled by a position estimation entity based on a designated sidelink anchor group, in other designs, dynamic sidelink anchor groups may be utilized. For example, a set of proximity-based sidelink PRS pre-configurations for on-demand PRS position estimation, and a target UE and sidelink anchor(s) may then setup an on-demand PRS position estimation session without further coordination with the position estimation entity. Such aspects may provide various technical advantages, such as facilitating on-demand SL PRS, which generally is associated with lower overhead and power consumption as compared to periodic broadcast SL PRS. Also, facilitating decentralized on-demand SL PRS may provide additional technical advantages, such as simplifying the on-demand SL PRS procedure, reducing configuration latency, and reducing beam pairing overhead.

Figure 24:
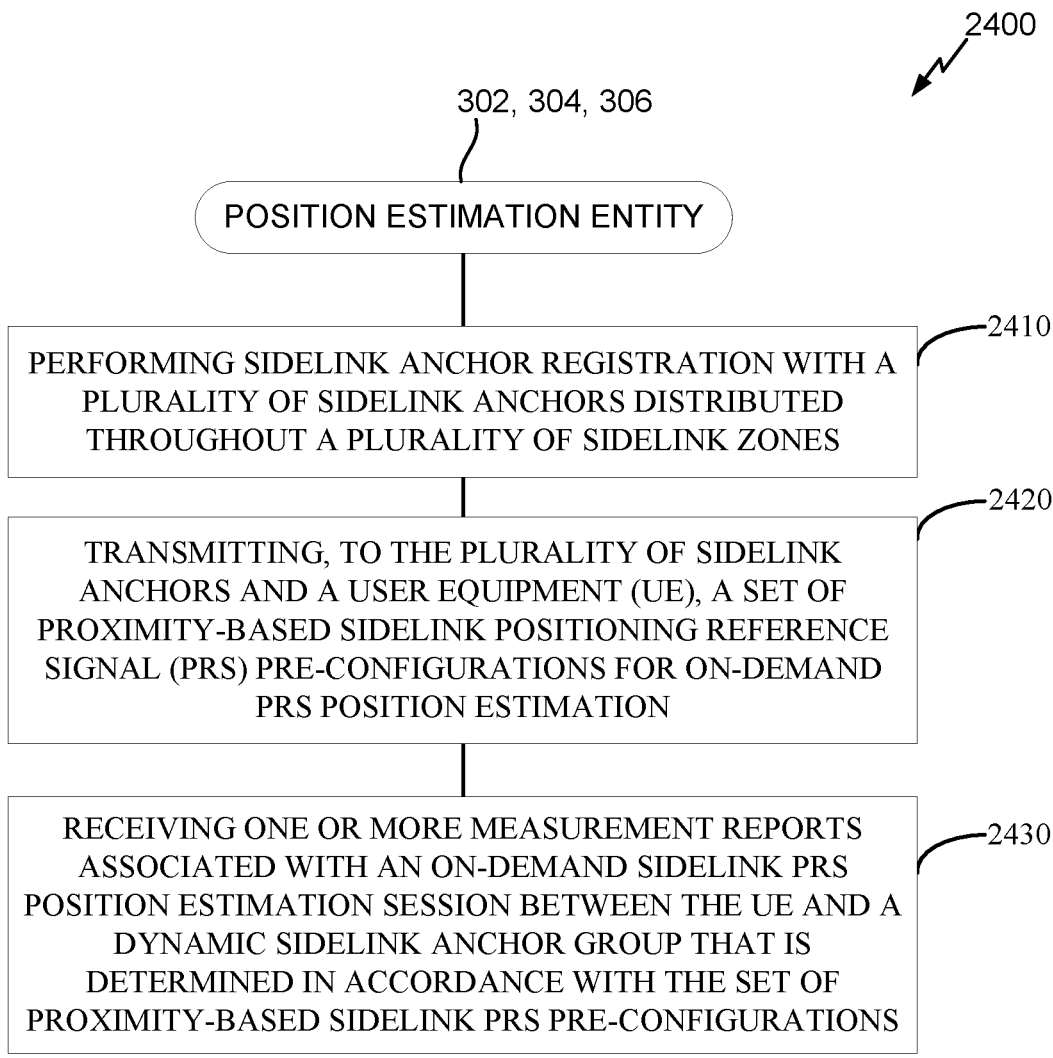
FIG. 24 illustrates an exemplary process of communication, according to aspects of the disclosure.

FIG. 24 illustrates an exemplary process 2400 of communication, according to aspects of the disclosure. In an aspect, the process 2400 may be performed by a position estimation entity, such as a UE (e.g., for UE-based position estimation) or a network component (e.g., gNB such as BS 304 for RAN-integrated LMF, or a core network-integrated LMF or a location server such as network entity 306, etc.).

Referring to FIG. 24, at 2410, the position estimation entity (e.g., receiver 312 or 322 or 352 or 362, transmitter 314 or 324 or 354 or 364, network transceiver(s) 380 or 390, etc.) performs sidelink anchor registration with a plurality of sidelink anchors distributed throughout a plurality of sidelink zones. In some designs, the plurality of sidelink zones is associated with a non-public network (NPN) (e.g., an IIoT factory environment, etc.). In some designs, the sidelink anchor registration may involve a negotiation or messaging exchange between the position estimation entity and the respective sidelink anchors. A means for performing the sidelink anchor registration of 2410 may include receiver 312 or 322 or 352 or 362, transmitter 314 or 324 or 354 or 364, network transceiver(s) 380 or 390, etc., depending on whether the position estimation entity corresponds to UE 302, or gNB such as BS 304 for RAN-integrated LMF, or a core network-integrated LMF or a location server such as network entity 306.

Referring to FIG. 24, at 2420, the position estimation entity (e.g., transmitter 314 or 324 or 354 or 364, data bus 334, network transceiver(s) 380 or 390, etc.) transmits, to the plurality of sidelink anchors and a UE, a set of proximity-based sidelink PRS pre-configurations for on-demand PRS position estimation. In some designs, each proximity-based sidelink PRS pre-configuration of the set of proximity-based sidelink PRS pre-configurations designates a sidelink PRS frequency layer, a first offset from a sidelink PRS trigger from the UE to a sidelink PRS transmission from the respective sidelink anchor, an expected reception time of sidelink PRS from the UE, a comb type, a muting pattern, or a combination thereof. In some designs, the set of proximity-based sidelink PRS pre-configurations is based at least in part upon a number of sidelink zones among the plurality of sidelink zones. In some designs, the set of proximity-based sidelink PRS pre-configurations comprises one or more sidelink zone-specific parameters. In some designs, the plurality of sidelink anchors based on a sidelink anchor constraint that limits a number of sidelink anchors assigned per sidelink zone (e.g., based on one or more of UE capability, mobility status, power supply, position estimation accuracy, or a combination thereof). A means for performing the transmission of 2420 may include transmitter 314 or 324 or 354 or 364, network transceiver(s) 380 or 390, etc., depending on whether the position estimation entity corresponds to UE 302, or gNB such as BS 304 for RAN-integrated LMF, or a core network-integrated LMF or a location server such as network entity 306.

Referring to FIG. 24, at 2430, the position estimation entity (e.g., receiver 312 or 322 or 352 or 362, network transceiver(s) 380 or 390, etc.) receives one or more measurement reports associated with an on-demand sidelink PRS position estimation session between the UE and a dynamic sidelink anchor group that is determined in accordance with the set of proximity-based sidelink PRS pre-configurations. The measurement report(s) may be received from a single UE or multiple UEs associated with the on-demand sidelink PRS position estimation session. A means for performing the reception of 2430 may include receiver 312 or 322 or 352 or 362, network transceiver(s) 380 or 390, etc., depending on whether the position estimation entity corresponds to UE 302, or gNB such as BS 304 for RAN-integrated LMF, or a core network-integrated LMF or a location server such as network entity 306.

Figure 25:
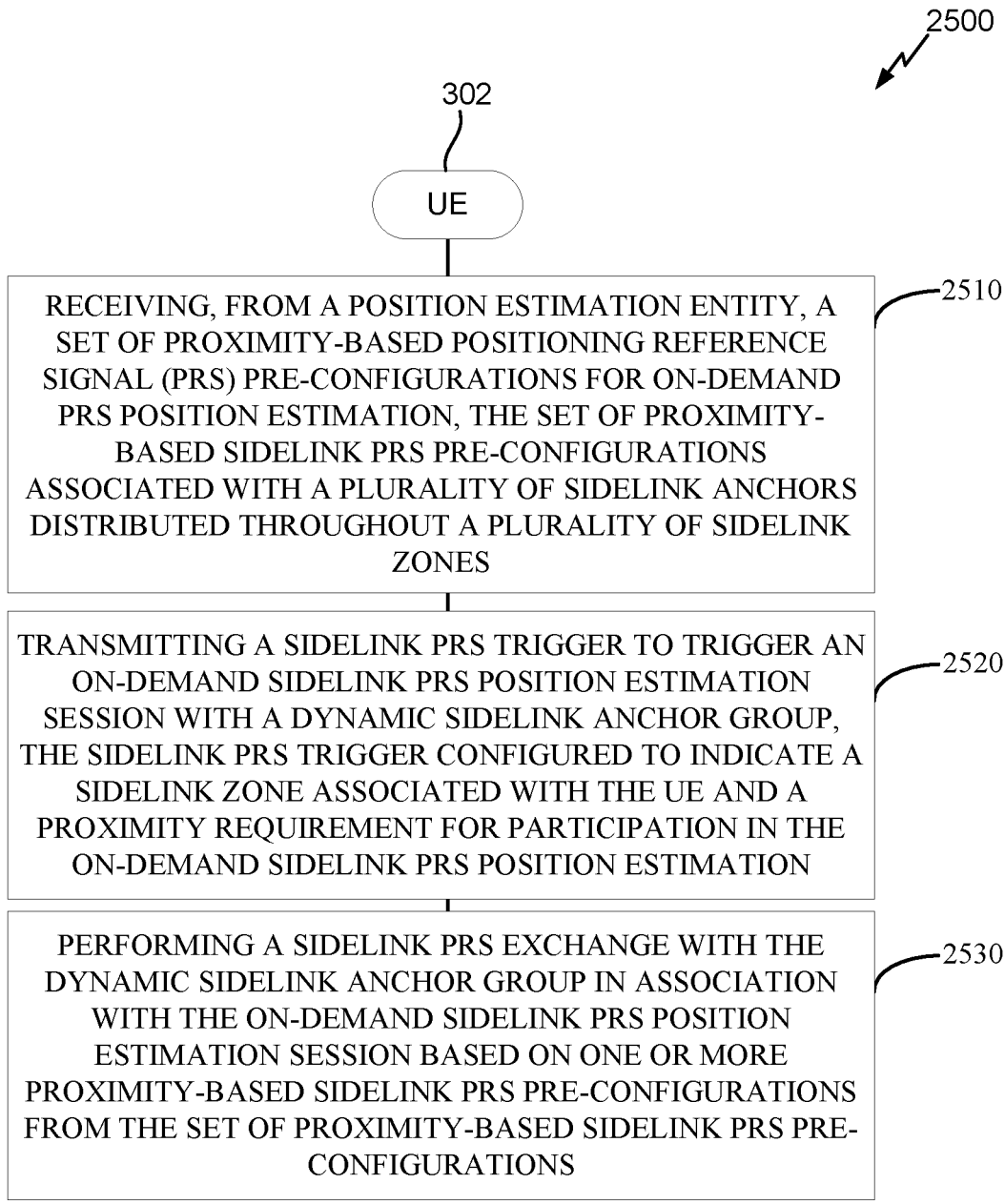
FIG. 25 illustrates an exemplary process of wireless communication, according to aspects of the disclosure.

FIG. 25 illustrates an exemplary process 2500 of wireless communication, according to aspects of the disclosure. In an aspect, the process 2500 may be performed by a UE, such as UE 302. In particular, the UE that performs the process 2500 of FIG. 21 corresponds to a UE for which a position estimate is desired, generally referred to as a target UE.

Referring to FIG. 25, at 2510, UE 302 (e.g., receiver 312 or 322, data bus 334, etc.) receives, from a position estimation entity, a set of proximity-based sidelink PRS pre-configurations for on-demand PRS position estimation, the set of proximity-based sidelink PRS pre-configurations associated with a plurality of sidelink anchors distributed throughout a plurality of sidelink zones. In some designs, each proximity-based sidelink PRS pre-configuration of the set of proximity-based sidelink PRS pre-configurations designates a sidelink PRS frequency layer, a first offset from a sidelink PRS trigger from the UE to a sidelink PRS transmission from the respective sidelink anchor, an expected reception time of sidelink PRS from the UE, a comb type, a muting pattern, or a combination thereof. In some designs, the set of proximity-based sidelink PRS pre-configurations is based at least in part upon a number of sidelink zones among the plurality of sidelink zones. In some designs, the set of proximity-based sidelink PRS pre-configurations comprises one or more sidelink zone-specific parameters. In some designs, the plurality of sidelink anchors based on a sidelink anchor constraint that limits a number of sidelink anchors assigned per sidelink zone (e.g., based on one or more of UE capability, mobility status, power supply, position estimation accuracy, or a combination thereof). In some designs, the plurality of sidelink zones is associated with a non-public network (NPN) (e.g., an IIoT factory environment, etc.). A means for performing the reception of 2510 may include receiver 312 or 322, data bus 334, etc., of UE 302.

Referring to FIG. 25, at 2520, UE 302 (e.g., transmitter 314 or 324, data bus 334, etc.) transmits, a sidelink PRS trigger to trigger an on-demand sidelink PRS position estimation session with a dynamic sidelink anchor group, the sidelink PRS trigger configured to indicate a sidelink zone associated with the UE and a proximity requirement for participation in the on-demand sidelink PRS position estimation. In some designs, the proximity requirement designates a maximum distance from the sidelink zone associated with the UE, a minimum distance from the sidelink zone associated with the UE, or a combination thereof. A means for performing the transmission of 2520 may include transmitter 314 or 324, data bus 334, etc., of UE 302.

Referring to FIG. 25, at 2530, UE 302 (e.g., receiver 312 or 322, transmitter 314 or 324, etc.) performs a sidelink PRS exchange with the dynamic sidelink anchor group in association with the on-demand sidelink PRS position estimation session based on one or more proximity-based sidelink PRS pre-configurations from the set of proximity-based sidelink PRS pre-configurations. In some designs, the sidelink PRS exchange includes a two-way PRS exchange between the UE and each respective sidelink anchor in the dynamic sidelink anchor group (e.g., UE sends SL PRS to sidelink anchor, which responds with SL PRS, or vice versa, e.g., for RTT measurements, such as Tx-Rx, etc.), or a one-way PRS exchange (e.g., from UE to each sidelink anchor, or each sidelink anchor to UE, e.g., for TDOA measurements), or some combination thereof. In some designs, one or more beams for the sidelink PRS exchange are determined based on a spatial relationship between the sidelink zone associated with the UE and one or more sidelink zones associated with the dynamic sidelink anchor group. In some designs, the sidelink PRS exchange comprises blind decoding and/or descrambling for sidelink PRS from the dynamic sidelink anchor group in accordance with a zone-specific sequence, or the sidelink PRS exchange comprises selective decoding and/or descrambling for sidelink PRS from the dynamic sidelink anchor group based on feedback to the sidelink PRS trigger from the dynamic sidelink anchor group. A means for performing the sidelink PRS exchange of 2530 may include receiver 312 or 322, transmitter 314 or 324, etc., of UE 302.

Figure 26:
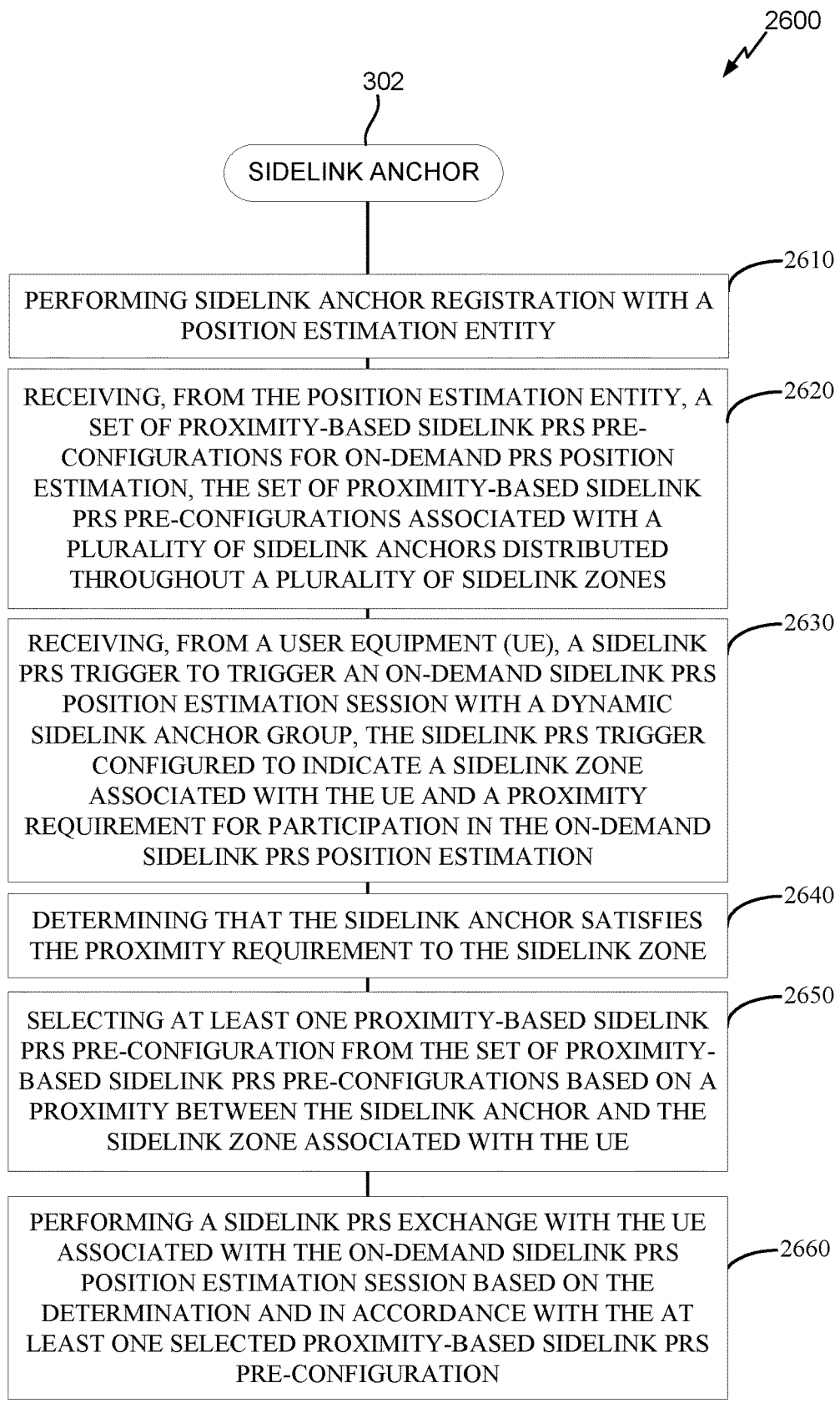
FIG. 26 illustrates an exemplary process of wireless communication, according to aspects of the disclosure.

FIG. 26 illustrates an exemplary process 2600 of wireless communication, according to aspects of the disclosure. In an aspect, the process 2600 may be performed by a sidelink anchor, which may correspond to a UE such as UE 302. In some designs, to qualify as a sidelink anchor, the sidelink anchor may be associated with a known location (e.g., from a recent position estimation fix, etc.).

Referring to FIG. 26, at 2610, the sidelink anchor (e.g., receiver 312 or 322, transmitter 314 or 324, data bus 334, etc.) performs sidelink anchor registration with a position estimation entity. In some designs, the sidelink anchor registration may involve a negotiation or messaging exchange between the position estimation entity and the sidelink anchor. A means for performing the sidelink anchor registration of 2610 may include receiver 312 or 322, transmitter 314 or 324, data bus 334, etc., of UE 302.

Referring to FIG. 26, at 2620, the sidelink anchor (e.g., receiver 312 or 322, data bus 334, etc.) receives, from the position estimation entity, a set of proximity-based sidelink PRS pre-configurations for on-demand PRS position estimation, the set of proximity-based sidelink PRS pre-configurations associated with a plurality of sidelink anchors distributed throughout a plurality of sidelink zones. In some designs, the plurality of sidelink zones is associated with a non-public network (NPN) (e.g., an IIoT factory environment, etc.). In some designs, each proximity-based sidelink PRS pre-configuration of the set of proximity-based sidelink PRS pre-configurations designates a sidelink PRS frequency layer, a first offset from a sidelink PRS trigger from the UE to a sidelink PRS transmission from the respective sidelink anchor, an expected reception time of sidelink PRS from the UE, a comb type, a muting pattern, or a combination thereof. In some designs, the set of proximity-based sidelink PRS pre-configurations is based at least in part upon a number of sidelink zones among the plurality of sidelink zones. In some designs, the set of proximity-based sidelink PRS pre-configurations comprises one or more sidelink zone-specific parameters. In some designs, the plurality of sidelink anchors based on a sidelink anchor constraint that limits a number of sidelink anchors assigned per sidelink zone (e.g., based on one or more of UE capability, mobility status, power supply, position estimation accuracy, or a combination thereof). A means for performing the reception of 2620 may include receiver 312 or 322, data bus 334, etc., of UE 302.

Referring to FIG. 26, at 2630, the sidelink anchor (e.g., receiver 312 or 322, etc.) receives, from a UE, a sidelink PRS trigger to trigger an on-demand sidelink PRS position estimation session with a dynamic sidelink anchor group, the sidelink PRS trigger configured to indicate a sidelink zone associated with the UE and a proximity requirement for participation in the on-demand sidelink PRS position estimation. In some designs, the proximity requirement designates a maximum distance from the sidelink zone associated with the UE, a minimum distance from the sidelink zone associated with the UE, or a combination thereof. A means for performing the reception of 2630 may include receiver 312 or 322, of UE 302.

Referring to FIG. 26, at 2640, the sidelink anchor (e.g., processor(s) 332, on-demand PRS component 342, etc.) determines that the sidelink anchor satisfies the proximity requirement to the sidelink zone. The determination of 2640 may be performed in various ways, as will be described below in greater detail. A means for performing the determination of 2640 may include receiver 312 or 322, of UE 302.

Referring to FIG. 26, at 2650, the sidelink anchor (e.g., processor(s) 332, on-demand PRS component 342, etc.) selects at least one proximity-based sidelink PRS pre-configuration from the set of proximity-based sidelink PRS pre-configurations based on a proximity between the sidelink anchor and the sidelink zone associated with the UE. The selection of 2650 may be performed in various ways, as will be described below in greater detail. A means for performing the selection of 2650 may include receiver 312 or 322, of UE 302.

Referring to FIG. 26, at 2660, the sidelink anchor (e.g., receiver 312 or 322, transmitter 314 or 324, etc.) performs a sidelink PRS exchange with the UE associated with the on-demand sidelink PRS position estimation session based on the determination and in accordance with the at least one selected proximity-based sidelink PRS pre-configuration. In some designs, the sidelink PRS exchange includes a two-way PRS exchange between the UE and the sidelink anchor i (e.g., UE sends SL PRS to sidelink anchor, which responds with SL PRS, or vice versa, e.g., for RTT measurements, such as Tx-Rx, etc.), or a one-way PRS exchange (e.g., from UE to sidelink anchor, or sidelink anchor to UE, e.g., for TDOA measurements), or some combination thereof. In some designs, one or more beams for the sidelink PRS exchange are determined based on a spatial relationship between the sidelink zone associated with the UE and one or more sidelink zones associated with the dynamic sidelink anchor group. In some designs, the sidelink anchor may transmit a response to the sidelink PRS trigger to facilitate the sidelink PRS exchange between the UE and the sidelink anchor (e.g., ACK/NACK to reduce blind decoding and/or descrambling at target UE, etc.). A means for performing the sidelink PRS exchange of 2660 may include receiver 312 or 322, transmitter 314 or 324, etc., of UE 302.

Figure 27:
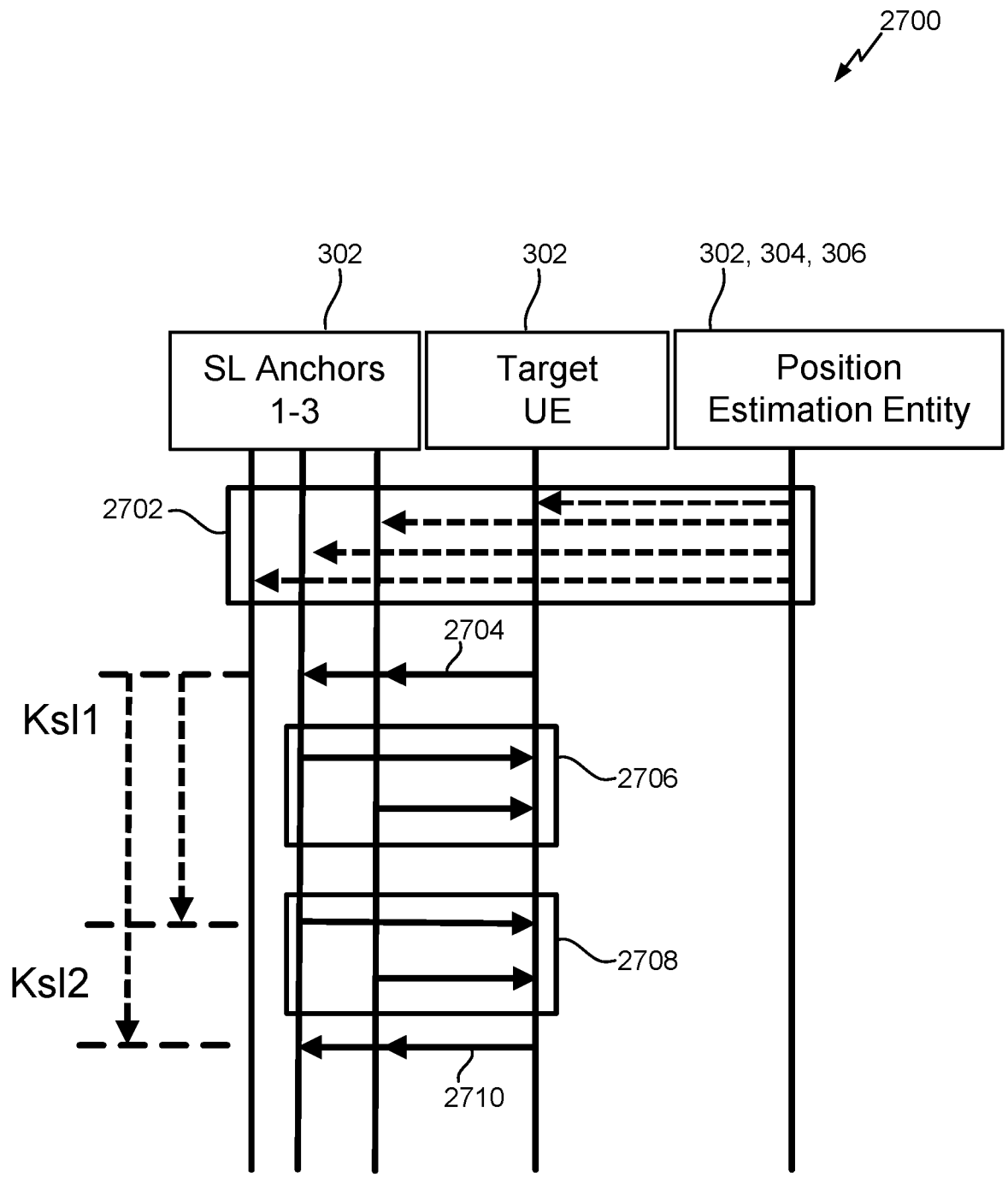
FIG. 27 illustrates an example implementation of the processes of FIGS. 24-26, respectively, in accordance with an aspect of the disclosure.

FIG. 27 illustrates an example implementation 2700 of the processes 2400-2600 of FIGS. 24-26, respectively, in accordance with an aspect of the disclosure. In particular, the example implementation 2700 involves a sidelink PRS procedure between a target UE and sidelink anchors 1-3.

Figure 28:
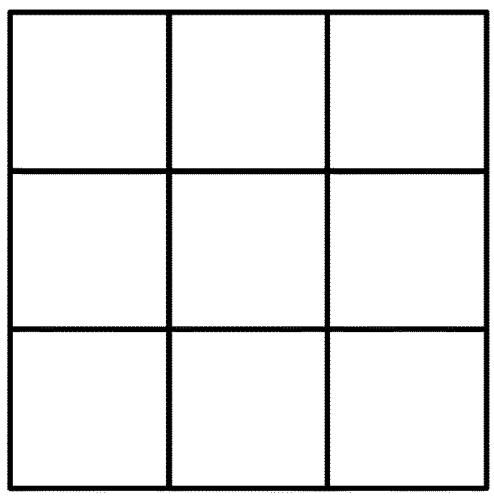
FIG. 28 illustrates sidelink zone configurations in accordance with aspects of the disclosure.
Figure 28:
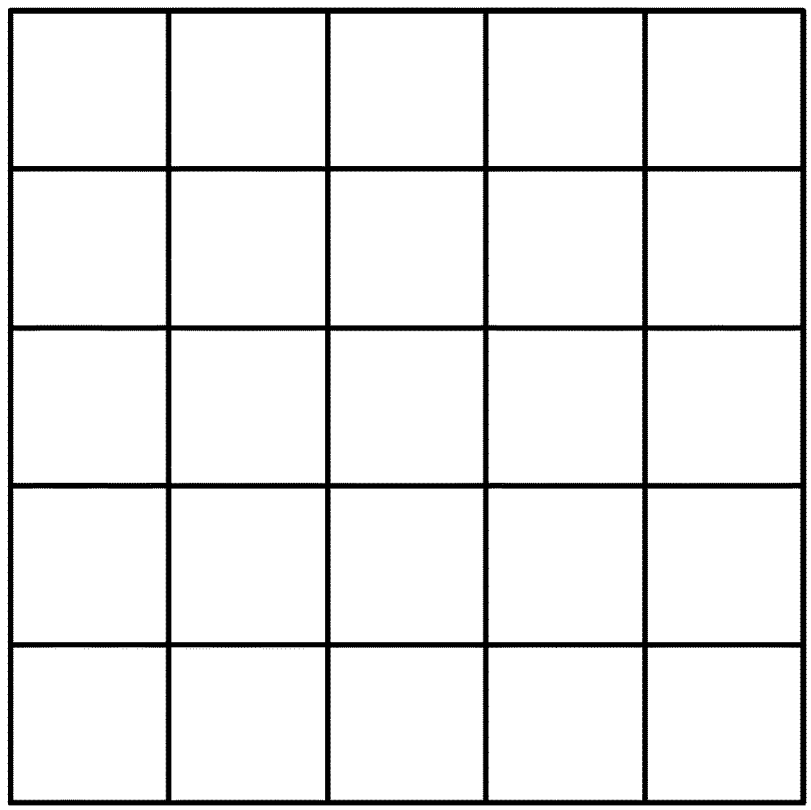
Figure 29:
FIG. 29 illustrates proximity-based sidelink PRS preconfigurations FOR sidelink zone configurations in accordance with aspects of the disclosure.

Referring to FIG. 27, assume that sidelink anchors 1-3 are registered as sidelink anchor registration with a position estimation entity. At 2702, a set of proximity-based sidelink PRS pre-configurations is sent to each of sidelink anchors 1-3, and also to a target UE. In some designs, the set of proximity-based sidelink PRS pre-configurations is based on proximity size. FIG. 28 illustrates sidelink zone configurations in accordance with aspects of the disclosure. At 2800, a 9-zone configuration is depicted (e.g., maximum zone distance of 1 from target UE), and at 2850, a 25-zone configuration (e.g., maximum zone distance of 2 from target UE). Here, the zone configurations 2800-2850 may be used to define the set of proximity-based sidelink PRS pre-configurations, as shown in FIG. 29. In FIG. 29, at 2900, a set of proximity-based sidelink PRS pre-configurations is shown a 9-zone configuration (4 proximity-based sidelink PRS pre-configurations for each of 8 adjacent neighbor zones to a zone of a target UE). In FIG. 29, at 2950, a set of proximity-based sidelink PRS pre-configurations is shown for a 25-zone configuration (6 proximity-based sidelink PRS pre-configurations for each of 24 neighbor zones to a zone of a target UE). In FIG. 29, the proximity-based sidelink PRS pre-configurations have a semi-static configuration.

Referring to FIG. 27, in some designs, set of proximity-based sidelink PRS pre-configurations may include parameters such as SL PRS frequency layer and frequency layer, time scheduling of each zone (e.g., Ksl1 and Ksl2, as described above), comb type and muting pattern, and so on. In some designs, a PRS sequence ID need not be assigned for each sidelink anchor or target UE, as the PRS sequence ID may instead be determined via SL zone identifier. In some designs, the set of proximity-based sidelink PRS pre-configurations (e.g., 1-4 in 2900 of FIG. 29, or 1-6 in 2950 of FIG. 29) may be associated with different timings. For example, sidelink anchors in zones "1" may use comb2 in slot 1, sidelink anchors in zones "2" may use comb2 in slot 2, and so on. In some designs, SL anchor management/selection may be performed in a zone-specific manner. For example, each zone may have multiple candidate SL anchors. If all candidate SL anchors transmit and receive SL PRS, poor performance may result. In some designs, the position estimation entity (e.g., LMF, etc.) may select one UE (or some maximum number of UEs) in a zone as a delegate (e.g., based on UE capability, mobility status, power supply, estimation accuracy, etc.

Referring to FIG. 27, in some designs, proper time and spatial scheduling may efficiently reduce the SL-beam pairing overhead for both target UE and SL anchor UEs. For example, given the spatial relations between zones, both UEs can estimate the best beams for SL-PRS assuming their orientations are known. In an example, SL anchors in zones "5" of the 25-zone configuration 2950 of FIG. 29 and target UE may have prior knowledge of the relative direction of each other, so that the corresponding Rx/Tx beams can be tuned.

Referring to FIG. 27, at 2704, instead of transmitting SL PRS request to the position estimation entity as at 2206 of FIG. 22, the target UE instead transmits SL PRS trigger via SL broadcast or SL groupcast. For example, the SL PRS trigger includes the zone identifier for the target UE and proximity requirement(s) (e.g., maximum of 1 zone distance for 9-zone configuration, maximum of 2 zone distance for 25-zone configuration, etc.).

Referring to FIG. 27, at 2706, sidelink anchors (optionally) transmit SL PRS responses. In some designs, SL anchors that satisfy the proximity requirement(s) of the SL PRS trigger may ACK the SL PRS trigger through SL. In this case, sidelink anchors 2-3 transmit SL PRS responses, and sidelink anchor 1 may opt out of the SL PRS position estimation procedure.

Referring to FIG. 27, at 2708-2710, a SL PRS exchange is performed between sidelink anchors 2-3 and the target UE. In this case, sidelink anchors 2-3 transmit SL PRS at 2708, and the target UE transmits SL PRS at 2710. In some designs, SL anchors who receive the SL PRS trigger and meet the requirements are activated for on-demand PRS. In some designs, SL anchor transmits SL PRS using scheduled slot offset and SL-PRS FL and zone-based SL-PRS ID. In some designs, the target UE receives SL PRS using scheduled slot offset and SL-PRS FL and blind search using the scheduled zone sequence. With additional feedback (ACK/NACK) from SL anchors, target UE may not need to blind decode and/or descramble. While not shown in FIG. 27, the target UE or a combination thereof transmit measurement report(s) to the position estimation entity. In some designs, independent reports may be transmitted by each UE (additional LPP sessions). In other designs, the target UE may consolidate measurement data from the sidelink anchors 2-3, and then send one report to the position estimation entity (one LPP session).

Referring to FIGS. 24-26, in some designs, the plurality of sidelink zones comprises at least one dead zone where Uu-based position estimation does not satisfy an accuracy requirement. For example, due to blockage problems, there might be some positioning dead zones where the positioning accuracy requirement cannot be met using Uu only. In some designs, on-demand PRS measurements report can be considered a feedback of dead zone region (e.g., if a frequency or probability of on-demand SL is high in certain SL zones, the LMF may gradually understands that this SL-zone may be considered as dead zone). The LMF may then associate the dead zone region with respective SL zone IDs. LMF may further provide assistance data (e.g., to UEs in the region via SIB, etc.) about the dead zone location using the SL-zone ID.

Figure 30:
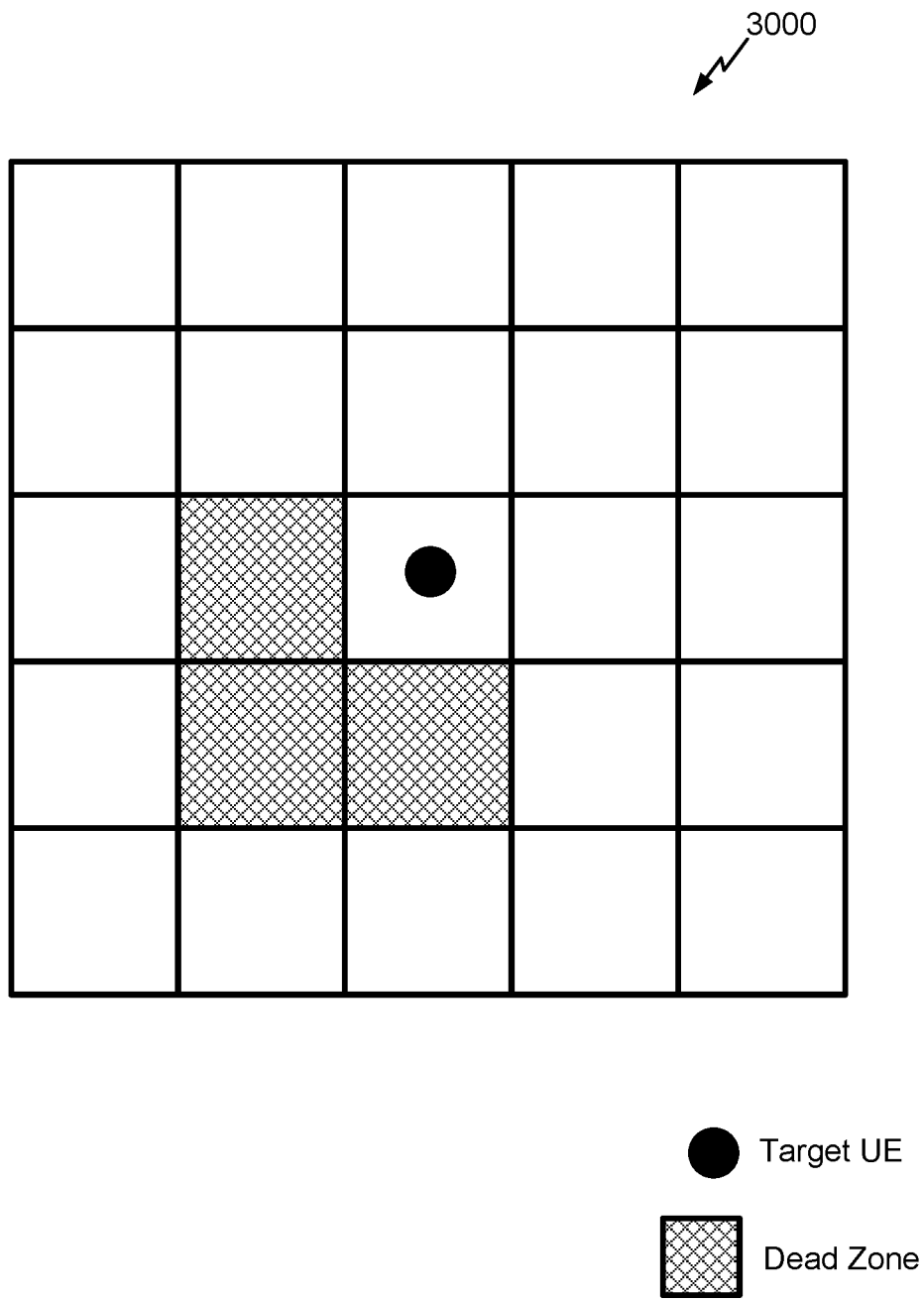
FIG. 30 illustrates a 25-zone configuration that includes 3 dead zones.

FIG. 30 illustrates a 25-zone configuration 3000 that includes 3 dead zones. In some designs, the position estimation entity instructs the UE to trigger the on-demand sidelink PRS position estimation session upon entry into the at least one dead zone. Alternatively, the position estimation entity triggers the on-demand sidelink PRS position estimation session upon detection that the UE has entered into the at least one dead zone.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a position estimation entity, comprising: performing sidelink anchor registration with a plurality of sidelink anchors; configuring a sidelink anchor group from among the plurality of sidelink anchors based on a set of criteria; transmitting, to each sidelink anchor of the sidelink anchor group, a respective sidelink PRS pre-configuration; receiving, from a user equipment (UE), a request to schedule an on-demand sidelink positioning reference signal (PRS) position estimation session of the UE; transmitting, to the UE, a sidelink PRS response that comprises assistance data associated with the sidelink anchor group for the on-demand sidelink PRS position estimation session; and receiving one or more measurement reports associated with the on-demand sidelink PRS position estimation session.

Clause 2. The method of clause 1, wherein the set of criteria includes a comprises: a mobility status of the plurality of sidelink anchors, a position estimation accuracy or capability associated with the plurality of sidelink anchors, or a combination thereof.

Clause 3. The method of any of clauses 1 to 2, wherein the sidelink PRS pre-configuration specifies for each sidelink anchor in the sidelink anchor group, a first offset from a sidelink PRS trigger from the UE to a sidelink PRS transmission from the respective sidelink anchor, an expected reception time of sidelink PRS from the UE, or a combination thereof.

Clause 4. The method of any of clauses 1 to 3, wherein the assistance data comprises a sidelink anchor group identifier, a private key, a resource grant for transmission of a sidelink PRS trigger from the UE to the sidelink anchor group, a sidelink PRS pre-configuration associated with the sidelink anchor group for the on-demand sidelink PRS position estimation session, a sidelink anchor identifier for a sidelink PRS trigger from the UE to the sidelink anchor group, or a combination thereof.

Clause 5. A method of operating a user equipment (UE), comprising: transmitting, to a position estimation entity, a request to schedule an on-demand sidelink positioning reference signal (PRS) position estimation session of the UE; receiving, from the position estimation entity, a sidelink PRS response that comprises assistance data associated with a sidelink anchor group for the on-demand sidelink PRS position estimation session; transmitting, to the sidelink anchor group, a sidelink PRS trigger to trigger the on-demand sidelink PRS position estimation session in accordance with respective sidelink PRS pre-configurations of the sidelink anchor group; and performing a sidelink PRS exchange with one or more sidelink anchors of the sidelink anchor group in association with the on-demand sidelink PRS position estimation session.

Clause 6. The method of clause 5, further comprising: transmitting a measurement report based on the sidelink PRS exchange to the position estimation entity.

Clause 7. The method of any of clauses 5 to 6, wherein the sidelink PRS trigger is transmitted via multicast or broadcast.

Clause 8. The method of any of clauses 5 to 7, wherein the sidelink PRS trigger comprises an indication of a sidelink zone in which the UE is located.

Clause 9. The method of any of clauses 5 to 8, wherein the sidelink PRS trigger designates a maximum range between the UE and a respective sidelink anchor for the respective sidelink anchor to accept the sidelink PRS trigger.

Clause 10. The method of any of clauses 6 to 9, further comprising: receiving, from at least one sidelink anchor of the sidelink anchor group, a sidelink PRS trigger response.

Clause 11. The method of clause 10, wherein the sidelink PRS trigger response indicates acceptance or rejection of the sidelink PRS trigger, and wherein the sidelink PRS exchange comprises blind decoding or descrambling only for SL PRS sidelink anchors from which a respective sidelink PRS trigger response that indicates acceptance of the sidelink PRS trigger is received.

Clause 12. The method of any of clauses 5 to 11, wherein the sidelink PRS exchange comprises blind decoding or descrambling for SL PRS for each sidelink anchor among the sidelink anchor group.

Clause 13. The method of any of clauses 5 to 12, wherein the assistance data comprises a sidelink anchor group identifier, a private key, a resource grant for transmission of a sidelink PRS trigger from the UE to the sidelink anchor group, a sidelink PRS configuration associated with the sidelink anchor group for the on-demand sidelink PRS position estimation session, a sidelink anchor identifier for a based sidelink PRS trigger from the UE to the sidelink anchor group, or a combination thereof.

Clause 14. A method of operating a sidelink anchor, comprising: performing sidelink anchor registration with a position estimation entity; receiving, from the position estimation entity in response to the sidelink anchor registration, a sidelink PRS pre-configuration associated with a sidelink anchor group; receiving, from a user equipment (UE), a sidelink PRS trigger that triggers the sidelink PRS pre-configuration for an on-demand sidelink PRS position estimation session of the UE with the sidelink anchor group; and performing a sidelink PRS exchange with the UE associated with the on-demand sidelink PRS position estimation session in response to the sidelink PRS trigger.

Clause 15. The method of clause 14, further comprising: transmitting a measurement report based on the sidelink PRS exchange to the position estimation entity.

Clause 16. The method of any of clauses 14 to 15, further comprising: determining to participate in the on-demand sidelink PRS position estimation session with the UE based on one or more criteria.

Clause 17. The method of clause 16, wherein the sidelink PRS trigger comprises an indication of a sidelink zone in which the UE is located, and wherein the one or more criteria comprises a relationship between the sidelink anchor and the sidelink zone in which the UE is located.

Clause 18. The method of any of clauses 16 to 17, wherein the sidelink PRS trigger designates a maximum range between the UE and a respective sidelink anchor for the respective sidelink anchor to accept the sidelink PRS trigger, and wherein the determination is based on whether the sidelink anchor is inside of the maximum range.

Clause 19. The method of any of clauses 14 to 18, further comprising: transmitting, to the UE, a sidelink PRS trigger response.

Clause 20. The method of clause 19, wherein the sidelink PRS trigger response indicates acceptance of the sidelink PRS trigger.

Clause 21. A position estimation entity, comprising: a memory; at least one transceiver; and at least one processor communicatively coupled to the memory and the at least one transceiver, the at least one processor configured to: perform sidelink anchor registration with a plurality of sidelink anchors; configure a sidelink anchor group from among the plurality of sidelink anchors based on a set of criteria; transmit, via the at least one transceiver, to each sidelink anchor of the sidelink anchor group, a respective sidelink PRS pre-configuration; receive, via the at least one transceiver, from a user equipment (UE), a request to schedule an on-demand sidelink positioning reference signal (PRS) position estimation session of the UE; transmit, via the at least one transceiver, to the UE, a sidelink PRS response that comprises assistance data associated with the sidelink anchor group for the on-demand sidelink PRS position estimation session; and receive, via the at least one transceiver, one or more measurement reports associated with the on-demand sidelink PRS position estimation session.

Clause 22. The position estimation entity of clause 21, wherein the set of criteria includes a comprises: a mobility status of the plurality of sidelink anchors, a position estimation accuracy or capability associated with the plurality of sidelink anchors, or a combination thereof.

Clause 23. The position estimation entity of any of clauses 21 to 22, wherein the sidelink PRS pre-configuration specifies for each sidelink anchor in the sidelink anchor group, a first offset from a sidelink PRS trigger from the UE to a sidelink PRS transmission from the respective sidelink anchor, an expected reception time of sidelink PRS from the UE, or a combination thereof.

Clause 24. The position estimation entity of any of clauses 21 to 23, wherein the assistance data comprises a sidelink anchor group identifier, a private key, a resource grant for transmission of a sidelink PRS trigger from the UE to the sidelink anchor group, a sidelink PRS pre-configuration associated with the sidelink anchor group for the on-demand sidelink PRS position estimation session, a sidelink anchor identifier for a sidelink PRS trigger from the UE to the sidelink anchor group, or a combination thereof.

Clause 25. A user equipment (UE), comprising: a memory; at least one transceiver; and at least one processor communicatively coupled to the memory and the at least one transceiver, the at least one processor configured to: transmit, via the at least one transceiver, to a position estimation entity, a request to schedule an on-demand sidelink positioning reference signal (PRS) position estimation session of the UE; receive, via the at least one transceiver, from the position estimation entity, a sidelink PRS response that comprises assistance data associated with a sidelink anchor group for the on-demand sidelink PRS position estimation session; transmit, via the at least one transceiver, to the sidelink anchor group, a sidelink PRS trigger to trigger the on-demand sidelink PRS position estimation session in accordance with respective sidelink PRS pre-configurations of the sidelink anchor group; and perform a sidelink PRS exchange with one or more sidelink anchors of the sidelink anchor group in association with the on-demand sidelink PRS position estimation session.

Clause 26. The UE of clause 25, wherein the at least one processor is further configured to: transmit, via the at least one transceiver, a measurement report based on the sidelink PRS exchange to the position estimation entity.

Clause 27. The UE of any of clauses 25 to 26, wherein the sidelink PRS trigger is transmitted via multicast or broadcast.

Clause 28. The UE of any of clauses 25 to 27, wherein the sidelink PRS trigger comprises an indication of a sidelink zone in which the UE is located.

Clause 29. The UE of any of clauses 25 to 28, wherein the sidelink PRS trigger designates a maximum range between the UE and a respective sidelink anchor for the respective sidelink anchor to accept the sidelink PRS trigger.

Clause 30. The UE of any of clauses 26 to 29, wherein the at least one processor is further configured to: receive, via the at least one transceiver, from at least one sidelink anchor of the sidelink anchor group, a sidelink PRS trigger response.

Clause 31. The UE of clause 30, wherein the sidelink PRS trigger response indicates acceptance or rejection of the sidelink PRS trigger, and wherein the sidelink PRS exchange comprises blind decoding or descrambling only for SL PRS sidelink anchors from which a respective sidelink PRS trigger response that indicates acceptance of the sidelink PRS trigger is received.

Clause 32. The UE of any of clauses 25 to 31, wherein the sidelink PRS exchange comprises blind decoding or descrambling for SL PRS for each sidelink anchor among the sidelink anchor group.

Clause 33. The UE of any of clauses 25 to 32, wherein the assistance data comprises a sidelink anchor group identifier, a private key, a resource grant for transmission of a sidelink PRS trigger from the UE to the sidelink anchor group, a sidelink PRS configuration associated with the sidelink anchor group for the on-demand sidelink PRS position estimation session, a sidelink anchor identifier for a based sidelink PRS trigger from the UE to the sidelink anchor group, or a combination thereof.

Clause 34. A sidelink anchor, comprising: a memory; at least one transceiver; and at least one processor communicatively coupled to the memory and the at least one transceiver, the at least one processor configured to: perform sidelink anchor registration with a position estimation entity; receive, via the at least one transceiver, from the position estimation entity in response to the sidelink anchor registration, a sidelink PRS pre-configuration associated with a sidelink anchor group; receive, via the at least one transceiver, from a user equipment (UE), a sidelink PRS trigger that triggers the sidelink PRS pre-configuration for an on-demand sidelink PRS position estimation session of the UE with the sidelink anchor group; and perform a sidelink PRS exchange with the UE associated with the on-demand sidelink PRS position estimation session in response to the sidelink PRS trigger.

Clause 35. The sidelink anchor of clause 34, wherein the at least one processor is further configured to: transmit, via the at least one transceiver, a measurement report based on the sidelink PRS exchange to the position estimation entity.

Clause 36. The sidelink anchor of any of clauses 34 to 35, wherein the at least one processor is further configured to: determine to participate in the on-demand sidelink PRS position estimation session with the UE based on one or more criteria.

Clause 37. The sidelink anchor of clause 36, wherein the sidelink PRS trigger comprises an indication of a sidelink zone in which the UE is located, and wherein the one or more criteria comprises a relationship between the sidelink anchor and the sidelink zone in which the UE is located.

Clause 38. The sidelink anchor of any of clauses 36 to 37, wherein the sidelink PRS trigger designates a maximum range between the UE and a respective sidelink anchor for the respective sidelink anchor to accept the sidelink PRS trigger, and wherein the determination is based on whether the sidelink anchor is inside of the maximum range.

Clause 39. The sidelink anchor of any of clauses 34 to 38, wherein the at least one processor is further configured to: transmit, via the at least one transceiver, to the UE, a sidelink PRS trigger response.

Clause 40. The sidelink anchor of clause 39, wherein the sidelink PRS trigger response indicates acceptance of the sidelink PRS trigger.

Clause 41. A position estimation entity, comprising: means for performing sidelink anchor registration with a plurality of sidelink anchors; means for configuring a sidelink anchor group from among the plurality of sidelink anchors based on a set of criteria; means for transmitting, to each sidelink anchor of the sidelink anchor group, a respective sidelink PRS pre-configuration; means for receiving, from a user equipment (UE), a request to schedule an on-demand sidelink positioning reference signal (PRS) position estimation session of the UE; means for transmitting, to the UE, a sidelink PRS response that comprises assistance data associated with the sidelink anchor group for the on-demand sidelink PRS position estimation session; and means for receiving one or more measurement reports associated with the on-demand sidelink PRS position estimation session.

Clause 42. The position estimation entity of clause 41, wherein the set of criteria includes a comprises: a mobility status of the plurality of sidelink anchors, a position estimation accuracy or capability associated with the plurality of sidelink anchors, or a combination thereof.

Clause 43. The position estimation entity of any of clauses 41 to 42, wherein the sidelink PRS pre-configuration specifies for each sidelink anchor in the sidelink anchor group, a first offset from a sidelink PRS trigger from the UE to a sidelink PRS transmission from the respective sidelink anchor, an expected reception time of sidelink PRS from the UE, or a combination thereof.

Clause 44. The position estimation entity of any of clauses 41 to 43, wherein the assistance data comprises a sidelink anchor group identifier, a private key, a resource grant for transmission of a sidelink PRS trigger from the UE to the sidelink anchor group, a sidelink PRS pre-configuration associated with the sidelink anchor group for the on-demand sidelink PRS position estimation session, a sidelink anchor identifier for a sidelink PRS trigger from the UE to the sidelink anchor group, or a combination thereof.

Clause 45. A user equipment (UE), comprising: means for transmitting, to a position estimation entity, a request to schedule an on-demand sidelink positioning reference signal (PRS) position estimation session of the UE; means for receiving, from the position estimation entity, a sidelink PRS response that comprises assistance data associated with a sidelink anchor group for the on-demand sidelink PRS position estimation session; means for transmitting, to the sidelink anchor group, a sidelink PRS trigger to trigger the on-demand sidelink PRS position estimation session in accordance with respective sidelink PRS pre-configurations of the sidelink anchor group; and means for performing a sidelink PRS exchange with one or more sidelink anchors of the sidelink anchor group in association with the on-demand sidelink PRS position estimation session.

Clause 46. The UE of clause 45, further comprising: means for transmitting a measurement report based on the sidelink PRS exchange to the position estimation entity.

Clause 47. The UE of any of clauses 45 to 46, wherein the sidelink PRS trigger is transmitted via multicast or broadcast.

Clause 48. The UE of any of clauses 45 to 47, wherein the sidelink PRS trigger comprises an indication of a sidelink zone in which the UE is located.

Clause 49. The UE of any of clauses 45 to 48, wherein the sidelink PRS trigger designates a maximum range between the UE and a respective sidelink anchor for the respective sidelink anchor to accept the sidelink PRS trigger.

Clause 50. The UE of any of clauses 46 to 49, further comprising: means for receiving, from at least one sidelink anchor of the sidelink anchor group, a sidelink PRS trigger response.

Clause 51. The UE of clause 50, wherein the sidelink PRS trigger response indicates acceptance or rejection of the sidelink PRS trigger, and wherein the sidelink PRS exchange comprises blind decoding or descrambling only for SL PRS sidelink anchors from which a respective sidelink PRS trigger response that indicates acceptance of the sidelink PRS trigger is received.

Clause 52. The UE of any of clauses 45 to 51, wherein the sidelink PRS exchange comprises blind decoding or descrambling for SL PRS for each sidelink anchor among the sidelink anchor group.

Clause 53. The UE of any of clauses 45 to 52, wherein the assistance data comprises a sidelink anchor group identifier, a private key, a resource grant for transmission of a sidelink PRS trigger from the UE to the sidelink anchor group, a sidelink PRS configuration associated with the sidelink anchor group for the on-demand sidelink PRS position estimation session, a sidelink anchor identifier for a based sidelink PRS trigger from the UE to the sidelink anchor group, or a combination thereof.

Clause 54. A sidelink anchor, comprising: means for performing sidelink anchor registration with a position estimation entity; means for receiving, from the position estimation entity in response to the sidelink anchor registration, a sidelink PRS pre-configuration associated with a sidelink anchor group; means for receiving, from a user equipment (UE), a sidelink PRS trigger that triggers the sidelink PRS pre-configuration for an on-demand sidelink PRS position estimation session of the UE with the sidelink anchor group; and means for performing a sidelink PRS exchange with the UE associated with the on-demand sidelink PRS position estimation session in response to the sidelink PRS trigger.

Clause 55. The sidelink anchor of clause 54, further comprising: means for transmitting a measurement report based on the sidelink PRS exchange to the position estimation entity.

Clause 56. The sidelink anchor of any of clauses 54 to 55, further comprising: means for determining to participate in the on-demand sidelink PRS position estimation session with the UE based on one or more criteria.

Clause 57. The sidelink anchor of clause 56, wherein the sidelink PRS trigger comprises an indication of a sidelink zone in which the UE is located, and wherein the one or more criteria comprises a relationship between the sidelink anchor and the sidelink zone in which the UE is located.

Clause 58. The sidelink anchor of any of clauses 56 to 57, wherein the sidelink PRS trigger designates a maximum range between the UE and a respective sidelink anchor for the respective sidelink anchor to accept the sidelink PRS trigger, and wherein the determination is based on whether the sidelink anchor is inside of the maximum range.

Clause 59. The sidelink anchor of any of clauses 54 to 58, further comprising: means for transmitting, to the UE, a sidelink PRS trigger response.

Clause 60. The sidelink anchor of clause 59, wherein the sidelink PRS trigger response indicates acceptance of the sidelink PRS trigger.

Clause 61. A non-transitory computer-readable medium storing computer-executable instructions that, when executed by a position estimation entity, cause the position estimation entity to: perform sidelink anchor registration with a plurality of sidelink anchors; configure a sidelink anchor group from among the plurality of sidelink anchors based on a set of criteria; transmit, to each sidelink anchor of the sidelink anchor group, a respective sidelink PRS pre-configuration; receive, from a user equipment (UE), a request to schedule an on-demand sidelink positioning reference signal (PRS) position estimation session of the UE; transmit, to the UE, a sidelink PRS response that comprises assistance data associated with the sidelink anchor group for the on-demand sidelink PRS position estimation session; and receive one or more measurement reports associated with the on-demand sidelink PRS position estimation session.

Clause 62. The non-transitory computer-readable medium of clause 61, wherein the set of criteria includes a comprises: a mobility status of the plurality of sidelink anchors, a position estimation accuracy or capability associated with the plurality of sidelink anchors, or a combination thereof.

Clause 63. The non-transitory computer-readable medium of any of clauses 61 to 62, wherein the sidelink PRS pre-configuration specifies for each sidelink anchor in the sidelink anchor group, a first offset from a sidelink PRS trigger from the UE to a sidelink PRS transmission from the respective sidelink anchor, an expected reception time of sidelink PRS from the UE, or a combination thereof.

Clause 64. The non-transitory computer-readable medium of any of clauses 61 to 63, wherein the assistance data comprises a sidelink anchor group identifier, a private key, a resource grant for transmission of a sidelink PRS trigger from the UE to the sidelink anchor group, a sidelink PRS pre-configuration associated with the sidelink anchor group for the on-demand sidelink PRS position estimation session, a sidelink anchor identifier for a sidelink PRS trigger from the UE to the sidelink anchor group, or a combination thereof.

Clause 65. A non-transitory computer-readable medium storing computer-executable instructions that, when executed by a user equipment (UE), cause the UE to: transmit, to a position estimation entity, a request to schedule an on-demand sidelink positioning reference signal (PRS) position estimation session of the UE; receive, from the position estimation entity, a sidelink PRS response that comprises assistance data associated with a sidelink anchor group for the on-demand sidelink PRS position estimation session; transmit, to the sidelink anchor group, a sidelink PRS trigger to trigger the on-demand sidelink PRS position estimation session in accordance with respective sidelink PRS pre-configurations of the sidelink anchor group; and perform a sidelink PRS exchange with one or more sidelink anchors of the sidelink anchor group in association with the on-demand sidelink PRS position estimation session.

Clause 66. The non-transitory computer-readable medium of clause 65, further comprising instructions that, when executed by UE, further cause the UE to: transmit a measurement report based on the sidelink PRS exchange to the position estimation entity.

Clause 67. The non-transitory computer-readable medium of any of clauses 65 to 66, wherein the sidelink PRS trigger is transmitted via multicast or broadcast.

Clause 68. The non-transitory computer-readable medium of any of clauses 65 to 67, wherein the sidelink PRS trigger comprises an indication of a sidelink zone in which the UE is located.

Clause 69. The non-transitory computer-readable medium of any of clauses 65 to 68, wherein the sidelink PRS trigger designates a maximum range between the UE and a respective sidelink anchor for the respective sidelink anchor to accept the sidelink PRS trigger.

Clause 70. The non-transitory computer-readable medium of any of clauses 66 to 69, further comprising instructions that, when executed by UE, further cause the UE to: receive, from at least one sidelink anchor of the sidelink anchor group, a sidelink PRS trigger response.

Clause 71. The non-transitory computer-readable medium of clause 70, wherein the sidelink PRS trigger response indicates acceptance or rejection of the sidelink PRS trigger, and wherein the sidelink PRS exchange comprises blind decoding or descrambling only for SL PRS sidelink anchors from which a respective sidelink PRS trigger response that indicates acceptance of the sidelink PRS trigger is received.

Clause 72. The non-transitory computer-readable medium of any of clauses 65 to 71, wherein the sidelink PRS exchange comprises blind decoding or descrambling for SL PRS for each sidelink anchor among the sidelink anchor group.

Clause 73. The non-transitory computer-readable medium of any of clauses 65 to 72, wherein the assistance data comprises a sidelink anchor group identifier, a private key, a resource grant for transmission of a sidelink PRS trigger from the UE to the sidelink anchor group, a sidelink PRS configuration associated with the sidelink anchor group for the on-demand sidelink PRS position estimation session, a sidelink anchor identifier for a based sidelink PRS trigger from the UE to the sidelink anchor group, or a combination thereof.

Clause 74. A non-transitory computer-readable medium storing computer-executable instructions that, when executed by a sidelink anchor, cause the sidelink anchor to: perform sidelink anchor registration with a position estimation entity; receive, from the position estimation entity in response to the sidelink anchor registration, a sidelink PRS pre-configuration associated with a sidelink anchor group; receive, from a user equipment (UE), a sidelink PRS trigger that triggers the sidelink PRS pre-configuration for an on-demand sidelink PRS position estimation session of the UE with the sidelink anchor group; and perform a sidelink PRS exchange with the UE associated with the on-demand sidelink PRS position estimation session in response to the sidelink PRS trigger.

Clause 75. The non-transitory computer-readable medium of clause 74, further comprising instructions that, when executed by sidelink anchor, further cause the sidelink anchor to: transmit a measurement report based on the sidelink PRS exchange to the position estimation entity.

Clause 76. The non-transitory computer-readable medium of any of clauses 74 to 75, further comprising instructions that, when executed by sidelink anchor, further cause the sidelink anchor to: determine to participate in the on-demand sidelink PRS position estimation session with the UE based on one or more criteria.

Clause 77. The non-transitory computer-readable medium of clause 76, wherein the sidelink PRS trigger comprises an indication of a sidelink zone in which the UE is located, and wherein the one or more criteria comprises a relationship between the sidelink anchor and the sidelink zone in which the UE is located.

Clause 78. The non-transitory computer-readable medium of any of clauses 76 to 77, wherein the sidelink PRS trigger designates a maximum range between the UE and a respective sidelink anchor for the respective sidelink anchor to accept the sidelink PRS trigger, and wherein the determination is based on whether the sidelink anchor is inside of the maximum range.

Clause 79. The non-transitory computer-readable medium of any of clauses 74 to 78, further comprising instructions that, when executed by sidelink anchor, further cause the sidelink anchor to: transmit, to the UE, a sidelink PRS trigger response.

Clause 80. The non-transitory computer-readable medium of clause 79, wherein the sidelink PRS trigger response indicates acceptance of the sidelink PRS trigger.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a sidelink anchor, comprising:
performing sidelink anchor registration with a position estimation entity;
receiving, from the position estimation entity in response to the sidelink anchor registration, a sidelink positioning reference signal (PRS) pre-configuration associated with a sidelink anchor group;
receiving, from a user equipment (UE), a sidelink PRS trigger that triggers the sidelink PRS pre-configuration for an on-demand sidelink PRS position estimation session of the UE with the sidelink anchor group, wherein the sidelink PRS trigger comprises an indication of a sidelink zone in which the UE is located; and
performing a sidelink PRS exchange with the UE associated with the on-demand sidelink PRS position estimation session in response to the sidelink PRS trigger.

2. The method of claim 1, further comprising:
transmitting a measurement report based on the sidelink PRS exchange to the position estimation entity.

3. The method of claim 1, further comprising:
determining to participate in the on-demand sidelink PRS position estimation session with the UE based on one or more criteria.

4. The method of claim 3,
wherein the one or more criteria comprises a relationship between the sidelink anchor and the sidelink zone in which the UE is located.

5. The method of claim 3,
wherein the sidelink PRS trigger designates a maximum range between the UE and a respective sidelink anchor for the respective sidelink anchor to accept the sidelink PRS trigger, and
wherein the determination is based on whether the sidelink anchor is inside of the maximum range.

6. The method of claim 1, further comprising:
transmitting, to the UE, a sidelink PRS trigger response.

7. The method of claim 6, wherein the sidelink PRS trigger response indicates acceptance of the sidelink PRS trigger.

8. A sidelink anchor, comprising:
a memory;
at least one transceiver; and
at least one processor communicatively coupled to the memory and the at least one transceiver, the at least one processor configured to:
perform sidelink anchor registration with a position estimation entity;
receive, via the at least one transceiver, from the position estimation entity in response to the sidelink anchor registration, a sidelink positioning reference signal (PRS) pre-configuration associated with a sidelink anchor group;
receive, via the at least one transceiver, from a user equipment (UE), a sidelink PRS trigger that triggers the sidelink PRS pre-configuration for an on-demand sidelink PRS position estimation session of the UE with the sidelink anchor group, wherein the sidelink PRS trigger comprises an indication of a sidelink zone in which the UE is located; and
perform a sidelink PRS exchange with the UE associated with the on-demand sidelink PRS position estimation session in response to the sidelink PRS trigger.

9. The sidelink anchor of claim 8, wherein the at least one processor is further configured to:
transmit, via the at least one transceiver, a measurement report based on the sidelink PRS exchange to the position estimation entity.

10. The sidelink anchor of claim 8, wherein the at least one processor is further configured to:
determine to participate in the on-demand sidelink PRS position estimation session with the UE based on one or more criteria.

11. The sidelink anchor of claim 10,
wherein the one or more criteria comprises a relationship between the sidelink anchor and the sidelink zone in which the UE is located.

12. The sidelink anchor of claim 10,
wherein the sidelink PRS trigger designates a maximum range between the UE and a respective sidelink anchor for the respective sidelink anchor to accept the sidelink PRS trigger, and
wherein the determination is based on whether the sidelink anchor is inside of the maximum range.

13. The sidelink anchor of claim 8, wherein the at least one processor is further configured to:
transmit, via the at least one transceiver, to the UE, a sidelink PRS trigger response.

14. The sidelink anchor of claim 13, wherein the sidelink PRS trigger response indicates acceptance of the sidelink PRS trigger.

* * * * *